United States Patent [19]
Nakayama

[11] Patent Number: 5,287,358
[45] Date of Patent: Feb. 15, 1994

[54] ATM SWITCH CIRCUIT CONFIGURATION SYSTEM

[75] Inventor: Mikio Nakayama, Tokyo, Japan

[73] Assignee: Fujitsu Limited, Kawasaki, Japan

[21] Appl. No.: 747,602

[22] Filed: Aug. 20, 1991

[30] Foreign Application Priority Data

Aug. 20, 1990 [JP] Japan .................. 2-217099

[51] Int. Cl.[5] .............................................. H04J 3/24
[52] U.S. Cl. ...................................... 370/94.1; 370/60
[58] Field of Search ................... 370/94.1, 60, 110.1, 370/85.2, 58.1, 112, 99, 58.2, 58.3

[56] References Cited

U.S. PATENT DOCUMENTS 4,864,558 9/1989 Imagawa et al. ................. 370/60
4,999,835 3/1991 Lagoutte ........................ 370/94.1

FOREIGN PATENT DOCUMENTS

0320714A2 6/1989 Fed. Rep. of Germany.
WO90/0431-
62 4/1990 PCT Int'l Appl..
90043162 4/1990 PCT Int'l Appl..

*Primary Examiner*—Douglas W. Olms
*Assistant Examiner*—Shick Hom
*Attorney, Agent, or Firm*—Staas & Halsey

[57] ABSTRACT

The present invention relates to an ATM cell switch system in a broadband ISDN, and specifically to an ATM cell switch system where the number of a header part as a destination data of a cell except header error control data and the number of an information part have a common divisor. To realize a switch circuit in a hierarchical structure applicable to an LSI system, the circuit comprises an ATM cell divider for dividing an ATM cell into unit cells each having a 1-bit header part or sub-cells each having a multi-bit header part, an ATM cell switch for switching said unit cells or sub-cells according to the header data, and an ATM cell output unit for assembling an ATM having a header part corresponding to the number of output lines of the switch circuit and outputting the result from said corresponding output lines.

16 Claims, 43 Drawing Sheets

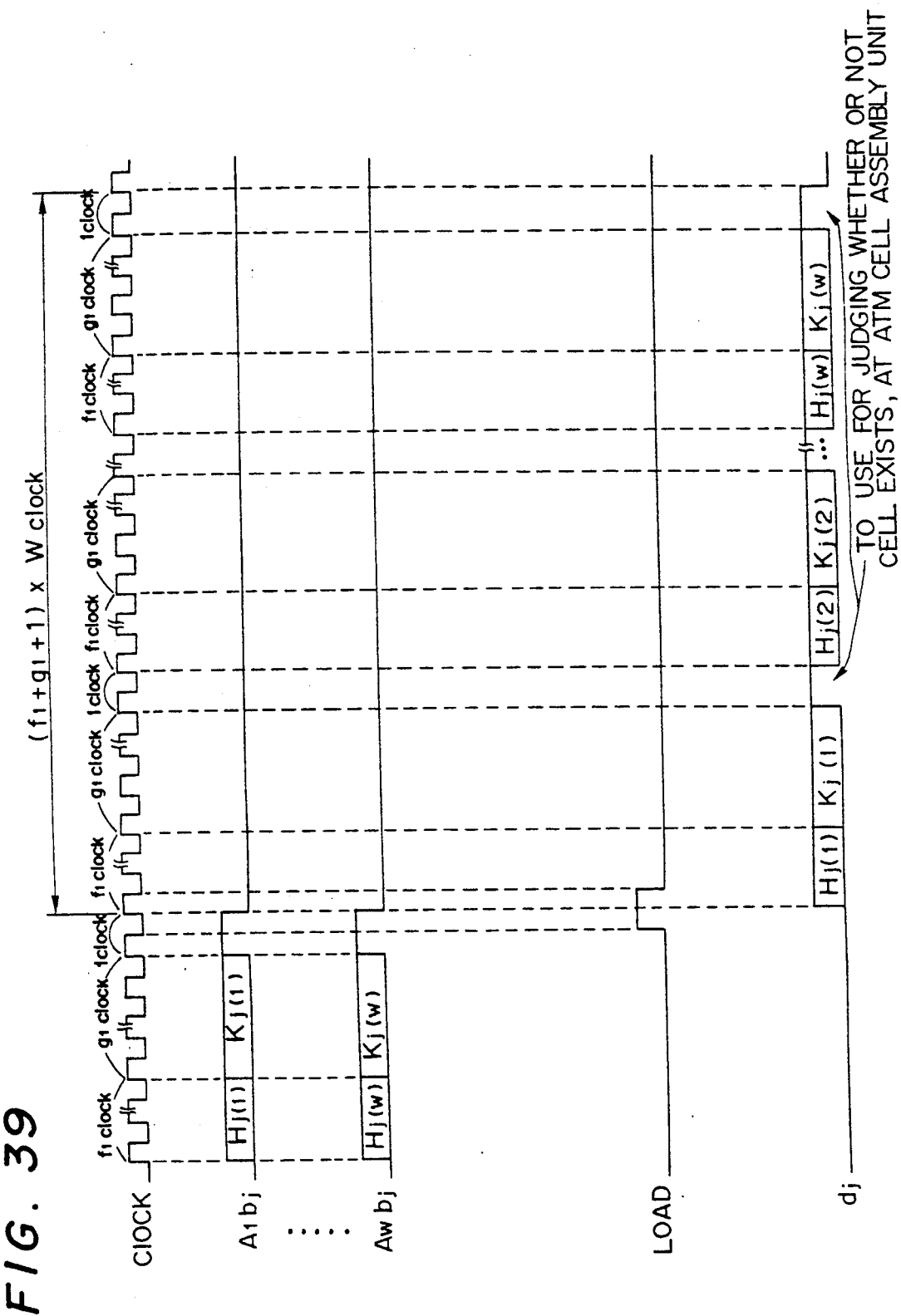

ATM SWITCH CIRCUIT CONFIGURATION SYSTEM

BACKGROUND OF THE INVENTION

The present invention relates to an asynchronous transmission mode (ATM) cell switch system in a broadband ISDN, and specifically to an ATM switch circuit configuration system for switching an ATM cell after dividing it into a plurality of sub-cells or unit cells.

An ATM switch transmits fixed-length ATM cells, as of a fixed length, to an opposite state in cells at a high speed according to header information. Therefore, an appropriate ATM switch circuit configuration system is required for realizing an LSI system.

In an asynchronous transmission mode (ATM) system for a broadband ISDN transmission, the transmission speed of subscribers' lines is 155.52 Mbits/s or four times that speed, and data are transmitted after being divided into fixed length blocks called "an ATM cell". FIG. 1 shows an example of a configuration of an ATM cell. In FIG. 1, the length of an ATM cell 1 is a total of 53 bytes, 5 bytes of which are used as a header field, 2 indicating the cell's destination, and 48 bytes are used as an information field 3 for transmission data. The last 1 byte of the header field 2 stores header error control data and is used for header error control (HEC).

FIG. 2 shows an example of a configuration of a broadband ISDN system. In FIG. 2, digitized information of voice, data and images are divided into fixed length ATM cells having a header indicating a destination, etc., and then transmitted through a transmission circuit 6 by an ATM switch 5. On the receiving side, an ATM cell is switched by an ATM switch 7 and directed to a correspondent user terminal 8.

One conventional ATM circuit system is a multi-step gate type system. FIG. 3 shows a configuration of a single-input multi-step gate type system. In a multi-step gate type system, 1×2 unit switches are arranged orderly to allot one ATM cell. A unit switch in the first step works at the first bit data of the header field; a unit switch in the second step works at the second bit data of the header field; and a unit switch in the Nth step works at the Nth bit data of the header field. Thus, each unit switch automatically works according to the value of each header field to allot an ATM cell.

FIG. 4 shows an example of a configuration of a single input multi-step gate type system (N=3). In this example, an inputted ATM cell has a 3-bit header part. For example, if an ATM cell having a header 011 (the first three bits is inputted, 1×2 unit switches work after checking each it, thus outputting the ATM cell to an output terminal 4.

To allot a plurality of ATM cell inputs in a multi-step gate type system, 2×2 unit switches must be arranged in an orderly manner; a unit switch in the first step works at the first bit data of the header field; a unit switch in the second step works at the second bit data of the header field, and a unit switch in the Nth step works at the Nth bit data of the header field. Thus, each unit switch works automatically according to the value of each header field to allot ATM cells.

FIG. 5 shows a configuration of a multi-input multi-step gate type circuit.

FIG. 6 shows an example of a configuration of a multi-input multi-step gate type circuit. In this example, an inputted ATM cell has a 3-bit header part. For example, if an ATM cell having a header 011 (the first three bits) is inputted, 2×2 unit switches work after checking each bit, thus outputting the ATM cell to an output terminal 4. As shown in FIG. 6, a unit switch of each step is connected such that any ATM cell having the same header part can be outputted to the same output terminal even if it is inputted from different input lines.

In a multi-step gate type system in an ordinary ATM switch circuit system shown in FIGS. 3-6, cells having the same header data value is outputted to the same output terminal according to the wiring among 1×2 or 2×2 unit switches. As all headers except a header error control data are, for example, 32 bits long, the number of gate steps are 32; the number of basic unit switches of a single input multi-step gate type system is equal to the number of output lines − 1; and the number of basic unit switches of a multiple input multi-step gate type system is equal to the number of input/output lines × 32/2. Thus, the number of unit switches increases with the number of input/output lines. As the configuration is not in the hierarchical structure, the increase of input/output lines (a maximum of $2^{32}$) requires the addition of basic unit switches and extended modification of the connection among basic unit switches, thus making it very difficult to realize an LSI system.

SUMMARY OF THE INVENTION

An object of the present invention is to realize an ATM cell switch circuit in a hierarchical structure applicable to an LSI system.

A feature of the present invention resides in an asynchronous transmission mode (ATM) switch circuit configuration system comprising an ATM cell dividing means, a unit cell switching means and a plurality of ATM cell assembly output means. The ATM cell dividing means for dividing an ATM cell comprising header part data and information part data excluding header error control data respectively by the number of data bits of said header into a plurality of unit cells comprising a 1-bit header part and a divided information part, and for outputting said unit cells from an equal number of output terminals as the divisor. The unit cell switching means comprises input terminals corresponding to a plurality of output terminals of said ATM cell dividing means for outputting unit cells inputted by said ATM cell dividing means to either of two output terminals corresponding to each of said input terminals according to the value of header data of said unit cell. An ATM cell assembly output means is provided for each of t output lines of said ATM switch circuit. The output means comprises input terminals where half the outputs of a plurality of output terminals of said unit cell switching means are inputted according to each header value of an ATM cell to be outputted, wherein all the unit cells are assembled and outputted as an ATM cell when unit cells are inputted from said unit cell switching means to all the input terminals.

BRIEF EXPLANATION OF DRAWINGS

FIG. 39 shows a time chart of multiplexing primary sub-cells by the multiplexer in an embodiment of the fourth principle.

DETAILED DESCRIPTION OF THE PREFERRED EMBODIMENT

Figure 7A:
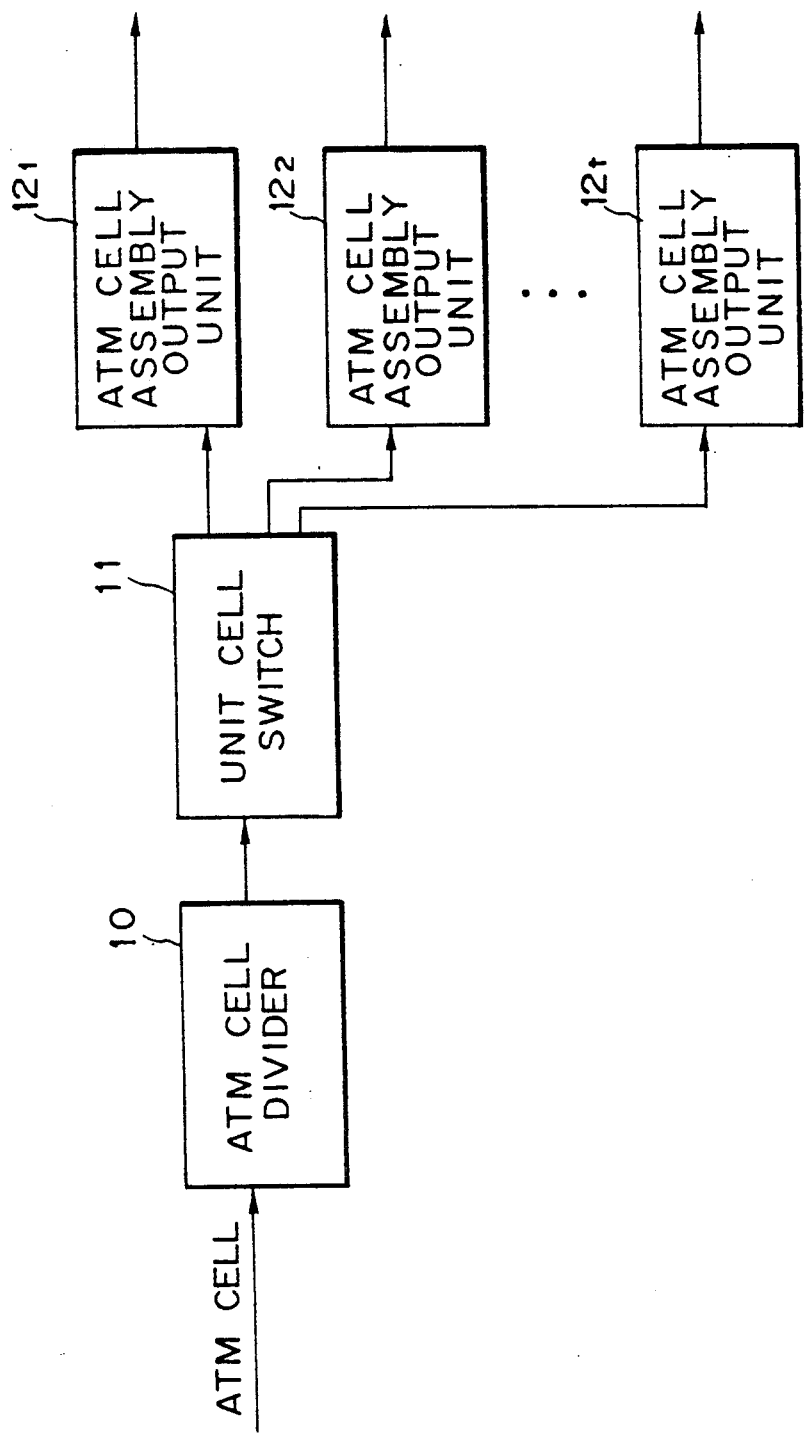
FIG. 7A shows a block diagram for explaining the first principle.

FIGS. 7A to 7E show block diagrams for explaining the principles of the present invention. It explains how an ATM switch circuit is configured in the broadband ISDN asynchronous transmission mode (ATM) cell switch system. FIG. 7A is a block diagram for explaining the first principle of the present invention; where an ATM cell divider 10 divides an ATM cell excluding header error control data. It divides each of a 32-bit header part and a 384-bit information part into 32 parts, thus generating 32 unit cells each comprising a 1-bit header part and a 12-bit information part and outputting these unit cells from 32 output terminals respectively.

A unit cell switch 11 is provided with 32 input terminals corresponding to 32 output terminals of the ATM cell dividers 10. Unit cells are inputted to these 32 input terminals. According to the header value of each unit cell inputted from the ATM cell divider 10, each unit cell is outputted to either of two output terminals also provided in the unit cell switch means 11 corresponding to each input terminal. Therefore, a total of 64 output terminals are provided therein. The unit cell switch means 11 comprises, for example, 32 units of $1 \times 2$ switches, each switch outputting an ATM unit cell to either of two output terminals corresponding to each input terminal according to the header value of 0 or 1.

ATM cell assembly output means $12_1, 12_2, \text{---}, 12_t$ are provided according to the number t of output lines of the switch circuit. An ATM cell assembly output means comprises 32 input terminals. The values in a 32-bit header of an ATM cell are outputted to the output lines of the unit cell switch means. According to these values, 32 out of 64 output terminals of the unit cell switch means 11 are connected to the input terminals of ATM cell assembly means. The 32 unit cells are assembled and outputted to the output line as an ATM cell when unit cells are inputted from the unit cell switch means 11 to all of 32 input terminals. A buffer, for example, is connected as a unit cell input part to each of 32 input terminals of an ATM cell assembly output means. When unit cells are stored in all of 32 buffers, the unit cells are assembled into an ATM cell by an assembler for assembling an ATM cell, and then outputted.

Figure 7B:
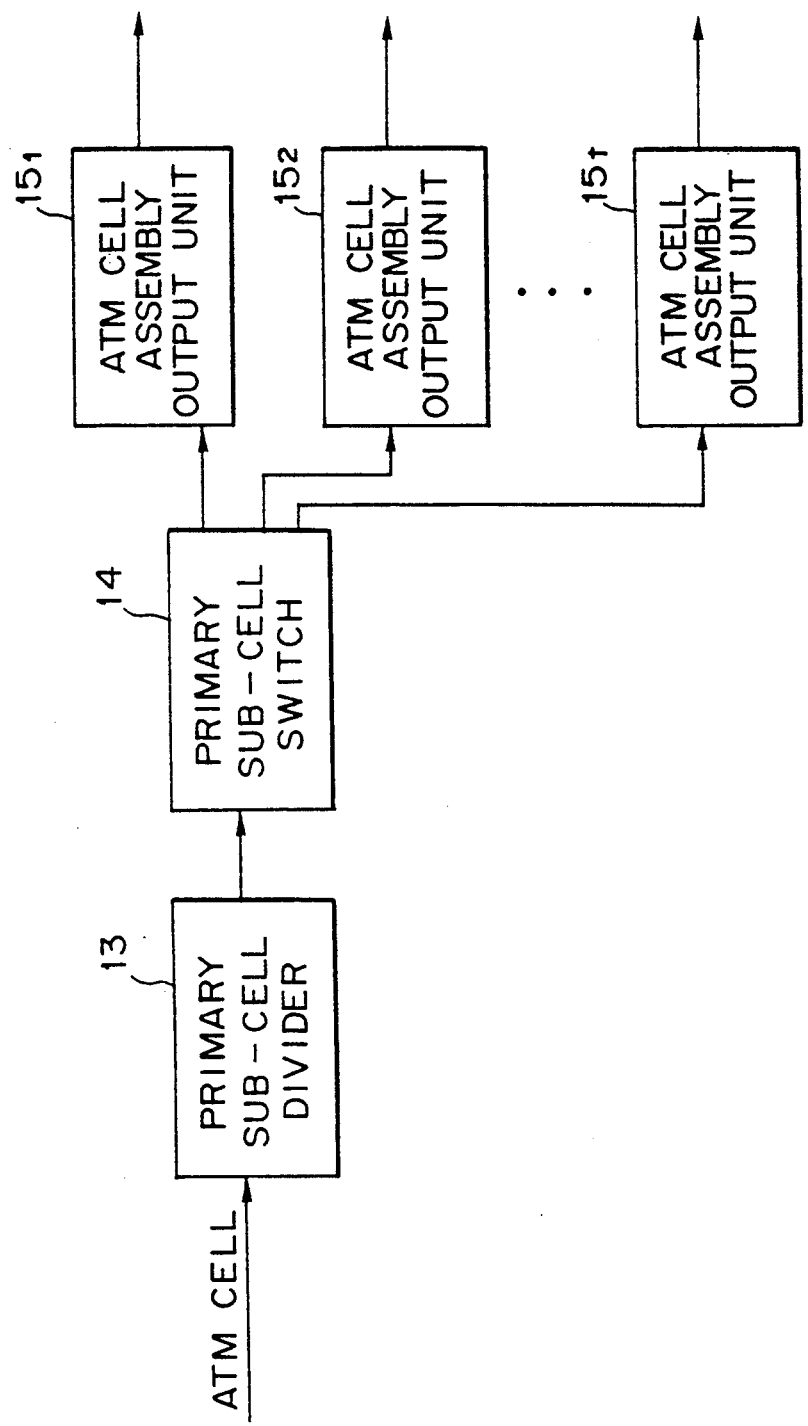
FIG. 7B shows a block diagram for explaining the second principle.

FIG. 7B shows a block diagram for explaining the second principle of the present invention. In FIG. 7B, a primary sub-cell divider 13 divides the above described 32 bit header part and 384 bit information part by $e_1$, a divisor of 32 except 1 and 32, thus dividing an ATM cell into $e_1$ primary sub-cells each comprising an $f_1$ ($f_1=32/e_1$)-bit header part and a $g_1$ ($g_1=384/e_1$)-bit information part, and then outputs each of primary sub-cells from $e_1$ output terminals.

A primary sub-cell switch means is are provided with $e_1$ input terminals corresponding to $e_1$ output terminals of the primary sub-cell divider 13. Primary sub-cells are inputted to these $e_1$ input terminals. According to the header value of each primary sub-cell inputted from the primary sub-cell divider 13, each primary sub-cell is outputted to one of $2^{f_1}$ output terminals also provided in the primary sub-cell switch means 14 corresponding to each input terminal. A total of $2^{f_1} \times e^1$ output terminals are provided therein.

The primary sub-cell switch means 14 comprises, for example, $e^1$ primary sub-cell processors. Signals from $e^1$ output terminals in the primary sub-cell divider 13 are inputted to each primary sub-cell processor. The primary sub-cell processor comprises, $2^{f_1}$ output terminals. For example, if $f_1$ is 4, it comprises 16 output terminals, and the primary sub-cells inputted to input terminals are outputted to one of 16 output terminals according to the header value of each primary sub-cell.

ATM cell assembly output means $15_1, 15_2, \text{---} 15_t$ are provided according to the number t of output lines of the switch circuit. Each ATM cell assembly output means comprises $e_1$ input terminals, and $e_1$ out of $2^{f_1} \times e_1$ output terminals in the primary sub-cell switch means 14 are connected to respective input terminals respectively. When primary sub-cells from the primary sub-cell switch means 14 are inputted to all the above described input terminals, the $e_1$ primary sub-cells are assembled to an ATM cell and outputted to an output line. Each of the ATM cell assembly output means comprises an ATM cell input part connected to $e_1$ input terminals and an assembler for assembling these primary sub cells when they are inputted to all of the ATM cell input parts and for outputting them to the output line as an ATM cell.

Figure 7C:
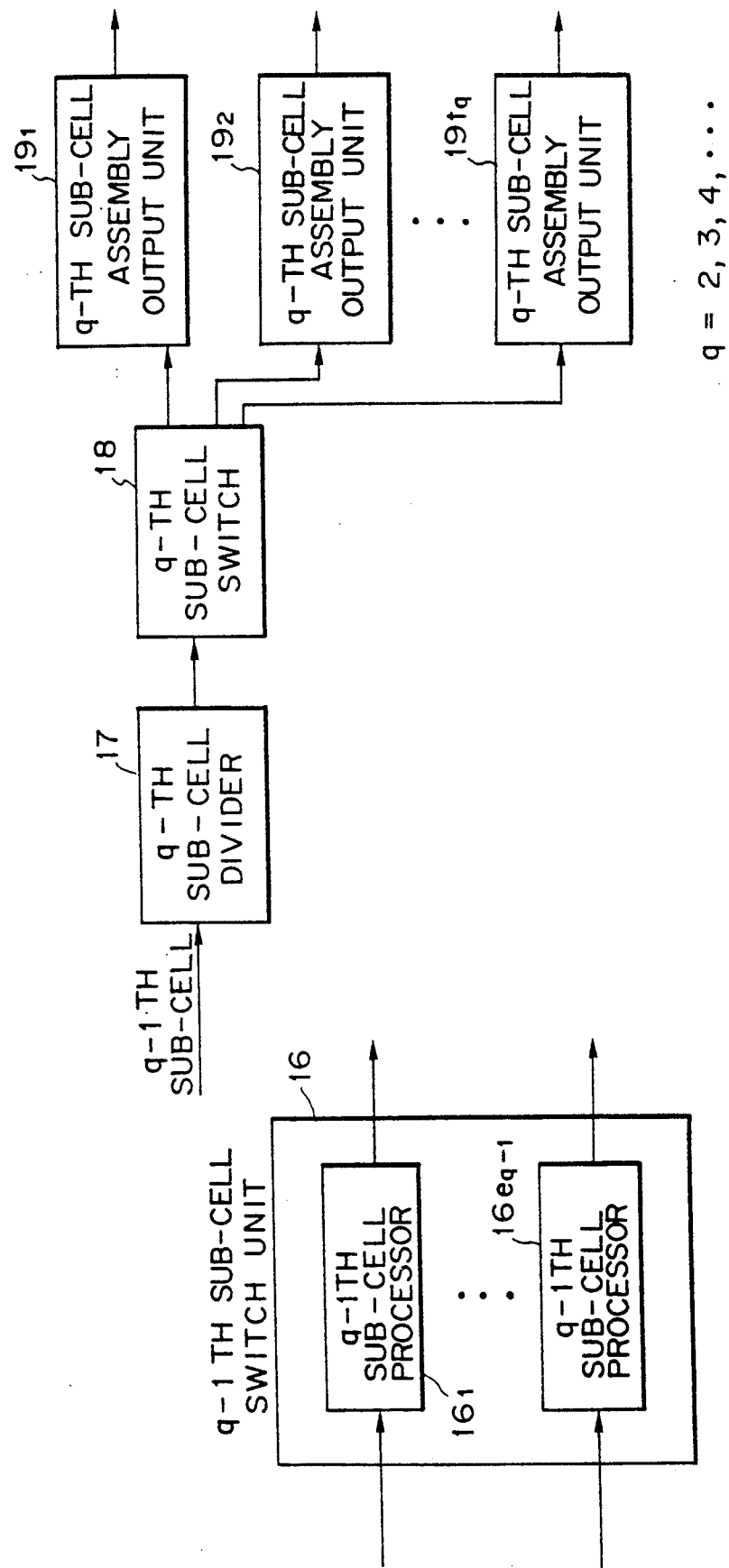
FIG. 7C shows a block diagram for explaining the third principle.

FIG. 7C is a block diagram for explaining the third principle of the present invention. In FIG. 7C, a q-1th sub-cell switch means 16 (when q=2) corresponding to the primary sub-cell switch means 14 comprises $e_1$ primary sub-cell processors ($16_1, 16_2, \text{---} 16_{e1}$) for outputting primary sub-cells inputted by the primary sub-cell divider 13 to any of $2^{f_1}$ output terminals according to the header value of the primary sub-cell after signals are inputted from $e_1$ output terminals of the primary sub-cell divider 13.

In the primary sub-cell processor means ($16_1, 16_2, \text{---} 16_{e1}$), the secondary sub-cell divider 17 divides a primary sub-cell comprising an $f_1$-bit header part and $g_1$-bit information part, by $e_2$, a divisor of $e_1$ other than 1 and $e_1$, thus dividing a primary sub-cell into $e_2$ secondary sub-cells each comprising an $f_2$ ($f_2=f_1/e_1$)-bit header part and a $g_2$ ($g_2=g_1/e_1$)-bit information part, and outputs each of secondary sub-cells from $e_2$ output terminals.

A secondary sub-cell switch means 18 comprises $e_2$ secondary sub-cell processors ($16_1, 16_2, \text{---} 16_{e1}$) for receiving secondary sub-cells from the secondary sub-cell divider 17 and outputting the secondary sub-cells to any of $2^{f_2}$ output terminals according to the header value of each secondary sub-cell.

Secondary sub-cell assembly output means ($19_1, 19_2, \text{---} 19_{t2}$) are provided corresponding to the number $t_2$ ($t_2=2^{f_1}$) of $2^{f_1}$ output terminals, each comprising $e_2$ output terminals where $e_2$ outputs out of $2^{f_2} \times e_2$ output terminals in the secondary sub-cell switch means 18 are inputted according to the header value of a primary sub-cell to be outputted to the above described output terminal of a secondary sub-cell assembly output means, assemble $e_2$ secondary sub-cells when secondary sub-cells are inputted from the secondary sub-cell switch means 18 to all of $e_2$ input terminals, and output them as primary sub-cells to the ATM cell assembly output means.

Generally, in q−1th (q 3) sub-cell processors ($16_1, 16_2, \text{---} 16_{eq-1}$), the qth sub-cell divider 17 divides a q−1th sub-cell comprising an $f_{q-1}$-bit header part and a $g_{q-1}$-bit information part by $e_q$, a divisor of $e_{q-1}$ other than 1 and $e_{q-1}$ into $e_q$ qth sub-cells each comprising an $f_q$ ($f_q=f_{q-1}/e_q$)-bit header part and a $g_q$ ($g_q=g_{q-1}/e_q$)-bit information part, and outputs qth sub-cells from $e_q$ output terminals.

The qth sub-cell switch means 18 comprises $e_q$ qth sub-cell processors for receiving qth sub-cells from the qth sub-cell divider 17 and outputting qth sub-cells from any one of $2^{f_q}$ output terminals according to the header value of a qth sub-cell.

Qth sub-cell assembly output means ($19_1, 19_2, \text{---} 19_{tq}$) are provided corresponding to the number $f^{q-1}$ of output lines of sub-cell processors, comprise $e_q$ input terminals where $e_q$ outputs out of $2^{f_q} \times e_q$ output terminals in the qth sub-cell switch means 18 are inputted according to the header value of a q−1th sub-cell to be outputted to the above described output line of a q−1th sub-cell processor, assemble $e_q$ qth sub-cells when qth sub-cells are inputted to all $e_q$ input terminals from the qth sub-cell switch means, and then output them as q−1th sub-cells.

Thus, the qth sub-cell processors are sequentially configured in a hierarchical structure with the value of "q" increased.

Figure 7D:
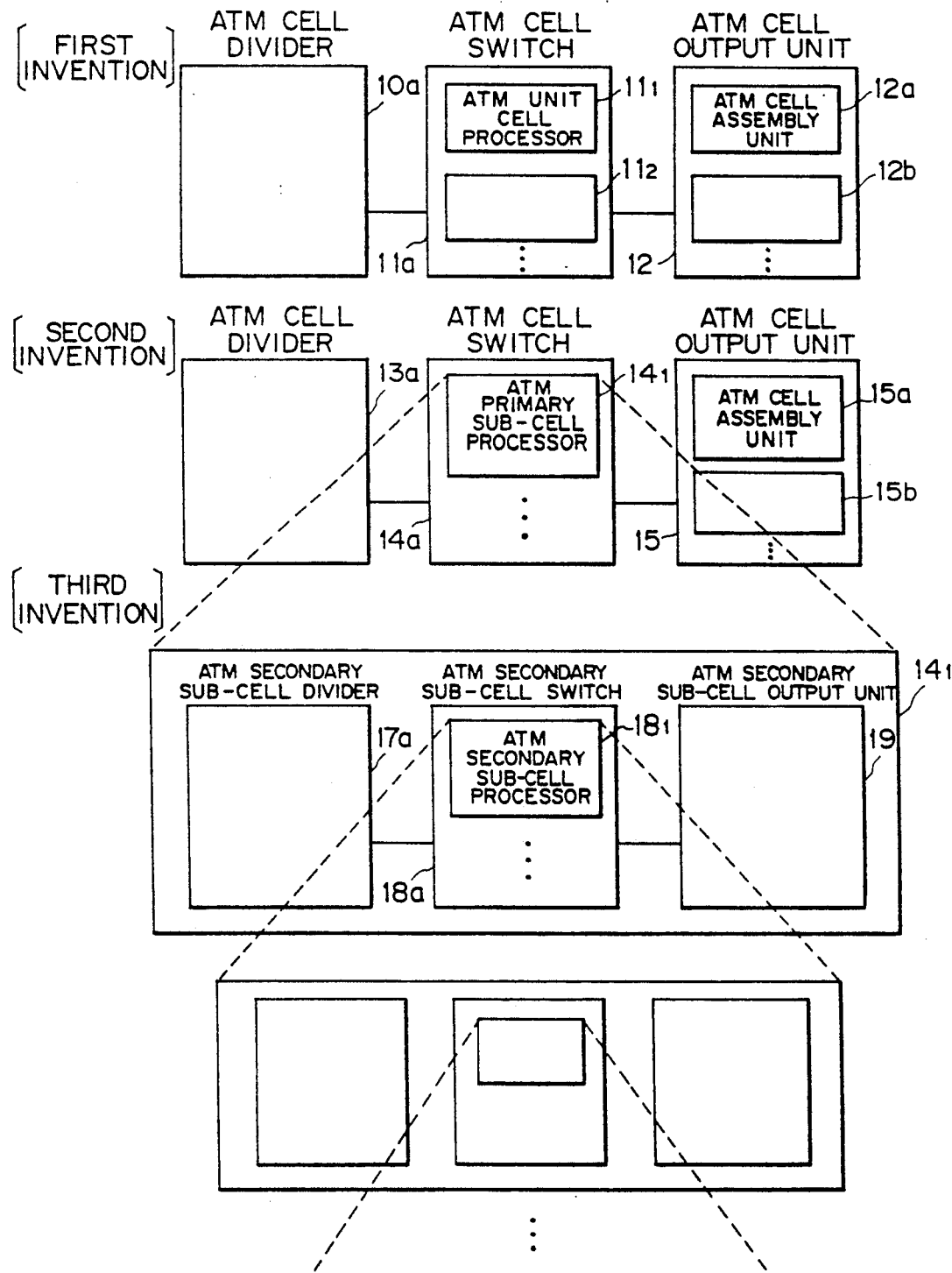
FIG. 7D shows a conceptual view for explaining the first to third principles.

FIG. 7D shows a supplementary view for explaining the above described first to third principles of the present invention. In FIG. 7D, in the first principle, a switch circuit comprises an ATM cell divider 10a corresponding to the ATM cell divider 10 in FIG. 7A, an ATM cell switch means 11a corresponding to the unit cell switch means 11 in FIG. 7A, and an ATM cell output means 12 comprising ATM cell assembly output means $12_1, \text{---} 12_t$. The ATM cell switch means 11a comprises a plurality of ATM unit cell processors $11_1, 11_2, \text{---}$ for outputting inputted unit cells to either of two output terminals. The ATM cell output means 12 comprises ATM cell composers 12a, 12b, --- corresponding to the ATM cell assembly output means.

By contrast, in the second principle shown in FIG. 7D, a switch circuit comprises an ATM cell divider 13a corresponding to the primary sub-cell divider 13, an ATM cell switch means 14a corresponding to the primary sub-cell switch means 14, and an ATM output means 15 comprising ATM cell composers 15a, 15b, --- corresponding to the ATM cell assembly output means $15_1$, ---, $15_t$.

In the first principle, an ATM cell is divided into unit cells each having a 1 bit header by the ATM cell divider 10a, switched by the ATM cell switch means 11a, assembled by the ATM cell output means 12, and then outputted. However, in the second principle, an ATM cell is divided into primary sub-cells having a multiple-bit header part, and then switched and outputted.

Figure 1:
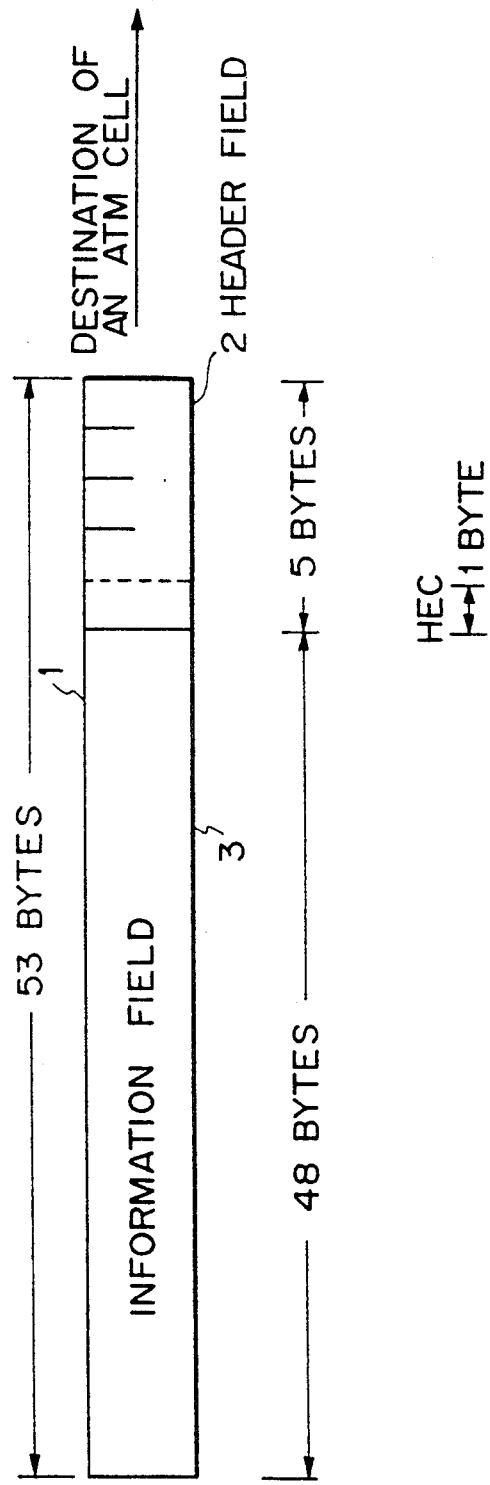
FIG. 1 shows an example of a configuration of an ATM cell.
Figure 2:
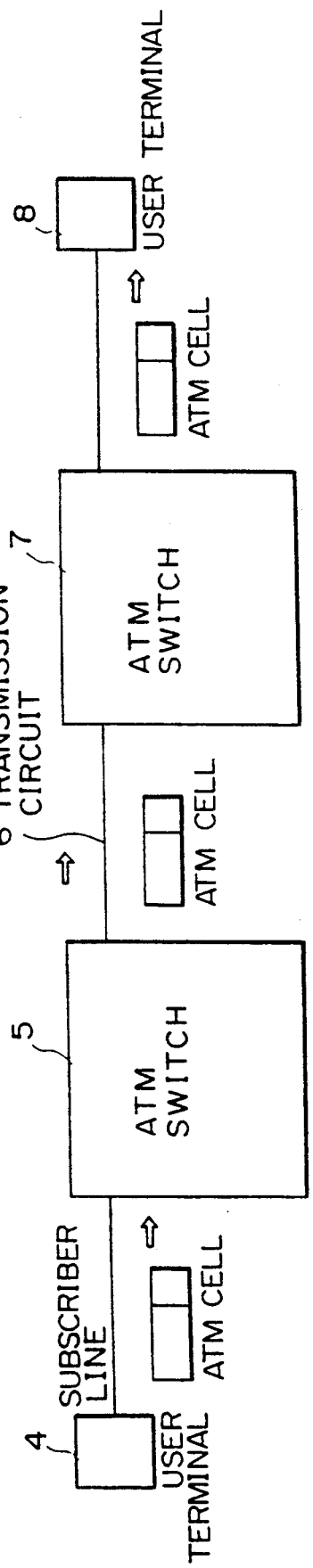
FIG. 2 shows an example of a configuration of a broadband ISDN system.
Figure 3:
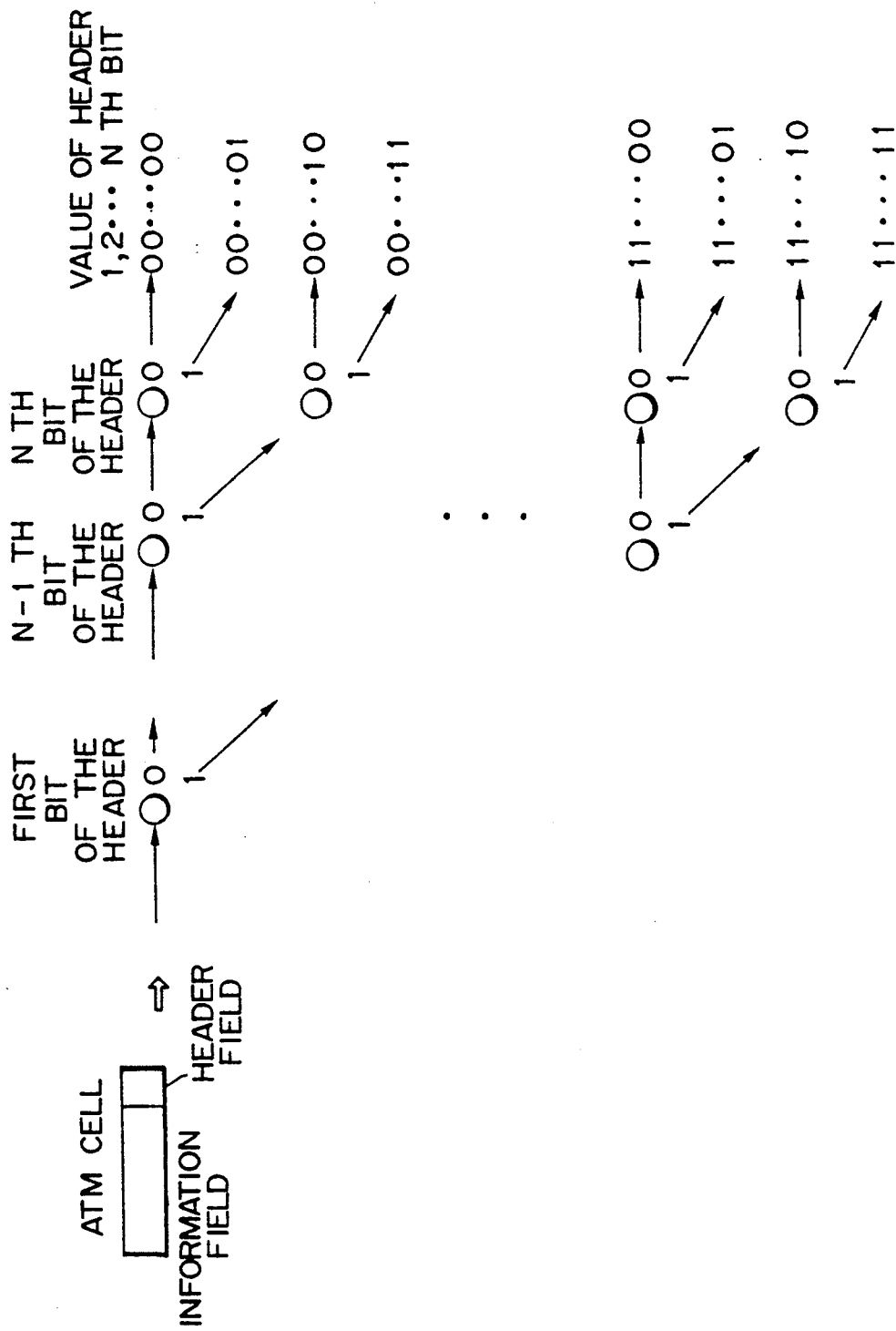
FIG. 3 shows a configuration of a single-input multi-step gate type circuit.
Figure 4:
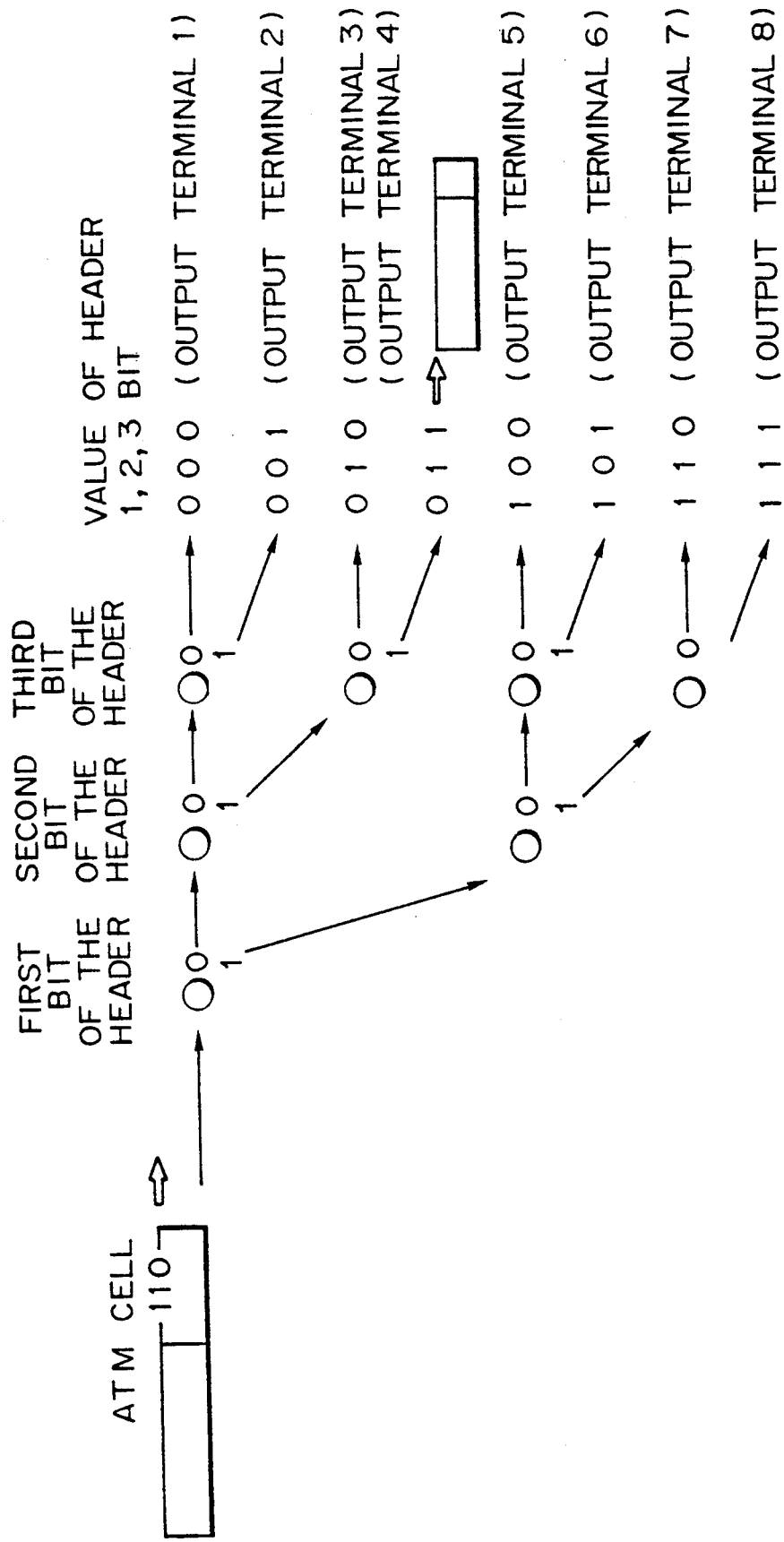
FIG. 4 shows a configuration of a single input multi-step gate type circuit (N=3)
Figure 5:
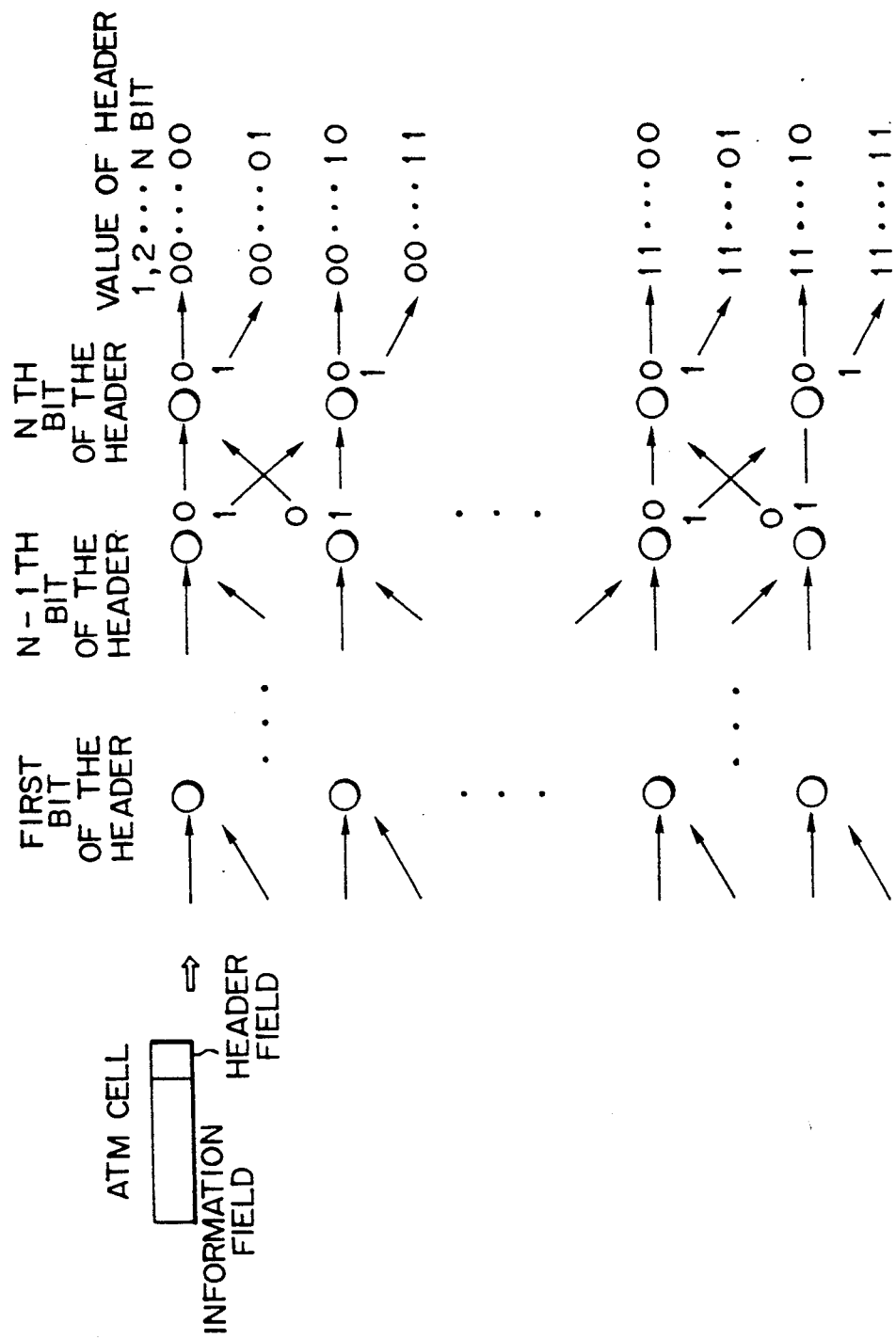
FIG. 5 shows a configuration of a multi-input multi-step gate type circuit.
Figure 6:
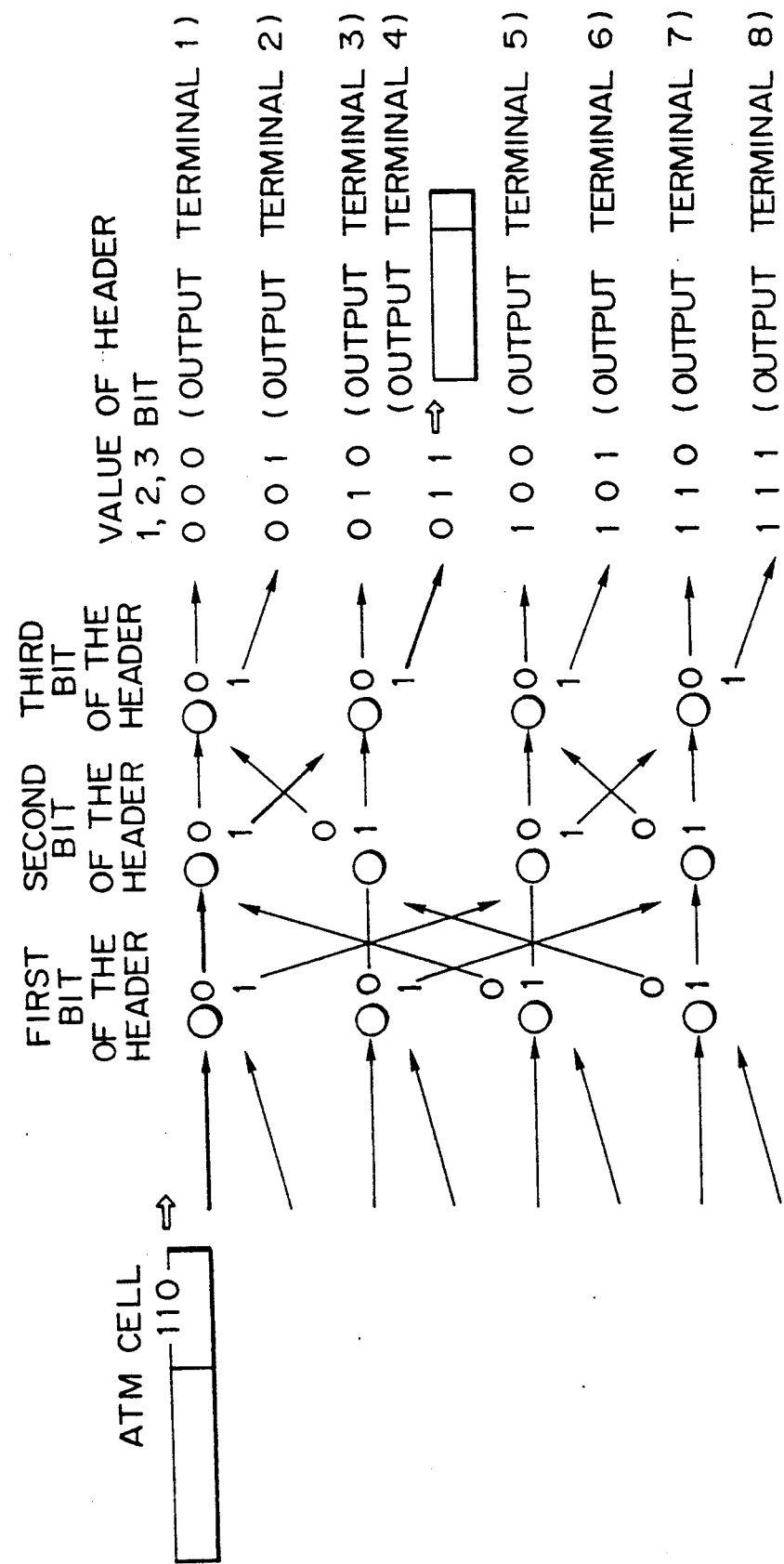
FIG. 6 shows a configuration of a multi-input multi-step gate type circuit in case of N=3.

It is possible to configure an ATM primary sub-cell processor $14_1$, $14_2$, --- in a multi-step gate type circuit as shown in FIGS. 3 and 4. In this case, however, there is a problem that it is not sufficiently applicable to an LSI system. The third principle has been developed to solve this problem and configure the primary ATM sub-cell processor more progressively in a hierarchical structure.

In the third principle shown in FIG. 7D, a ATM primary sub-cell processor $14_1$ comprises a ATM secondary sub-cell divider 17a corresponding to the qth sub-cell divider 17 shown in FIG. 7C, a ATM secondary sub-cell switch means 18a corresponding to the qth sub-cell switch means 18, and an ATM secondary sub-cell output means 19 comprising the qth sub-cell assembly output means $19_1$, $19_2$, ---.

An ATM secondary sub-cell switch means 18a comprises a plurality of ATM secondary sub-cell processors $18_1$, $18_2$, ---like the ATM cell switch means 14a in the second principle, each of the ATM secondary sub-cell processors having a hierarchical configuration just like the ATM primary sub-cell processor. If the ATM secondary sub-cell processor has only two output terminals like the ATM unit cell processor in the first principle, sub-cells inputted in this processor will be unit cells, thus configuring the processor with basic 1×2 switches. Therefore, no further hierarchical structure is required.

Figure 7E:
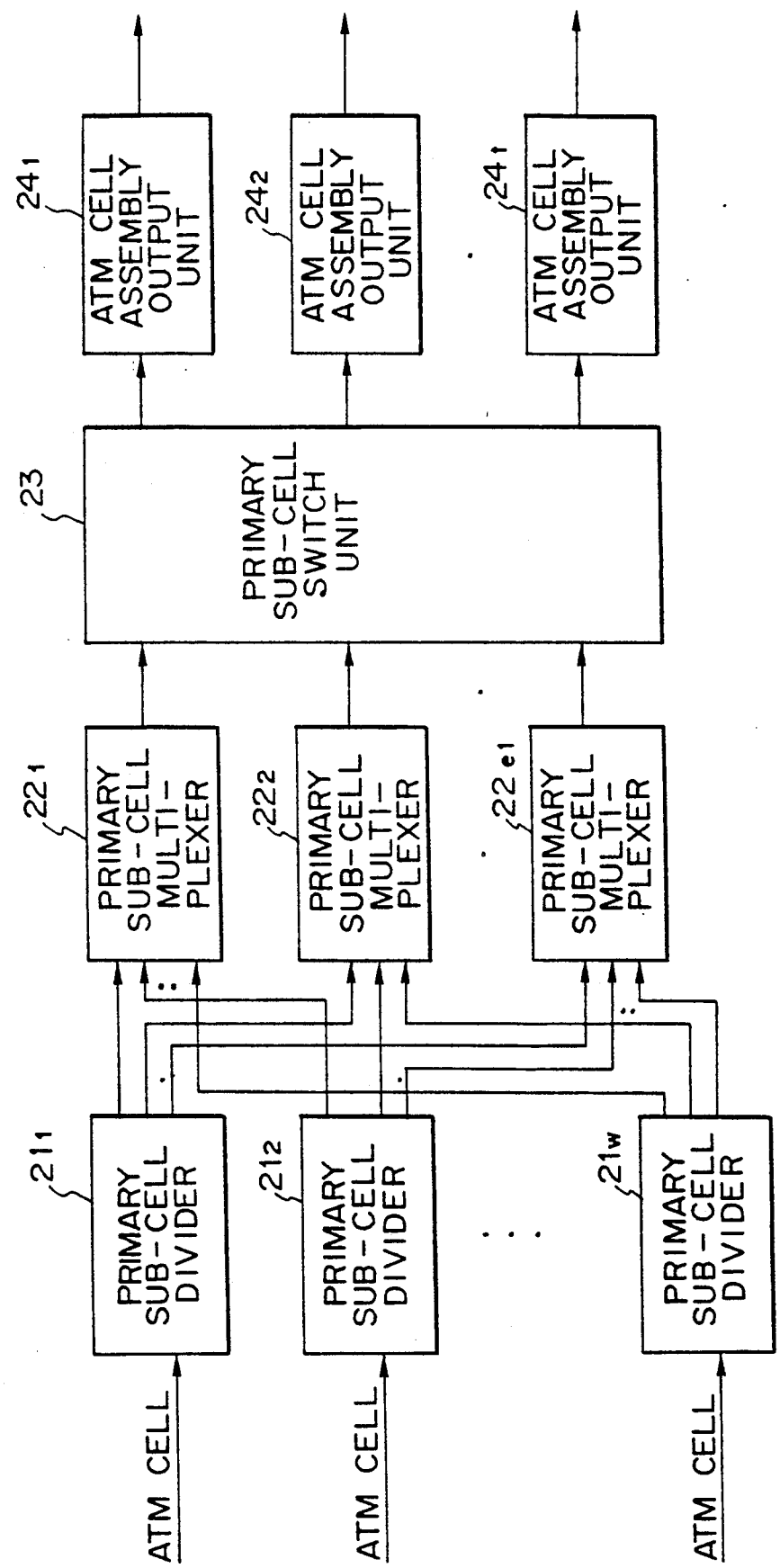
FIG. 7E shows a block diagram for explaining the fourth principle.

FIG. 7E shows a block diagram for explaining the fourth principle of the present invention. In FIG. 7E, primary sub-cell dividers $21_1$, $21_2$, --- $21_w$ are provided corresponding to the number w of ATM cell input lines to be used in a switch circuit. An ATM cell comprising a 32-bit header part and a 384-bit information part excluding the header error control data in the ATM cell is divided by $e_1$, a divisor of 32 other than 1 and 32, thus being divided into $e_1$ primary sub-cells each comprising an $f_1$ ($f_1 = 32/e_1$)-bit header part and a $g_1$ ($g_1 = 384/e_1$)-bit information part, and then outputted from $e_1$ output terminals respectively.

Primary sub-cell multiplexers $22_1$, $22_2$, --- $22_{e1}$ are provided corresponding to the number $e_1$ of output terminals of each of the primary sub-cell dividers $21_1$, $21_2$, --- $21_w$, and the multiplex primary sub-cells, to be outputted from a plurality of primary sub-cell dividers $21_1$, $21_2$, --- $21_w$, located at the same relative position in an ATM cell.

The operation of a primary sub-cell switch means 23 is the same as that of the primary sub-cell switch means 14 in the second principle of the present invention shown in FIG. 7B. That is, the primary sub-cell switch means 23 outputs primary sub-cells outputted simultaneously from the primary sub-cell multiplexers $22_1$, $22_2$, --- $22_{e1}$ from any of $2^{f_1}$ output terminals corresponding to $e_1$ input terminals. The operation of ATM cell assembly output means $24_1$, $24_2$, --- $24_t$ is the same as that of the ATM cell assembly output means $15_1$, $15_2$, --- $15_t$ shown in FIG. 7B. That is, each of the ATM cell assembly output means outputs primary sub-cells when primary sub-cells are inputted from the primary sub-cell switch means 23 to all of the $e_1$ input terminals, and then outputs them to each of the output lines as an ATM cell.

According to the first principle shown in FIG. 7A, a header part of an ATM cell is divided into 1-bit unit cells, each unit cell being inputted to, for example, a 1×2 unit switch forming a unit cell switch means 11. From each unit switch, a unit cell is outputted from the output $L_0$ when the header value is 0, and from the output $L_1$ when the header value is 1.

The ATM cell assembly output means $12_1$, $12_2$, --- $12_t$ are, corresponding to the values of a 32-bit header part of an ATM cell to be outputted to output lines, connected to 32 output terminals of 1×2 unit switches in the unit cell switch means 11. For example, all the output terminals $L_0$ of 1×2 unit switches in the unit cell switch means 11 are connected to the ATM cell assembly output means corresponding to the output lines of 32 header bits of 0. Thus, if all the 32 bits of a header part of an ATM cell inputted by the ATM cell divider 10 are 0, the cell is outputted from this output line.

According to the second principle shown in FIG. 7B, an ATM cell is divided into primary sub-cells having a multiple-bit header part. In the primary sub-cell switch means 14, primary sub-cells are inputted to $e_1$ (equal to the number of primary sub-cells) primary sub-cell processors, and outputted from one of $2^{f_1}$ output terminals according to the header value of a sub-cell. For example, if a primary sub-cell whose header part $f_1$ bits are all 0 is outputted from the output terminal $L_0$ of each primary sub-cell processor, signals from $e_1$ output terminals $L_0$ of the primary sub-processor of the primary sub-cell switch means 14 are inputted to the ATM cell assembly output means connected to output lines corresponding to all the 32 bit header values of 0. Thereby, ATM cells having a 32-bit header part of 0 inputted to the primary sub-cell divider 13 are outputted from these output lines.

In the third principle shown in FIG. 7C, a header part and an information part of a primary ATM sub-cell is divided by $e_2$ ($e_2$ is a divisor of $e_1$ other than 1 and $e_1$, thus dividing a primary sub-cell into secondary sub-cells without using a multi-step gate type circuit as a conventional ATM cell switch system in the configuration of a primary ATM sub-cell processor.

In the secondary sub-cell switch means 18 (q=2), secondary sub-cells are inputted to $e_2$ (equal to the number of secondary sub-cells) secondary sub-cell processors, and outputted from any of $2^{f_2}$ ($f_2 = f_1/e_2$) output terminals according to the header value of a sub-cell. For example, if a secondary sub-cell having whose header part $f_2$ bits are all 0 is outputted from output terminals $L_0$ of each secondary sub-cell processor, signals from $e_2$ output terminals $L_0$ of the secondary sub-cell processor in the secondary sub-cell switch means 102 are inputted to the secondary sub-cell assembly output means connected to output lines corresponding to $f_1$ bit header values of 0. Thereby, a primary sub-cell whose header part $f_1$ bits are all 0 is outputted.

A q−1th sub-cell processor (q 3) can be configured in the above described manner.

In the fourth principle shown in FIG. 7E, ATM cells inputted from a plurality of input lines are switched. An ATM cell inputted from each input line is divided into primary sub-cells by the primary sub-cell dividers $21_1$, $21_2$, --- as in the second principle of the present invention. Then, the primary sub-cells at the same relative position in an ATM cell inputted from a plurality of input lines are multiplexed by a primary sub-cell multiplexer, and then inputted as serial signals to the primary sub-cell switch means 23. $e_1$ primary sub-cells simultaneously inputted to the primary sub-cell switch means 23 are outputted from any of $2^{f_1}$ output terminals corresponding to each input terminal according to the header value of a primary sub-cell as in the second principle of the present invention. Then, these primary sub-cells are assembled by the ATM cell assembly output means, and outputted to output lines corresponding to each value in 32 header bits.

As described above, in the first principle, for example, an ATM switch circuit comprises an ATM cell divider 10, a unit cell switch means 11 comprising 32 unit cell processors, and ATM cell assembly output means $12_1$, $12_2$, --- $12_t$ corresponding to respective output terminals in a hierarchical structure, and is applicable in an LSI system. When the number of output lines are increased, only an ATM cell assembly output means which is connected to a unit cell switch means 11 according to the data in 32 header bits corresponding to each line must be added, and no other wiring modification is required.

Figure 8:
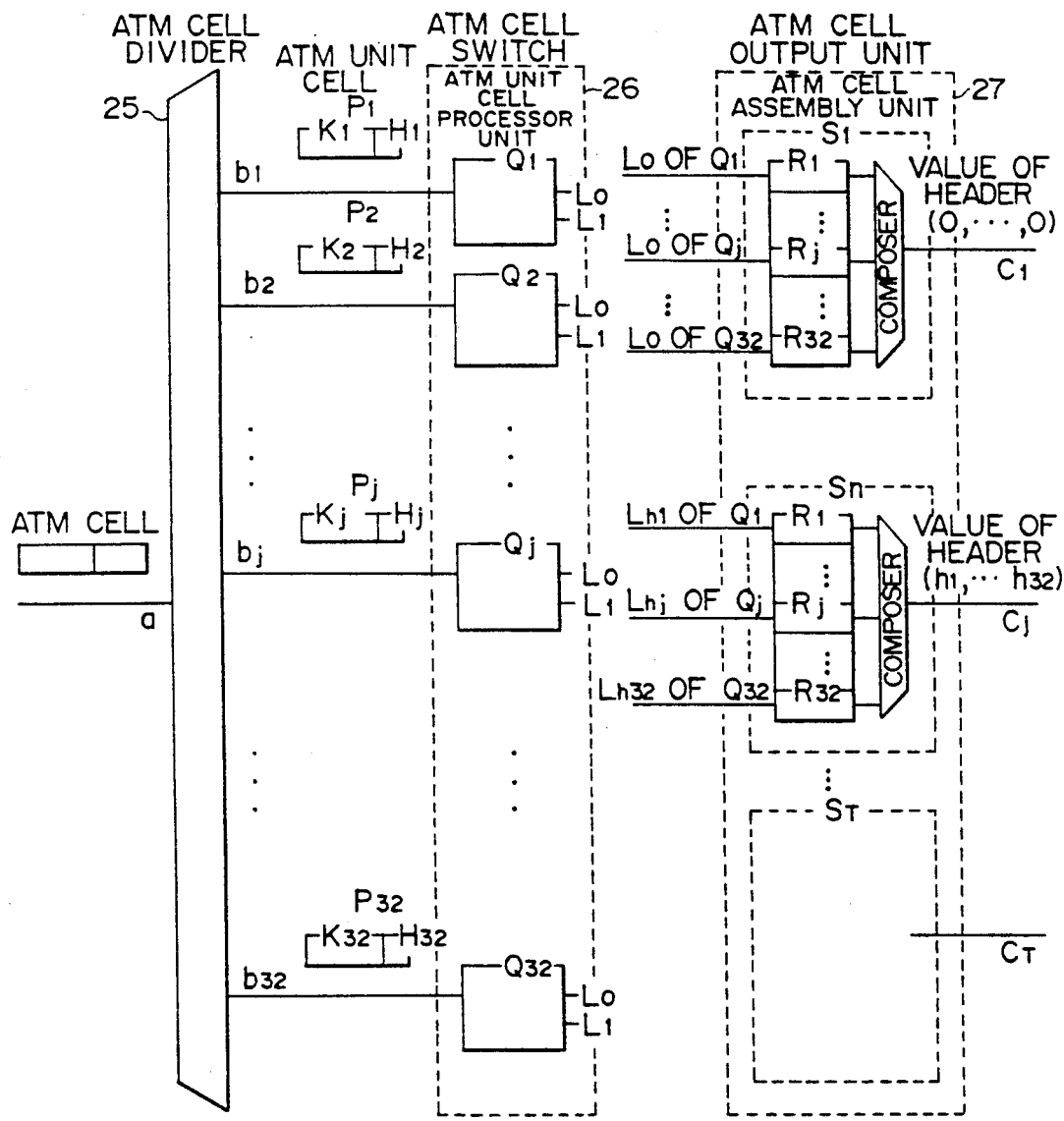
FIG. 8 shows a block diagram for explaining the configuration of the first principle.

FIG. 8 shows a block diagram of the configuration of the first principle of the present invention. The embodiment shown in FIG. 8 comprises an ATM cell divider 25, an ATM cell switch 26, and an ATM cell output unit 27. The ATM cell divider 25 divides an ATM comprising a 32-bit header part and a 384-bit information part excluding the HEC of an ATM cell into 32 ATM unit cells ($P_1$, $P_2$, --- $P_{32}$) each comprising a 1-bit header part $H_j$ (j=1-32) and an 12-bit information part $K_j$ (j=1-32), and then outputs each unit cell from each output $b_j$ (j=1-32).

Each of ATM unit cell processors comprises 1×2 switches, has outputs $L_0$ and $1^1$, and allots ATM unit cells to outputs $L_{hj}$ ($L_0$ or $L_1$) according to values $h_j$ of a header part $H_j$. The ATM cell switch 26 comprises 32 ATM unit cell processors ($Q_1$, $Q_2$, --- $Q_{32}$). Each $Q_j$ (j=1-32) is connected to $b_j$ (j=1-32), and an ATM unit cell $P_j$ (j=1-32) is inputted to an ATM unit cell processor. Each ATM cell composer forming the ATM cell output unit 27 comprises 32 13-bit ATM unit cell (each comprising a 1-bit header part and a 12-bit information part) input units ($R_1$, $R_2$, --- $R_{32}$) and assemblers for assembling an ATM cell only when ATM unit cells are inputted to all of ATM unit cell input units ($R_1$, $R_2$, --- $R_{32}$).

In each of ATM cell composers $S_n$ (n=1-T), the ATM cell output unit 27 comprises T ($S_1$, --- $S_T$) (T: number of output lines) ATM cell composers. As to the ATM cell assembly unit Sn (n=1 T), the ATM cell having the header value ($h_1$, $h_2$, --- $h_{32}$) is outputted to the output $C_j$ of the ATM cell output unit by inputting the output $L_{hj}$ of the ATM unit cell processor $Q_j$ (j=1-32) to the ATM unit cell input unit $R_j$ (j=1-32) according to the ATM cell header value ($h_1$, $h_2$, --- $h_{32}$) expected by an output line.

Figure 9:
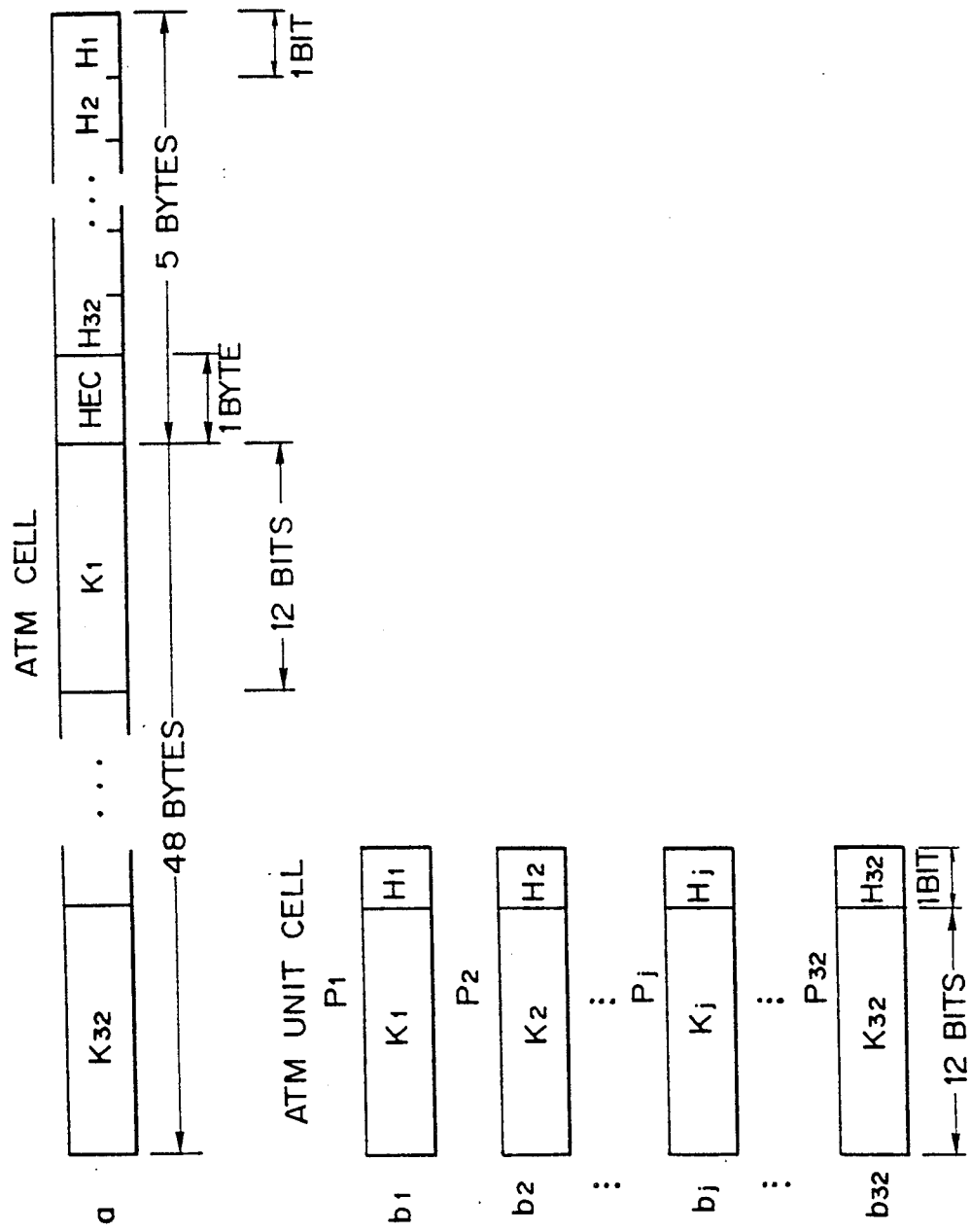
FIG. 9 shows an output signal of an ATM cell divider in an embodiment of the first principle.

FIG. 9 shows an example of an output signal of an ATM cell divider of an embodiment of the first principle of the present invention. In FIG. 9, a 4-byte header part is divided into 1-bit headers and a 48-byte (384-bit) information part is divided into 12-bit information, and the resultant 32 unit cells are outputted from the ATM cell divider 25.

Figure 10:
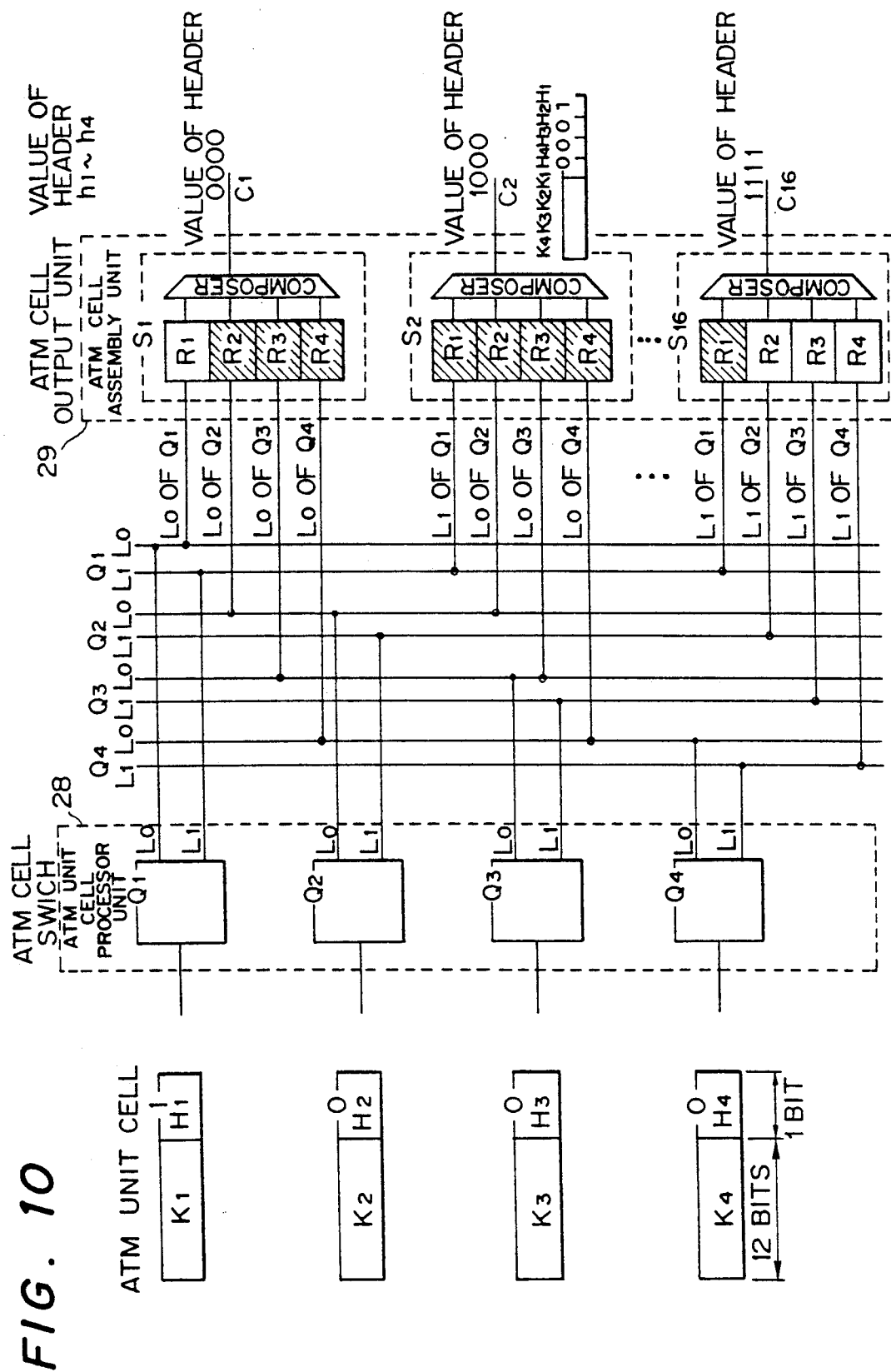
FIG. 10 shows a configuration of an ATM cell switch and an ATM cell output unit.

FIG. 10 shows an example of a configuration of the ATM cell switch 28 and the ATM cell output unit 29 when, in the first principle, an ATM has a 4-bit header part. For example, if an ATM cell having 4 header bits ($H_1=1$, $H_2-H_4=0$ respectively) is inputted, unit cells allotted by the ATM cell switch 28 are assembled by assemblers of the ATM cell assembler $S_2$ and outputted to an output line $C_2$ as an ATM cell.

Figure 11:
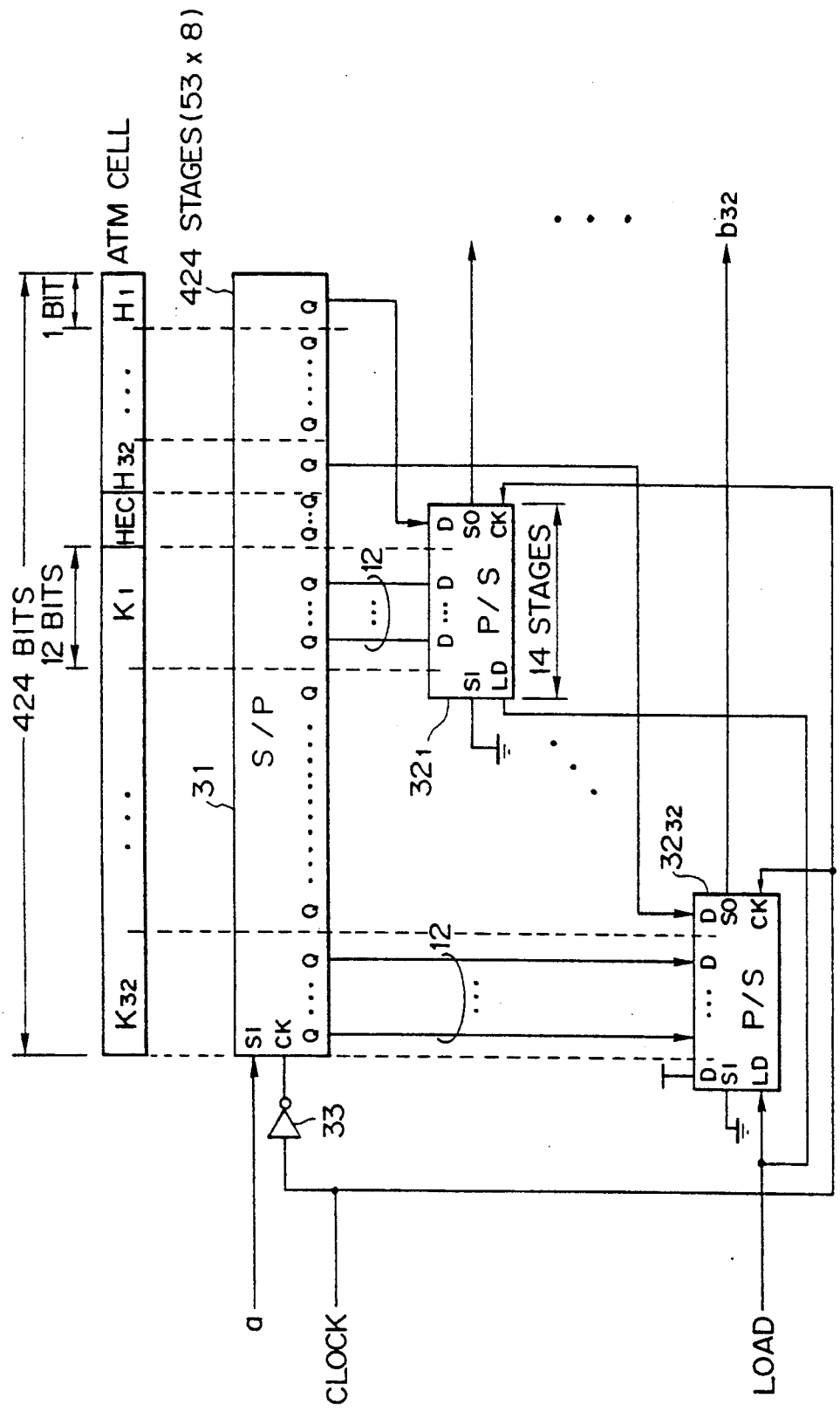
FIG. 11 shows a circuit configuration of an ATM cell divider in an embodiment in the first principle.

FIG. 11 shows a circuit configuration of an ATM cell divider in an embodiment of the first principle. In FIG. 11, an ATM cell divider comprises a serial-in/parallel-out shift register 31 where ATM cells are serially inputted on a serial input S/I in response to a clock CK. A total of 32 parallel/serial switches or shift registers P/S 32, ---$32_{32}$ are provided a part of parallel outputs and outputs of a serial-in/parallel-out shift register 31 are inputted and unit cells are outputted, at $b_1$ to $b_{32}$ and an inverter 33 for generating inverse signals of a clock.

Figure 12:
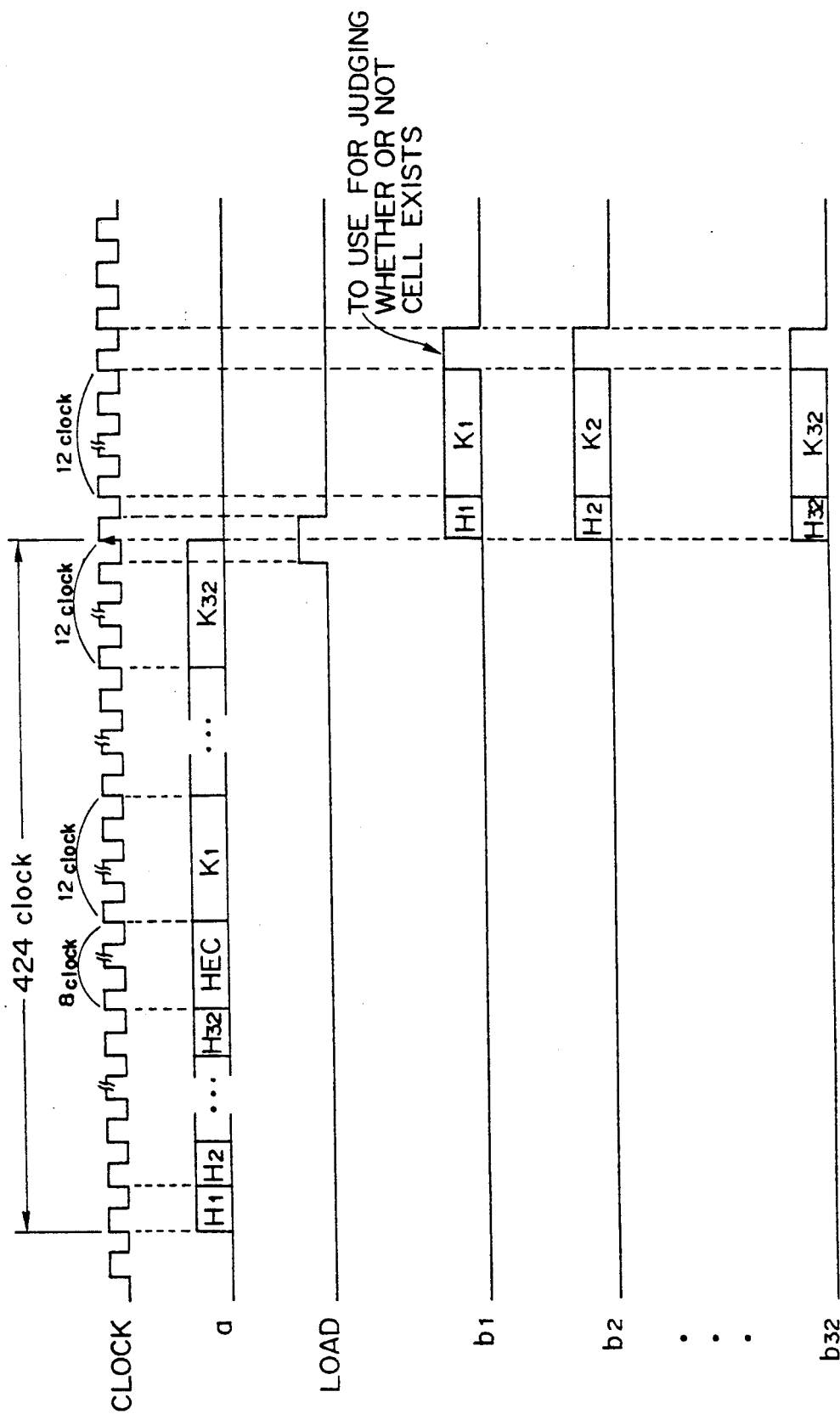
FIG. 12 shows a time chart for explaining the division of cells by an ATM cell divider in an embodiment of the first principle.

FIG. 12 shows a time chart for explaining the division of cells by the ATM cell divider shown in FIG. 11. The operation of the ATM cell divider is explained below in association with FIGS. 11 and 12.

In FIG. 11, an ATM cell is applied to serial input terminals of the serial parallel switch 31 and inputted in a bit synchronously with an inverse signal of the clock. As an ATM cell comprises 424 bits, a total of 424 clocks are required to input a whole cell. When a whole cell is inputted, load signals are inputted to 32 parallel/serial switches $32_1$, --- $32_{32}$, and thus data are inputted from the serial-in/parallel-out shift register 31 to these switches. Parallel-inputted data are those in the leading 1 bit in the header part and the leading 12 bits in the information part, in the case of a parallel/serial switch $32_1$ for example. In addition, another 1 bit is inputted to indicate the existence of cell data to be used during the assembly by the cell assembler.

Then, unit cells parallel-inputted to each of parallel/serial switches $32_1$, --- $32_{32}$ are outputted from output lines $b_1$, --- $b_{32}$ synchronously with a clock signal. This unit cell comprises a total of 14 bits; a 1-bit header part, a 12-bit information part, and an additional bit to be used for determining the existence of a cell.

The header error control data (HEC) applied to the serial-in/parallel-out shift register 31 are added at the sending side of ATM cells, and these data are already checked for transmission error prior to inputting to the ATM switch circuit, thus requiring no additional process at an ATM cell divider. When cells are assembled and outputted by an ATM cell composer, the HEC must be added as described later.

Figure 13:
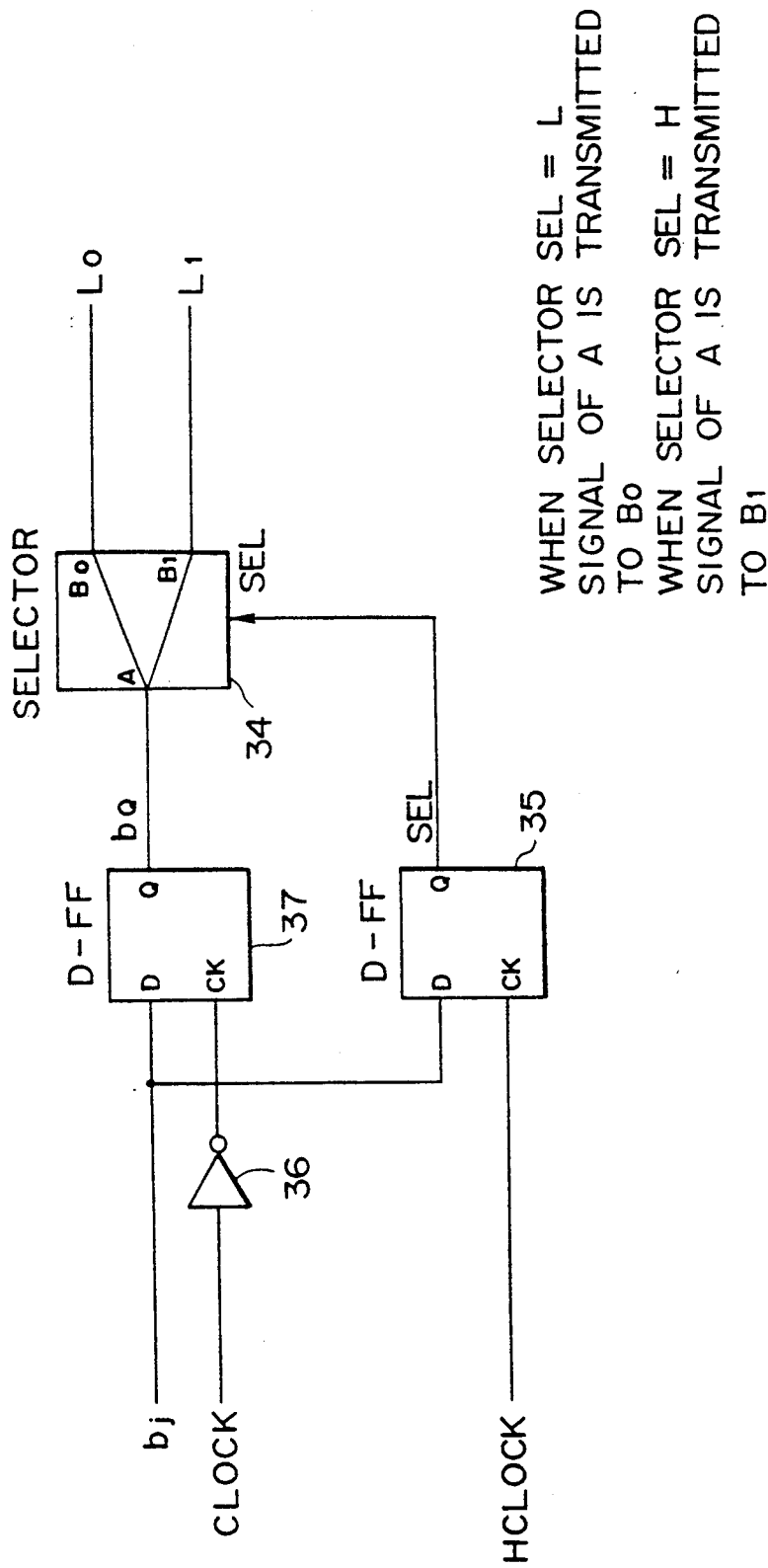
FIG. 13 shows a circuit configuration of an ATM unit cell processor in an embodiment of the first principle.

FIG. 13 shows a circuit configuration of the ATM unit cell processor in an embodiment of the first principle. In FIG. 13, the unit cell processor comprises a selector 34 for outputting inputted unit cells to either of two output terminals, a D flip flop 35 for outputting a selection control signal to the selector 34, a D flip flop 37 for outputting the contents of unit cells in a bit to the selector 34 synchronously with an inverse signal of the clock generated by the inverter 36.

Figure 14:
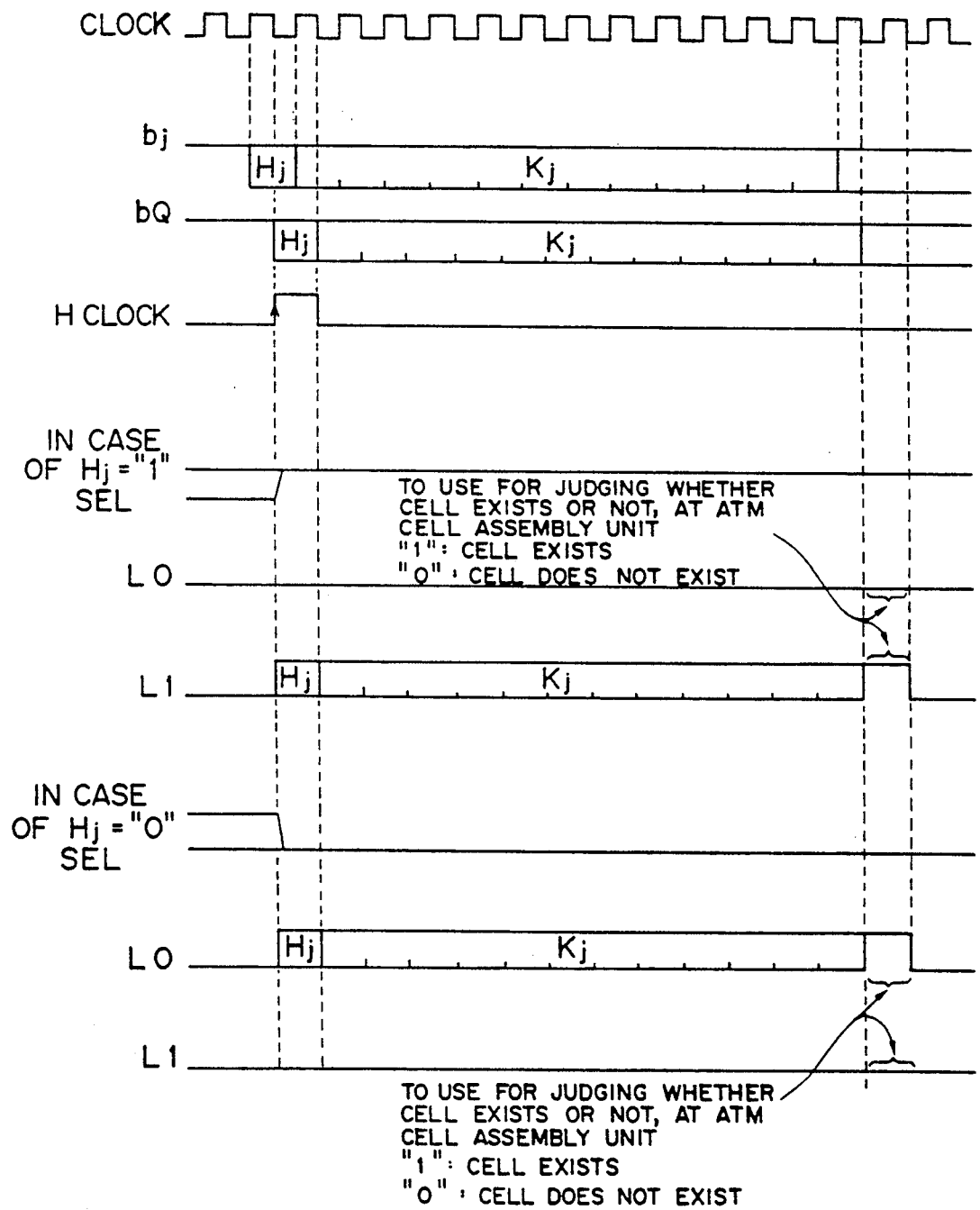
FIG. 14 shows a time chart for explaining the switch of cells by an ATM unit cell processor in an embodiment of the first principle.

FIG. 14 shows a time chart for explaining the switch of cells by the unit cell processor shown in FIG. 13. The operation of the unit cell processor is explained below with reference to FIGS. 13 and 14.

As shown in FIG. 13, the contents of unit cells are inputted in a bit to the D flip flop 37 synchronously with an inverse signal of the clock. The first 1 bit of a unit cell is a header part. The value of the header part "1" or "2" determines to which output terminal of the selector 34 the whole unit cell is to be outputted. That is, in FIG. 13, a header clock is applied to the D flip flop 35 when 1-bit header part is inputted thus outputting a selection control signal to the selector 34. When the header part indicates "1", the selection control signal also indicates "1", causing the selector to be switched to the output terminal $L_1$. When the header part indicates "0", the selection control signal also indicates "0", and the selector is switched to the output terminal $L_0$. Thus, the switch of the selector is completed, and the whole unit cells are outputted to either of two output terminals of the selector 34.

Figure 15:
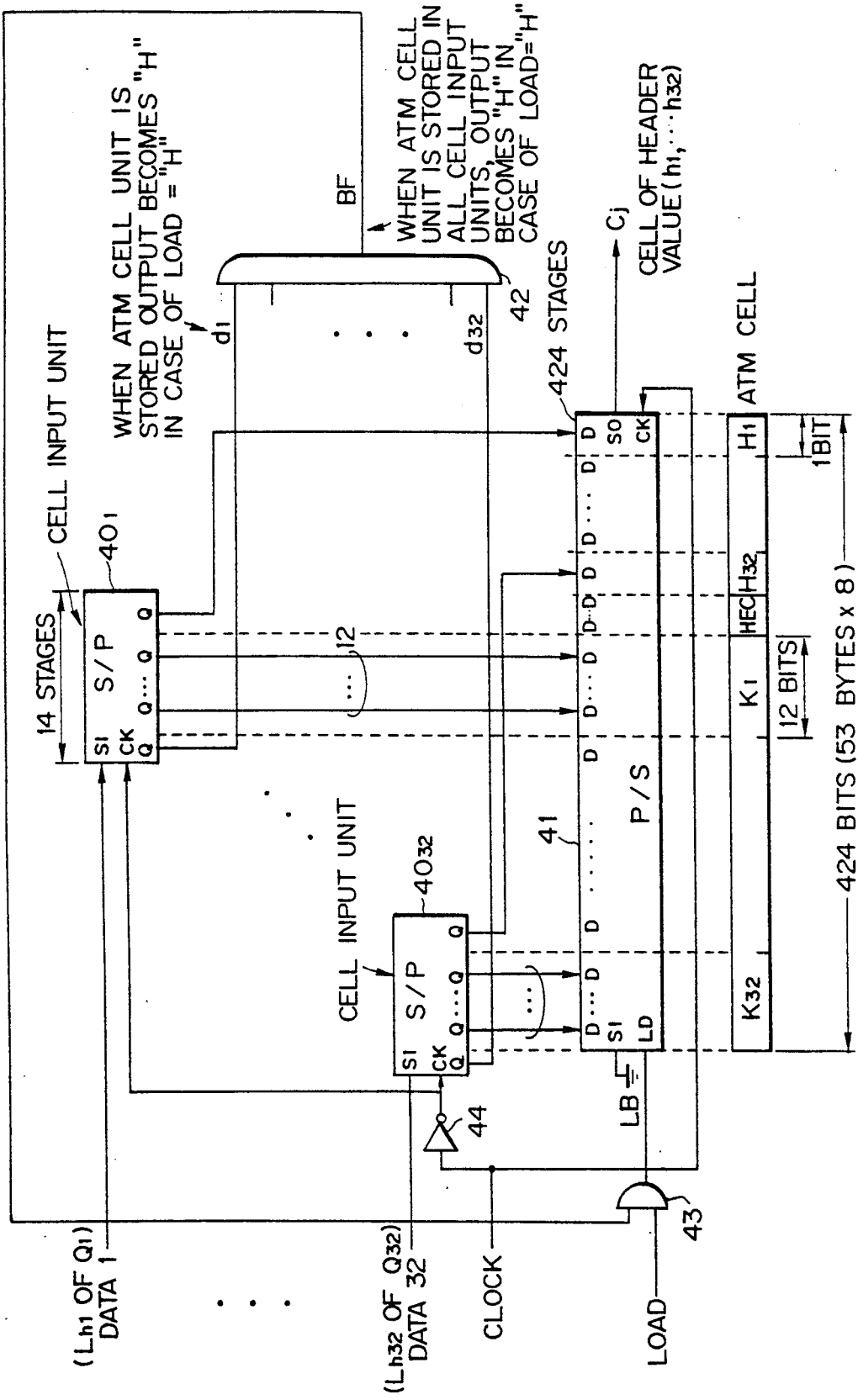
FIG. 15 shows a circuit configuration of an ATM cell composer in an embodiment of the first principle.

FIG. 15 shows a circuit configuration of the ATM cell composer in an embodiment of the first principle. As shown in FIG. 15, the cell composer comprises an HEC operating unit 39 for generating header error control data (HEC) when a total of 32 bits of header parts of all unit cells are inputted to a parallel/serial switch 41 to be described later and outputting them to the parallel/serial switch 41, 32 serial/parallel switches $40_1$, --- $40_{32}$ to which unit cells are serial-inputted from the ATM cell switch 26, a parallel/serial switch 41 to which parallel outputs of these serial/parallel switches are inputted and ATM cells are outputted to output lines, an AND gate 42 to which all bits indicating the existence of cells in unit cells are inputted from 32 serial/parallel switches, an AND gate 43 to which outputs of the AND gate 42 and data load signals to the parallel/serial switch 41 are inputted, and an inverter 44 for generating an invert signal of the clock.

Figure 16:
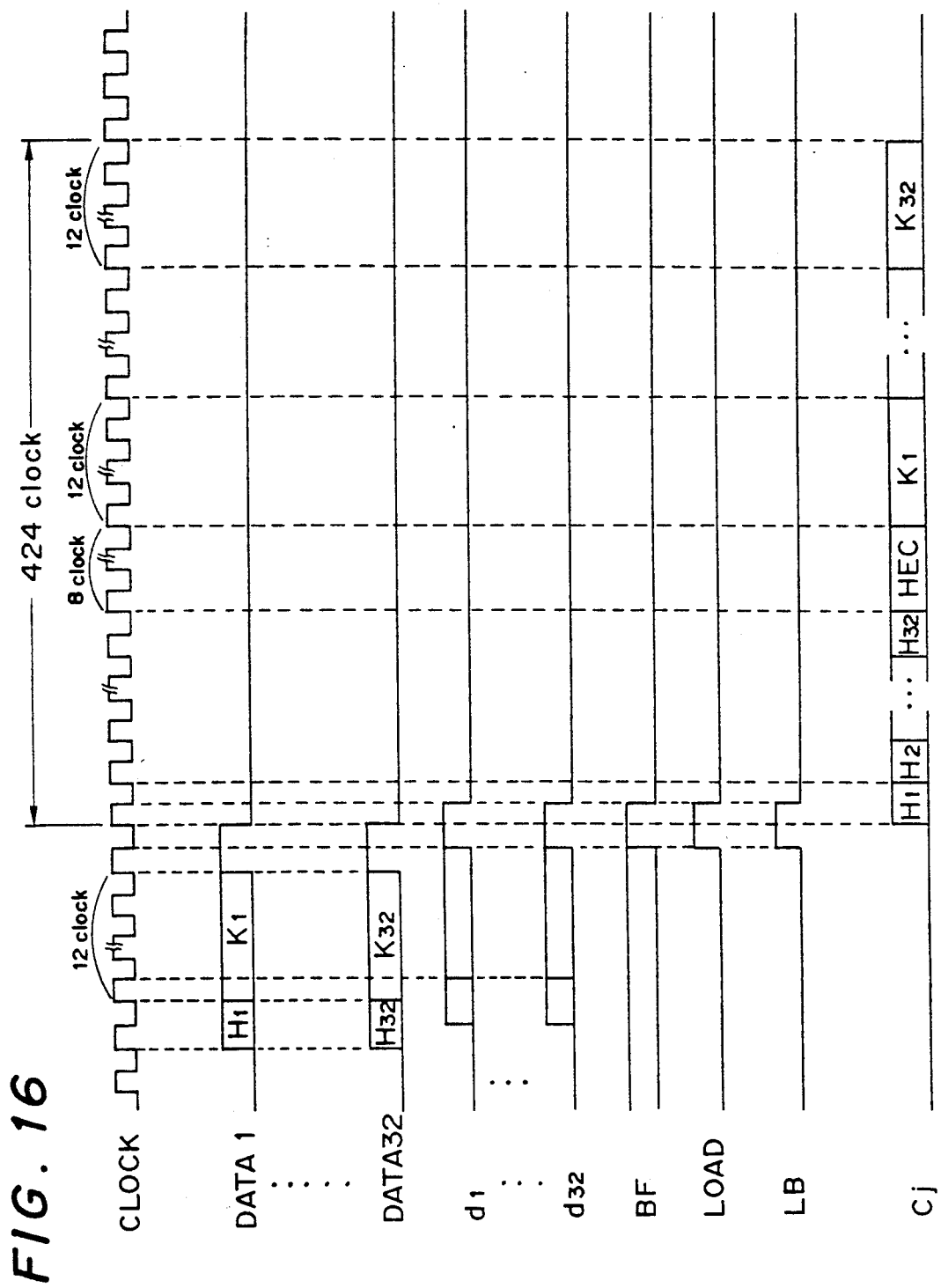
FIG. 16 shows a time chart for explaining the assembly of a cell by an ATM cell composer in an embodiment of the first principle.

FIG. 16 shows a time chart for explaining the assembly of a cell by the cell composer shown in FIG. 15. The operation of the cell composer is explained below in association with FIGS. 15 and 16.

As shown in FIG. 15, each of nit cells outputted from the ATM cell switch is serial-inputted in a bit to 32 cell input units $40_1$, --- $40_{32}$ synchronously with an inverse signal of the clock. A unit cell comprising a 1-bit header part, a 12-bit existence of a cell is inputted into respective input units during the 14 clock periods. Of the inputted data, the last 1 bits, that is, the bits indicating the existence of a cells are all outputted to the AND gate 42. When all these bits indicate "1", referring to the existence of cells, the output of the AND gate is "H". The n, the data load signal to the parallel/serial switch 41 is "H" as shown in FIG. 16, and data are parallel-inputted to the parallel/serial switch 41. At this time, the parallel-inputted data comprises a total of 13 bits; a 1-bit header part and a 12-bit information part from, for example, the cell input unit $40_1$. The data are grouped to a header part and an information part respectively by the parallel/serial switch 41, and parallel-inputted such that they are arranged in the same order as the cells inputted to the switch circuit. Then, data stored in the parallel/serial switch 41 are outputted sequentially in a bit synchronously with a clock signal, thus completing the output of all the whole ATM cells using 424 clocks.

The header error control data (HEC) added to the parallel/serial switch shown in FIG. 15 are outputted from the HEC operating unit 39 immediately after a data load (LOAD) signal shown in FIG. 16 turns to 'H', but the timing is not indicated there. The HEC can be applied to the parallel/serial switch 41 without using the HEC operating unit 39 by storing in a flip flop the HEC as inputted to the serial-in/parallel-out shift register 31 as shown in FIG. 11. However, as the process of the HEC is not related directly to the present invention, the explanation and illustration of the HEC operating unit is skipped hereafter.

Figure 17:
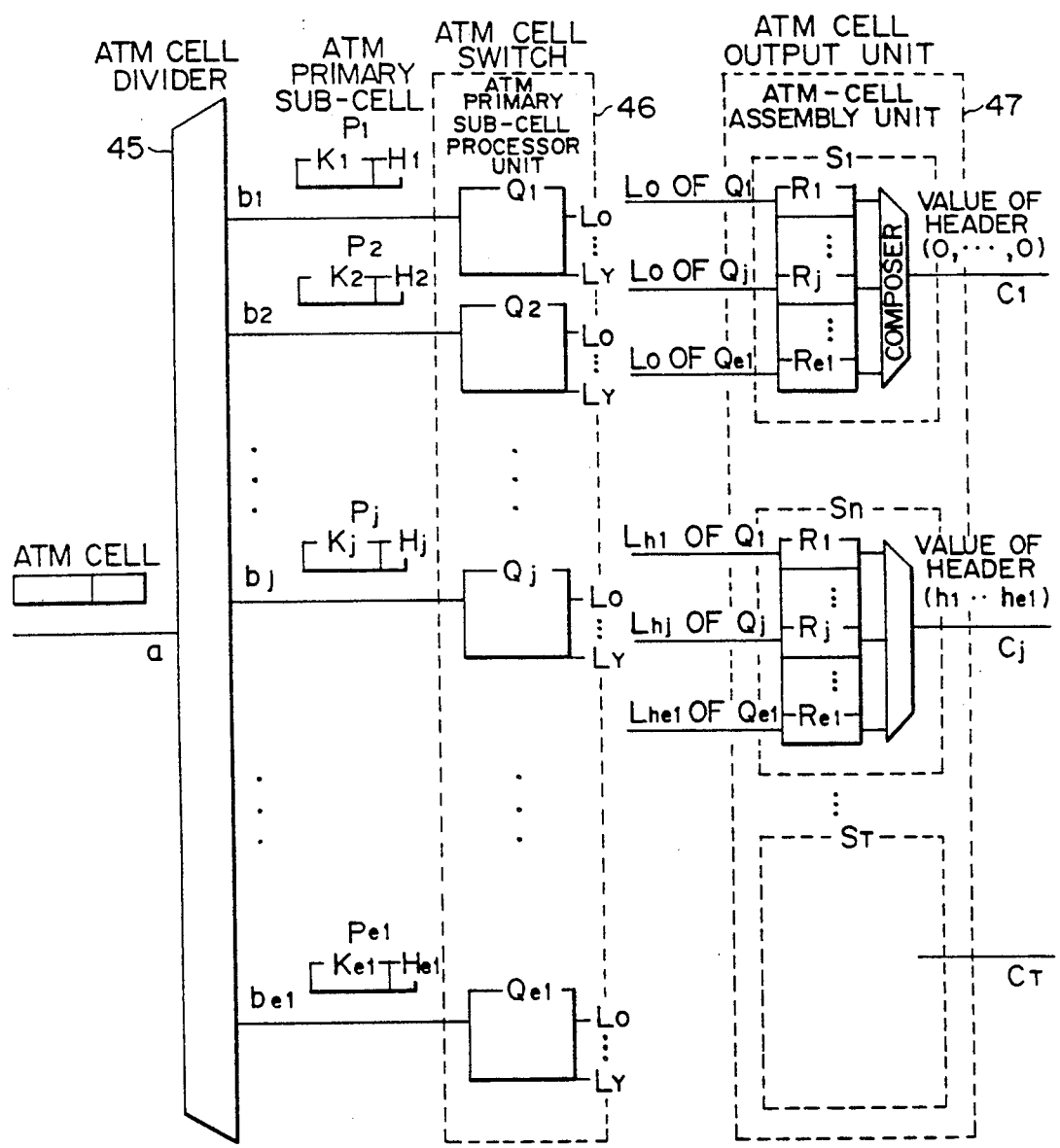
FIG. 17 shows a block diagram of a configuration in an embodiment of the second principle.

FIG. 17 shows a block diagram of a configuration of an embodiment of the second principle. This embodiment comprises an ATM cell divider 45, an ATM cell switch 46, and an ATM cell output unit 47. The ATM cell divider 45 divides an ATM cell, except the HEC of an ATM cell, comprising a 32-bit header part and a 384-bit information part by $e_1$ ($e_1$ is a divisor of 32 other than 1 and 32) into $e_1$ ($P_1$, $P_2$, --- $P_{e_1}$) ATM primary sub-cells each having $a^n f_1$ ($f_1 = 32/e_1$)-bit length header part $H_j$ ($j = 1-e_1$) and a $g_1$ ($g_1 = 384/e_1$)-bit length information part $K_j$ ($j = 1-e_1$), and then outputs these primary sub-cells from the output $b_j$ ($j = 1-e_1$).

The ATM primary sub-cell processor is provided with $Z = 2^n$ outputs $L_0$, $L_1$, --- $L_Y$ ($Y = Z - 1$) for the inputs of ATM primary sub-cells, and allots the ATM sub-cells to any of the outputs $L_{hj}$ ($L_0$, $L_1$, --- $L_Y$) according to the value $h_j$ of the header part $H_j$ of an ATM primary sub-cell.

The ATM cell switch 46 comprises $e_1$ ($Q_1$, $Q_2$, ---$Q_{e_1}$-$Q_{e_1}$) ATM primary sub-cell processors, and $b_j$ ($j = 1-e_1$) is connected to each $Q_j$ ($j = 1-e_1$) where an ATM primary sub-cell $P_j$ ($j = 1-e_1$) is inputted.

The ATM cell composer comprises $e_1$ $f_1 + g_1$-bit ATM cell (each comprising an $f_1$-bit header part and $g_1$-bit information part) input units and assemblers for assembling ATM cells only when ATM primary sub-cells are inputted to all of ATM cell input units ($R_1$, $R_2$, --- $R_{e_1}$). The ATM cell output unit 47 comprises T ($S_1$, --- $S_T$)(T: number of output lines) ATM cell composers, and an ATM cell having the header value ($h_1$, $h_2$, --- $h_{e_1}$) is outputted to the output $C_j$ in the ATM cell output unit by inputting the output $L_{hj}$ of the ATM primary sub-cell processor $Q_j$ ($j = 1-e_1$) to the ATM cell input unit $R_j$ ($j = 1-e_1$) according to the ATM sub-cell header value ($h_1$, $h_2$, --- $h_{e_1}$) expected by an output line.

Figure 18:
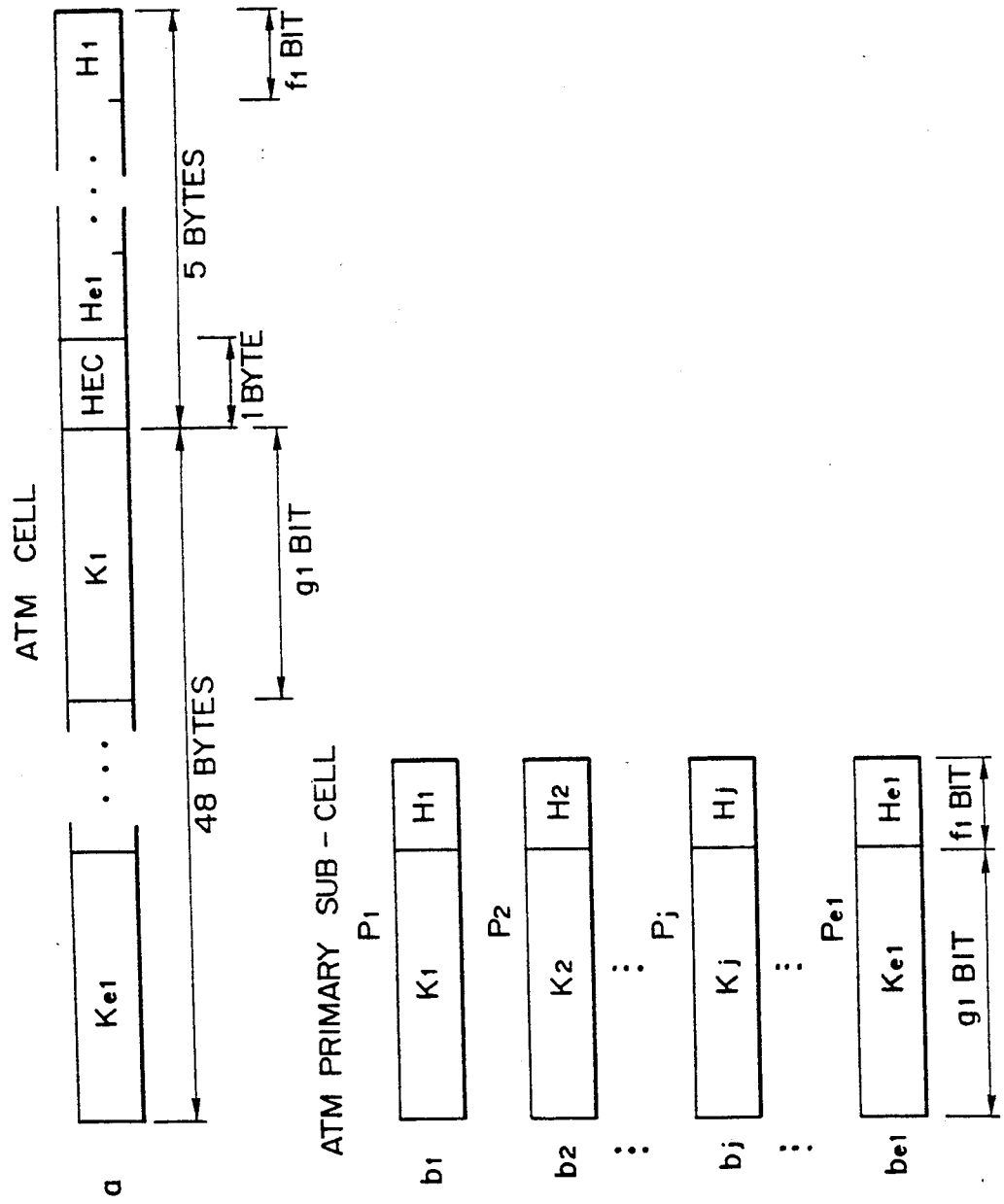
FIG. 18 shows an example of an output signal of an ATM cell divider in an embodiment of the second principle.

FIG. 18 shows an example of an output signal of an ATM cell divider 45 in an embodiment of the second principle. In FIG. 18, $f_1 = 32/e_1$ and $g_1 = 384/e_1$ wherein $e_1$ is a measure of 32 except 1 and 32; In FIG. 18, a 32-bit header part and a 384-bit information part of an ATM cell is divided by $e_1$, a divisor of 32 other than 1 and 32, into $e_1$ primary sub-cells each comprising $a^n$ $f_1$-bit header part and a $g_1$-bit information part.

Figure 19:
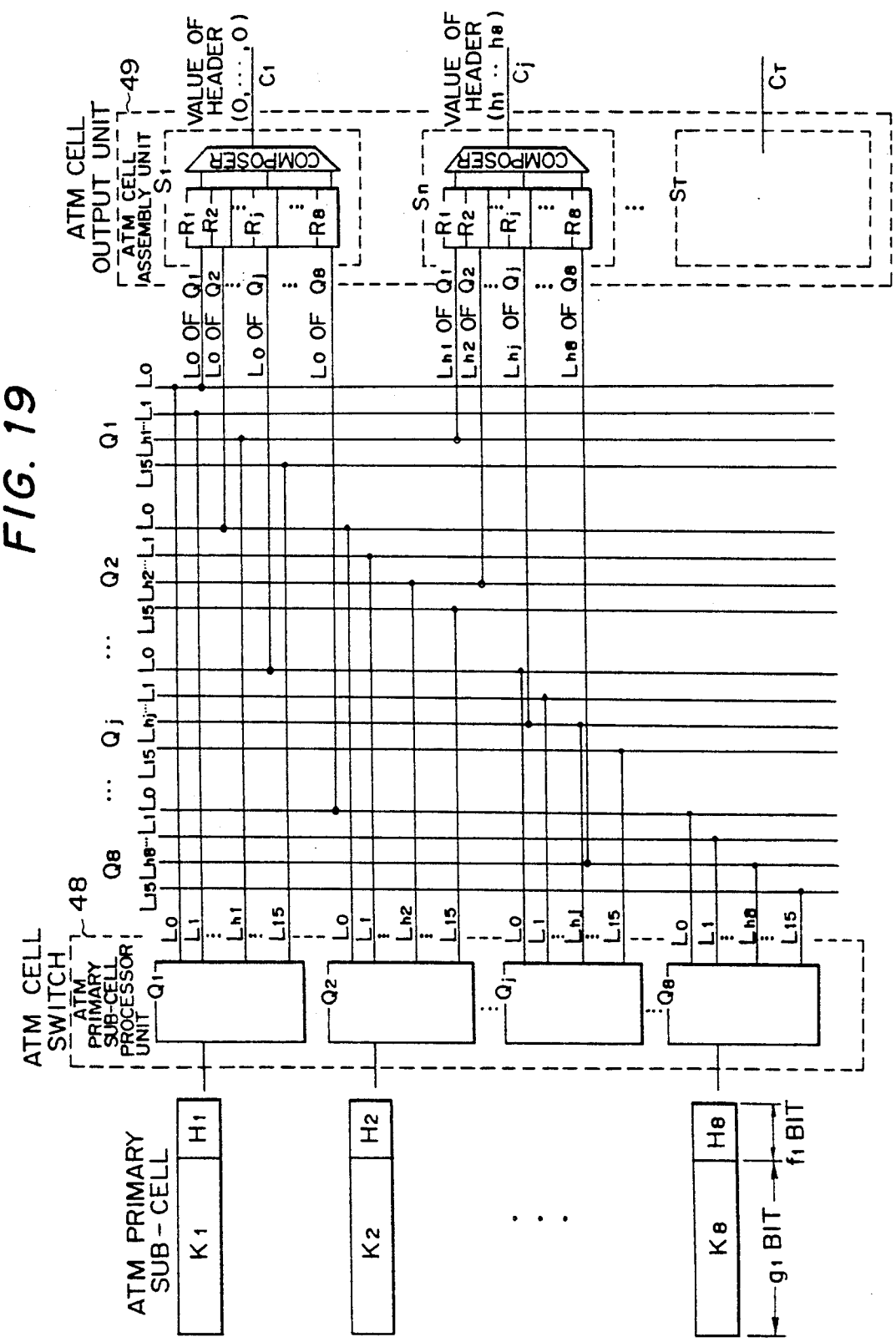
FIG. 19 shows a block diagram for explaining a configuration of an ATM cell switch and an ATM cell output unit in an embodiment of the second principle.

FIG. 19 shows a block diagram for explaining a configuration of the ATM cell switch 46 and the ATM cell output unit 47 in an embodiment according to the second principle. In FIG. 19, the value of $e_1$ is assumed to be 8; the header part of a primary sub-cell comprises $f_1 32/e$, =4 bits; and the information part comprises $g_1 = 384/e_1 = 48$ bits. Each of ATM primary sub-cell processors in the ATM cell switch 48 is provided with $2^n$, that is, 16 output terminals. Primary sub-cells to be inputted to processors are outputted to any of 16 output terminals according to each item of header data. The number of ATM primary sub-cell processors is 8, and 8 input lines to each of ATM cell composers in the ATM cell output unit 49 are connected to the output terminals of the ATM primary sub-cell processors in the ATM cell switch 48 according to the header values corresponding to output lines.

Figure 20:
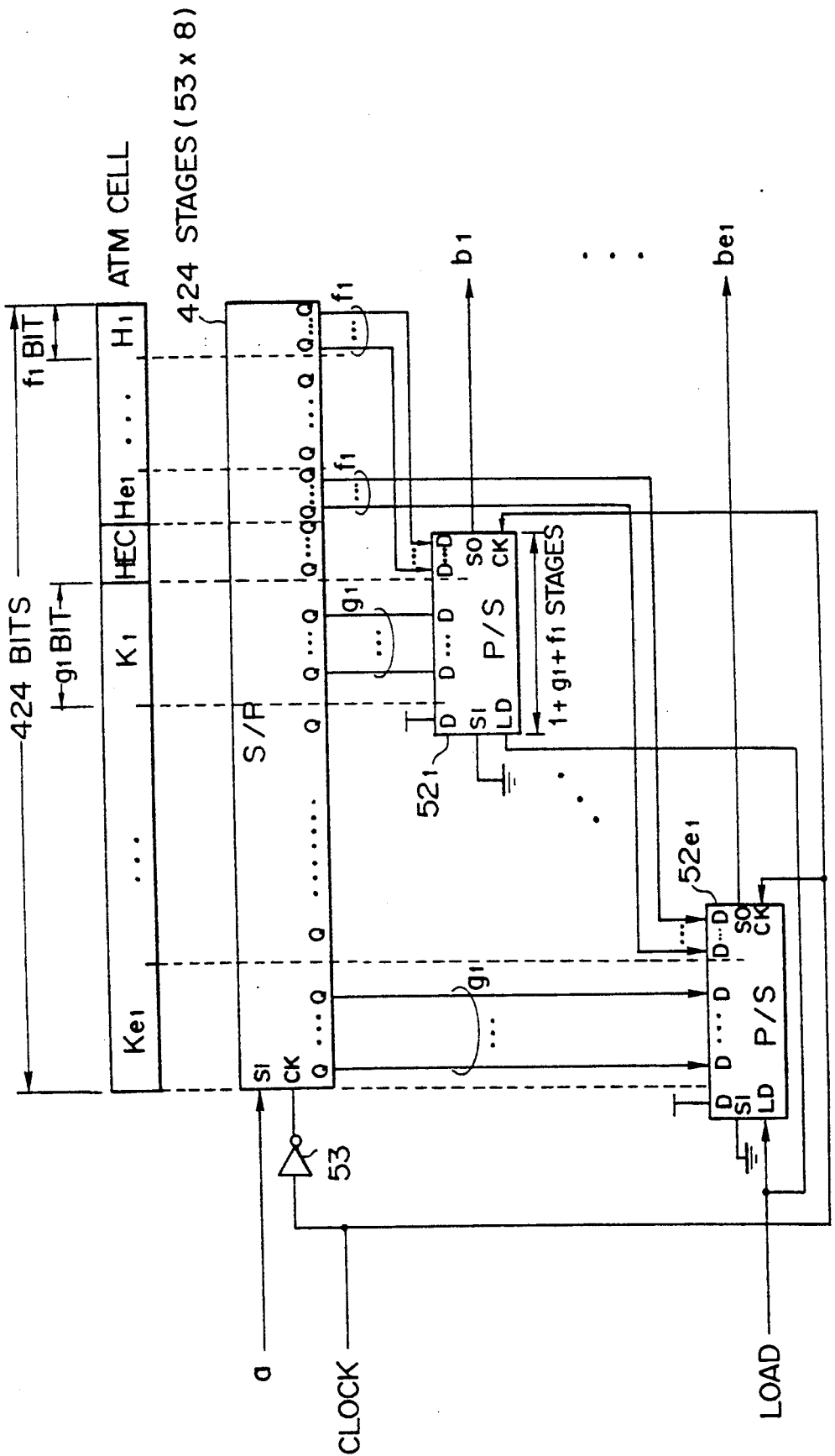
FIG. 20 shows a circuit configuration of an ATM cell divider in an embodiment of the second principle.
Figure 21:
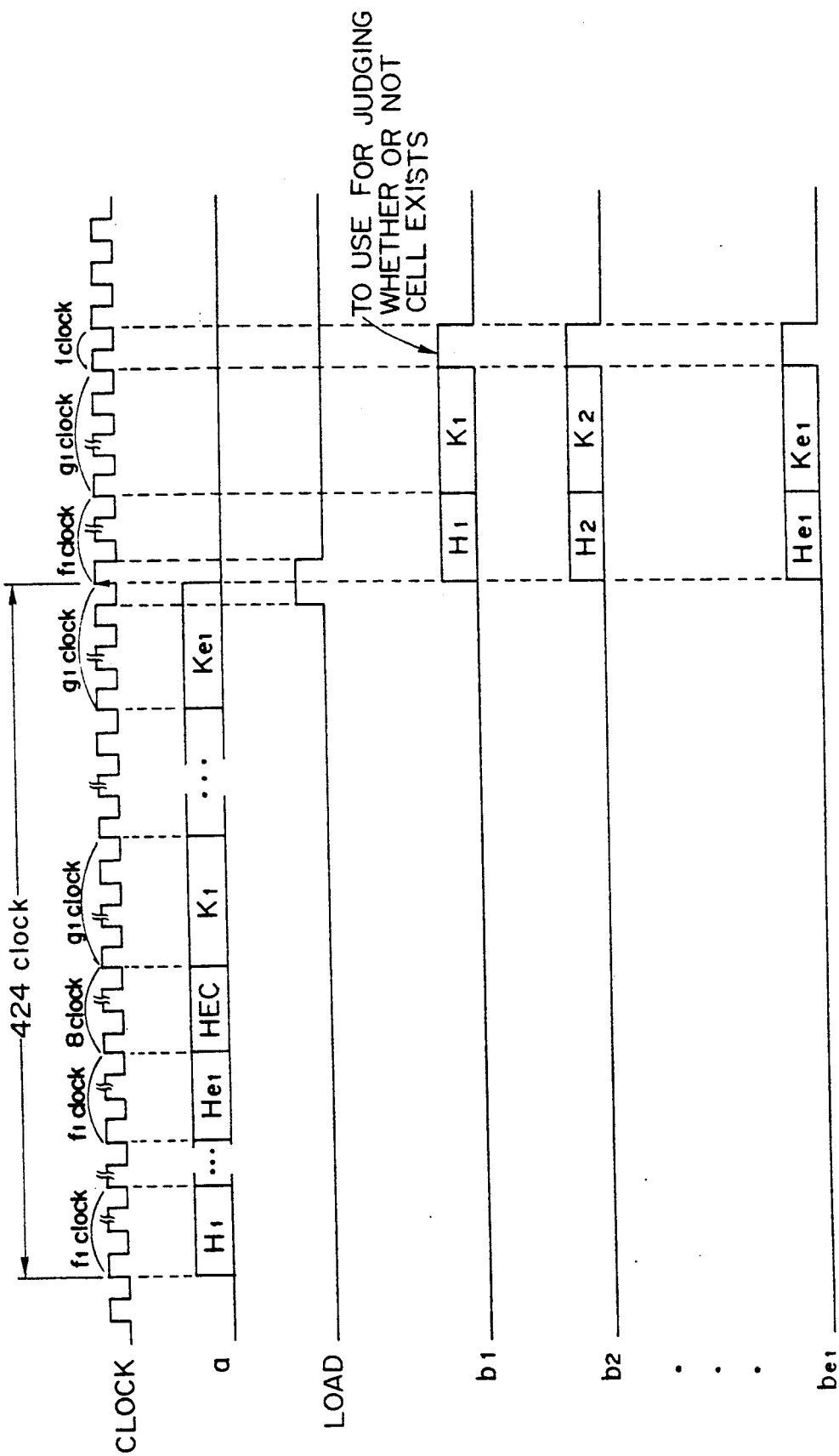
FIG. 21 shows a time chart showing the division of cells by an ATM cell divider in an embodiment of the second principle.

FIG. 20 shows a circuit configuration of an ATM cell divider in an embodiment of the second principle; FIG. 21 shows a time chart of the division of cells by the cell divider. In FIG. 20, $f_1 = 32/e_1$ and $g_1 = 384/e_1$ wherein $e_1$ is an integer. The operation of the cell divider is explained in association with the operation of a cell divider in an embodiment of the first principle shown in FIGS. 11 and 12.

In FIG. 20, the cell divider comprises a switch 51 corresponding to the serial-in/parallel-out shift register 31 in FIG. 11, $e_1$ switches $52_1$, --- $52_{e1}$ corresponding to the 32 parallel/serial switches $32_1$, --- $32_{32}$, and an inverter 53 corresponding to an inverter 33. The difference from FIG. 11 is that an $f_1$-bit header part and a $g_1$-bit information part are parallel-inputted from the serial-in/parallel-out shift register 51 to each parallel/serial switch such that each of parallel/serial switches $51_1$, --- $51_{e2}$ outputs primary sub-cells. The last 1 bit is added to an outputted primary sub-cell to indicate the existence of a cell as in FIGS. 11 and 12. Therefore, the clock count for outputting primary sub-cells as shown in FIG. 21 is equal to $f_1+g_1+1$.

Figure 22:
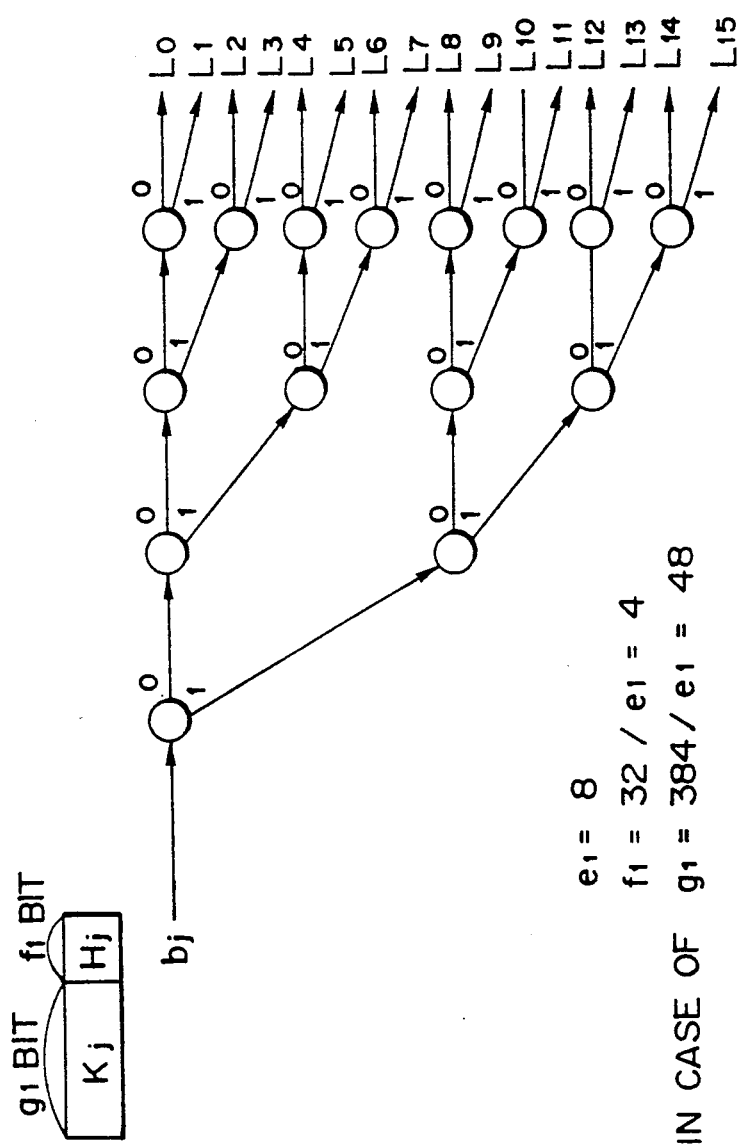
FIG. 22 shows an example of a circuit configuration of a primary ATM sub-cell processor in an embodiment of the second principle.

FIG. 22 shows an example of a circuit configuration of a primary ATM sub-cell processor in the ATM cell divider 46 shown in FIG. 17. In this example, a configuration of a single-input multi-gate type circuit is shown as in FIGS. 3 and 4. The operation of this circuit is as described before, so the explanation is skipped here. Since there remains a problem with this circuit in that it is not always applicable to an LSI system, it is desirable to configure the primary sub-cell processors in a more hierarchical structure, which is described later as an embodiment of the third principle.

Figure 23:
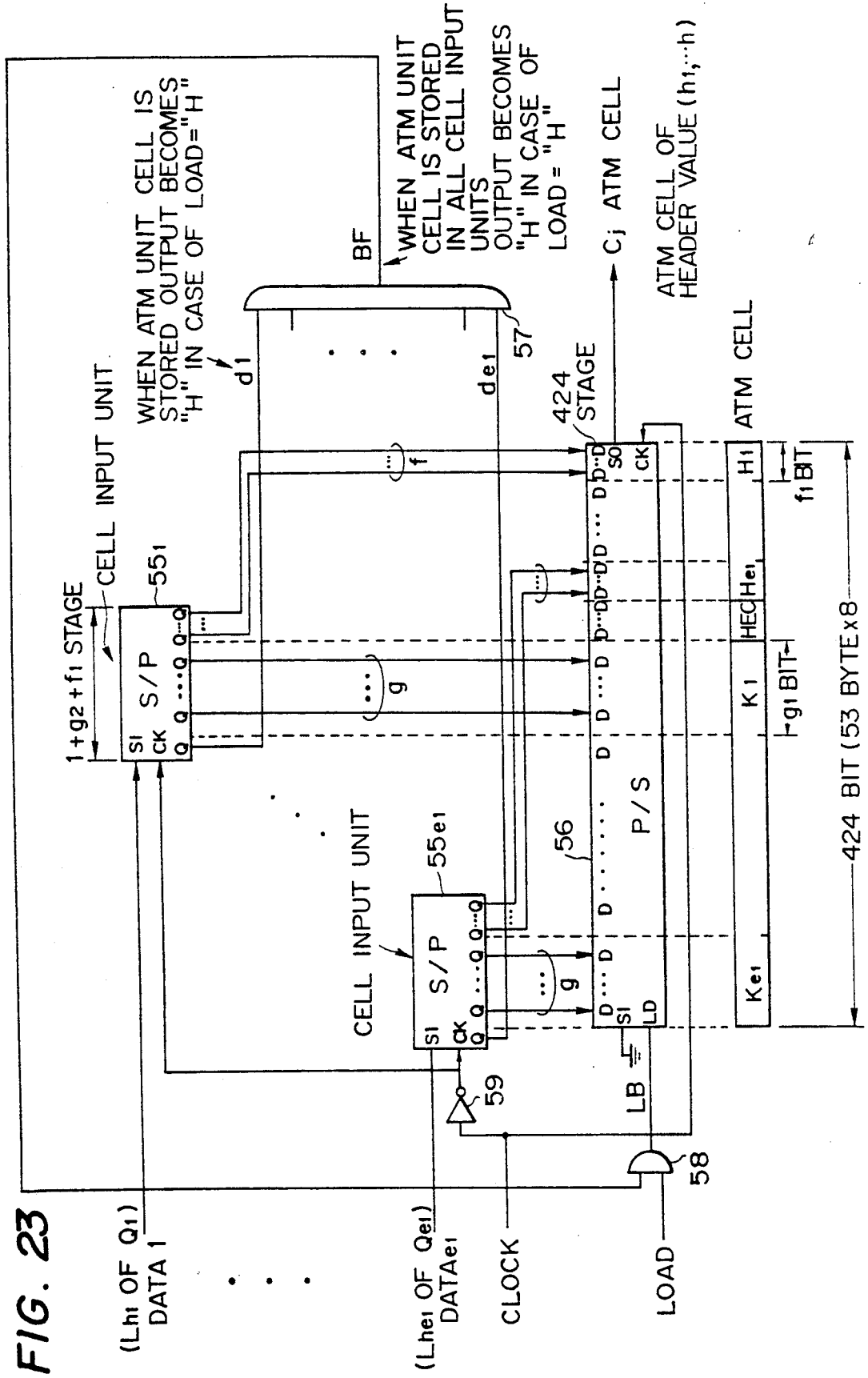
FIG. 23 shows a circuit configuration of an ATM cell composer in an embodiment of the second principle.
Figure 24:
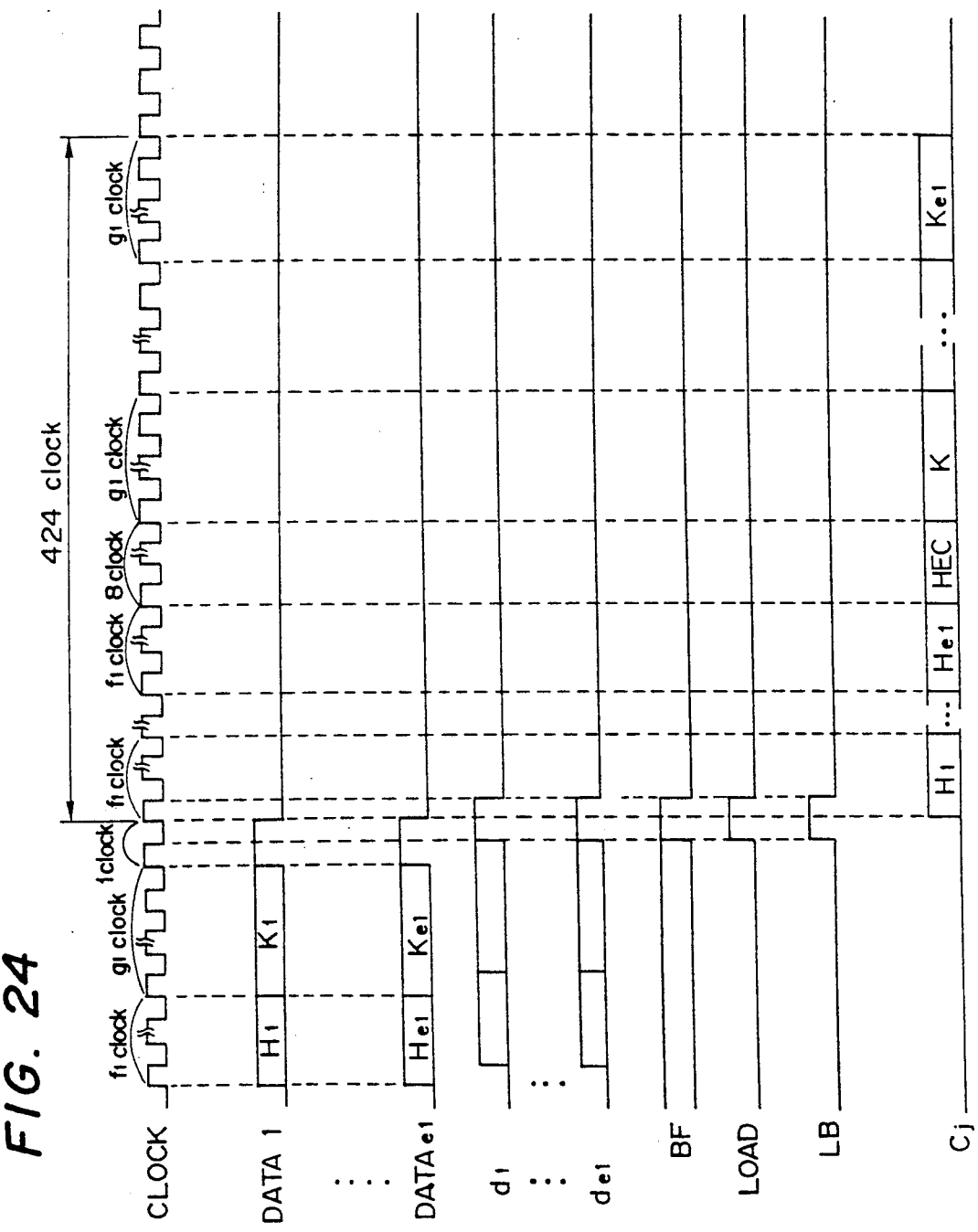
FIG. 24 shows a time chart for explaining the division of cells by an ATM cell composer in an embodiment of the. second principle.

FIG. 23 shows a circuit configuration of an ATM cell composer in an embodiment of the second principle; FIG. 24 shows a time chart for explaining the composition of cells by the cell composer. The operation of the composer is explained in comparison with the embodiment of the first principle shown in FIGS. 15 and 16.

The cell composer in FIG. 23, as in FIG. 15, comprises $e_1$ cell input units $55_1$, --- $55_{e1}$, a parallel/serial switch 56, AND gates 57 and 58, and an inverter 59. The difference from FIG. 15 is that cells to be inputted to each of cell input units are primary sub-cells each comprising an $f_1$-bit header part, a $g_1$-bit information part, and a bit indicating the existence of a cell. Therefore, the clock count for inputting a primary sub-cell in FIG. 24 is equal to $f_1+g_1+1$ compared with 14 in FIG. 16.

Figure 25:
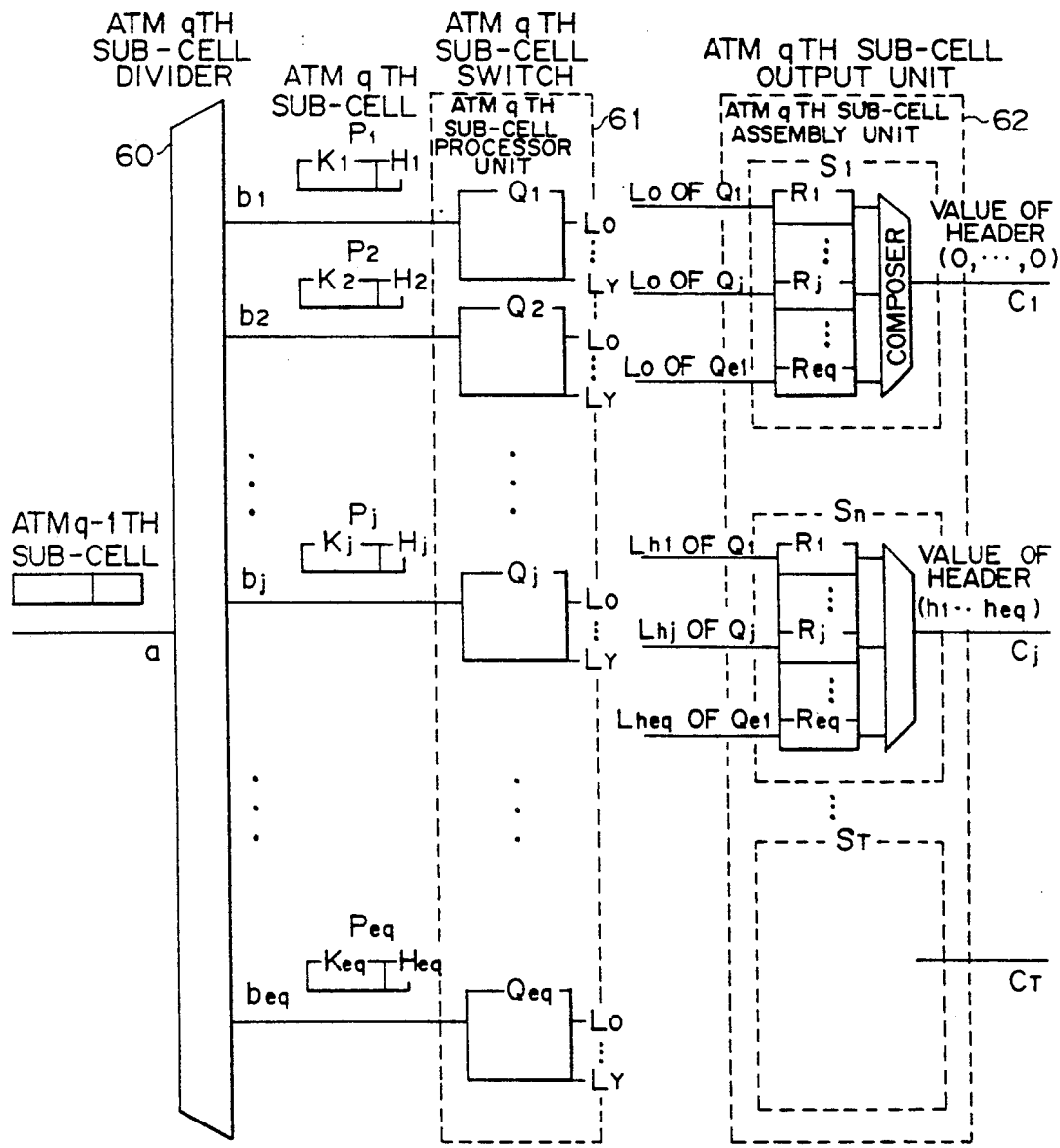
FIG. 25 shows a block diagram for explaining a configuration of an embodiment of a (q−1)th ATM sub-cell processor in an embodiment of the third principle.

FIG. 25 shows a configuration of an embodiment of a (q−1)th ATM sub-cell processor in an embodiment of the third principle. In FIG. 25, if q=2, a detailed configuration without a multi-gate type circuit is used as an ATM cell switch system is shown in configuration of $e_1$ ATM primary sub-cell processors in the ATM cell switch 46 shown in FIG. 17, which is different from FIG. 22. The (q−1)th ATM sub-cell processor comprises a qth ATM sub-cell divider 60, a qth ATM sub-cell switch 61, and a qth ATM sub-cell output unit 62.

The qth ATM sub-cell divider 60 divides a q−1th ATM sub-cell comprising an $f_{q-1}$ (if q=2, $f_1=32/e_1$: $e_1$ is a divisor of 32 except 1 and 32)-bit header part and a $g_{q-1}$ ($g_1=384/e_1$: $e_1$ is a divisor of 32 other than 1 and 32)-bit information part by $e_q$ ($e_q$ is a divisor of $e_{q-1}$ other 1 and $e_{q-1}$) into $e_q$ ($P_1$, $P_2$, --- $P_{eq}$) qth ATM sub-cells each comprising an $f_q$ ($f_q=f_{q-1}/eq$)-bit header part $H_j$ (j=1-$e_q$) and a $g_q$ ($g_q=g_{q-1}/e_1$)-bit information part $K_j$ (j=1-$e_q$), and outputs each of qth sub-cells from any of the output terminals $b_j$ (j=1-$e_q$).

The qth ATM sub-cell processor is provided with $Z=2^{fq}$ outputs $L_0, L_1, ... L_Y (Y=Z-1)$ for the inputs of qth ATM sub-cells, and allots the ATM sub-cells to the outputs $L_{hj}$ according to the values $h_j$ of the header part $h_j$ of qth ATM sub-cells.

The qth ATM sub-cell switch 61 comprises $e_q$ qth ATM sub-cells processors ($Q_1, Q_2, --- Q_{eq}$), and $b_j$ (j=1-$e_q$) are connected to $Q_j$ (j=1-$e_q$) where qth ATM sub-cells $P_j$ are inputted.

A qth ATM sub-cell composer comprises $e_q$ qth $f_q=g_q$-bit ATM sub-cell ($R_1, R_2, --- R_{eq}$) (each comprising an $f_q$ bit header part and a $g_q$-bit information part) input units and assemblers for assembling q−1th ATM sub-cells only when qth ATM sub-cells are inputted to all of ATM cell input units ($R_1, R_2, --- R_{eq}$).

The qth ATM sub-cell output unit 62 comprises T ($S_1, --- S_t$)(T: the number of output lines of q−1th ATM sub cell processors; that is, if q=2, the number of output lines of the primary ATM sub-cell processors shown in FIG. 17 is equal to Y+1) qth ATM sub-cell composers. In each of qth ATM sub-cell composers $S_n$ (n=1-T), q−1th ATM sub-cells having the header value ($h_1, h_2, ---, h_{eq}$) can be outputted to the output $C_j$ of the qth ATM sub-cell output unit by inputting the output $L_{hj}$ of the qth ATM sub-cell processor $Q_j$ (j=1-$e_q$) to the qth ATM sub-cell input unit $R_j$ (j=1−$e_q$) according to the q−1th ATM sub-cell header value ($h_1, h_2, --- h_{eq}$) expected by an output line.

In the configuration of the qth (q≧2) ATM sub-cell processors, sub-cell processors can be configured in a more hierarchical structure by increasing the value of q in FIG. 25 without using a multi-step gate type circuit in a conventional ATM cell switch system.

Figure 26:
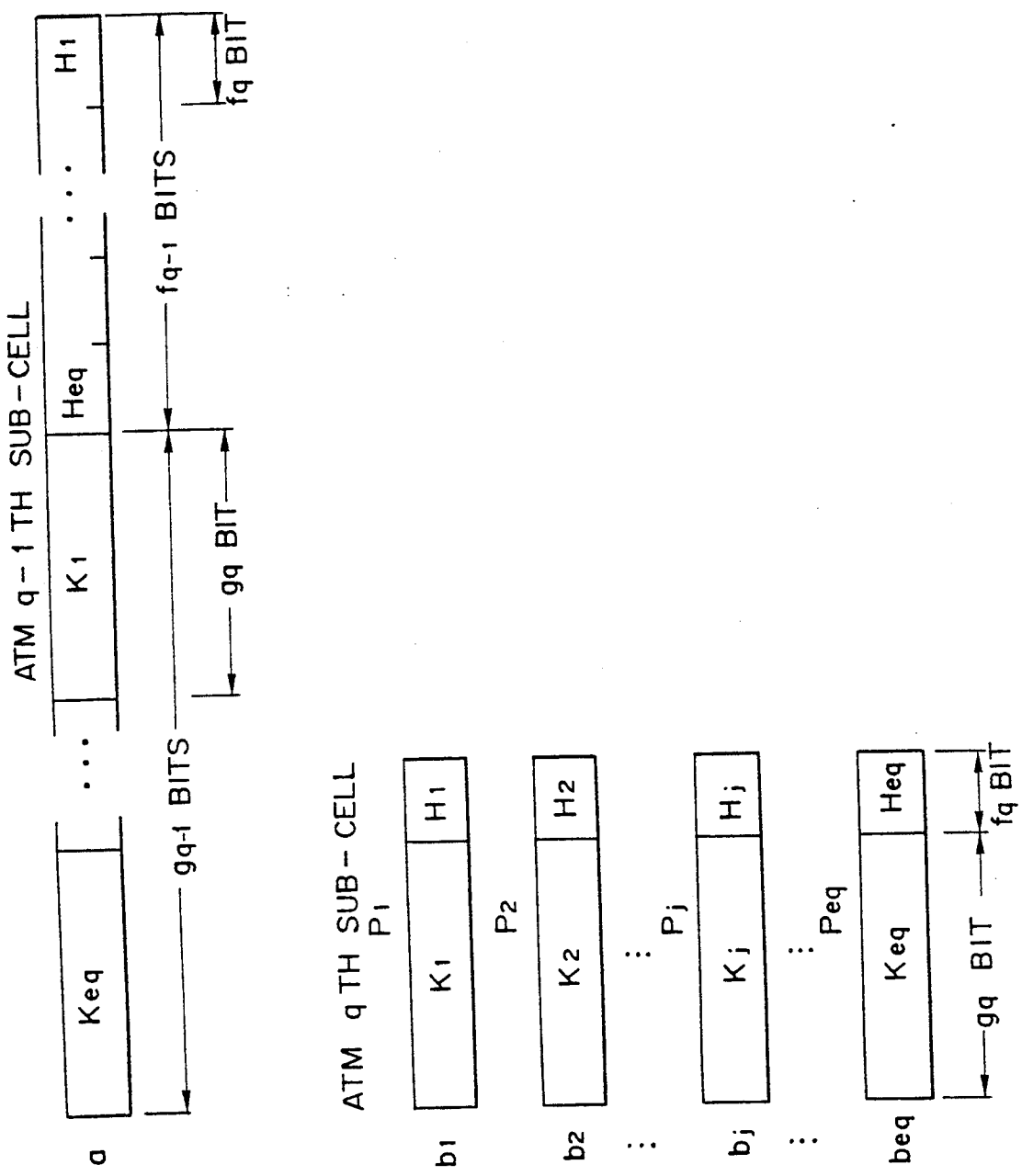
FIG. 26 shows an embodiment of an output signal of the qth ATM sub-cell divider in the third principle.

FIG. 26 shows an embodiment of an output signal of the qth ATM sub-sell divider 60 in the third principle shown in FIG. 25. In FIG. 26, $f_1=32/e_1$ and $g_1=384/e_1$ where $e_1$ is a measure of 32 except 1 and 32. Also, $f_q$: $f_{q-1}/e_q$, $g_q$: $g_{q-1}/e_q$ wherein in $e_q$ is a measure of $e_{q-1}$ except 1 and $e_{q-1}$. In FIG. 26, a q−1th ATM sub-cell comprising an $f_{q-1}$-big header part and a $g_{q-1}$-bit information part is divided by $e_q$, a divisor of $e_{q-1}$ other than 1 and $e_{q-1}$, and $e_q$ of qth sub-cells each comprising an $f_q$-bit header part and a $g_q$-bit information part are outputted.

Figure 27:
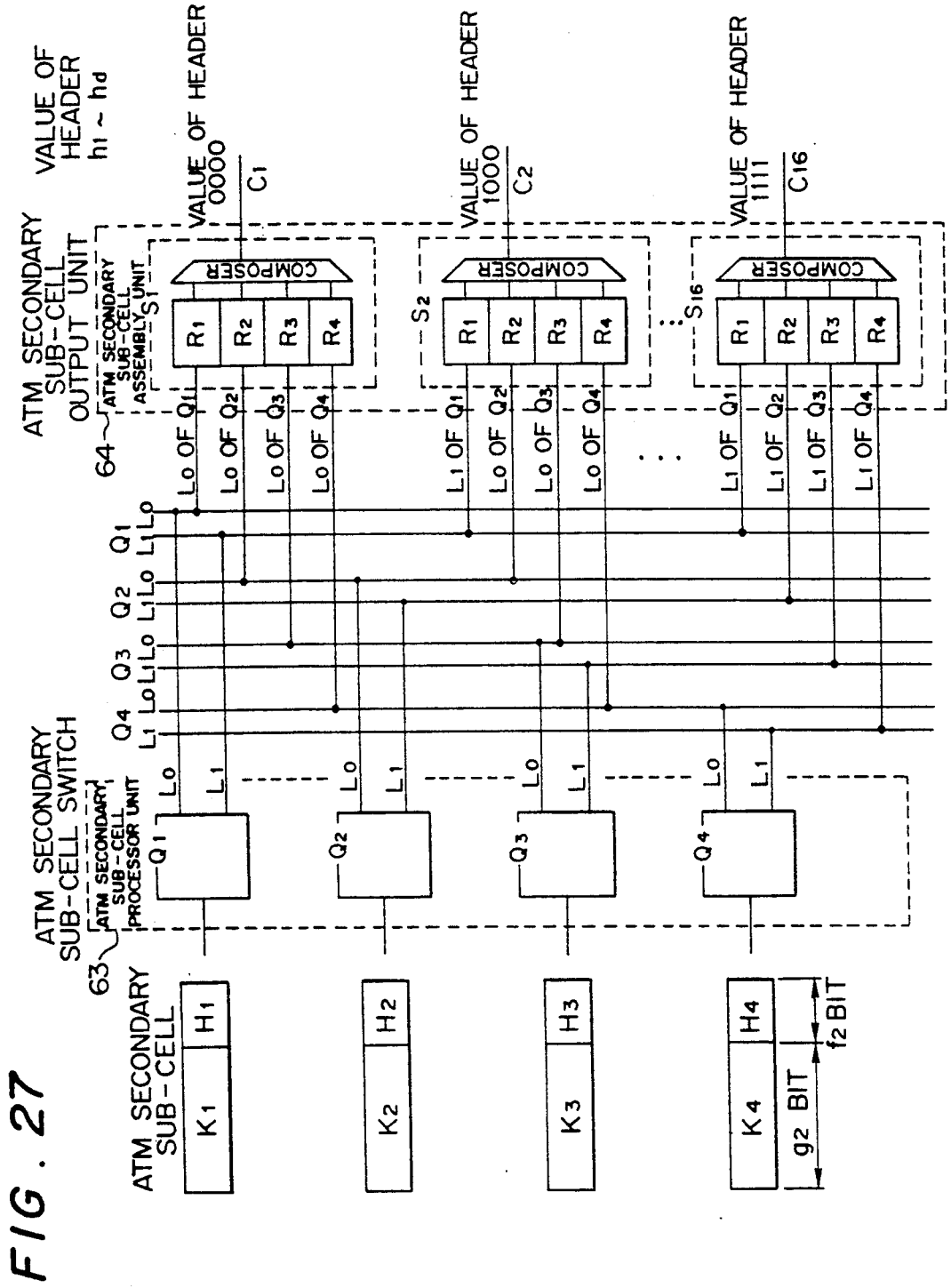
FIG. 27 shows a block diagram for explaining an example of a configuration of a secondary ATM sub-cell switch and a secondary ATM sub-cell output unit in an embodiment of the third principle.

FIG. 27 shows a block diagram for explaining an example of a configuration of a secondary ATM sub-cell switch and a secondary ATM sub-cell output unit. FIG. 27 refers to an example where $e_1=8$ and $e_2=4$. Thus, $f_1=32/e_1=4$, $g_1=384/e_1=48$, $f_2=f_1/e_2=1$ and $g_2=g_1/e_2=12$. A primary sub-cell comprises a 4-bit header part and a 48-bit information part. A secondary sub-cell obtained by dividing a primary sub-cell by 4 comprises a 1-bit header part and a 12-bit information part, that is, unit cells. Accordingly, the configuration of the secondary ATM sub-cell switch 63 and the secondary ATM sub cell output unit 64 is the same as that of the ATM cell switch 28 and the ATM cell output unit 29 shown in FIG. 10 referred to as a configuration example of an embodiment of the first principle shown in FIG. 8.

Figure 28:
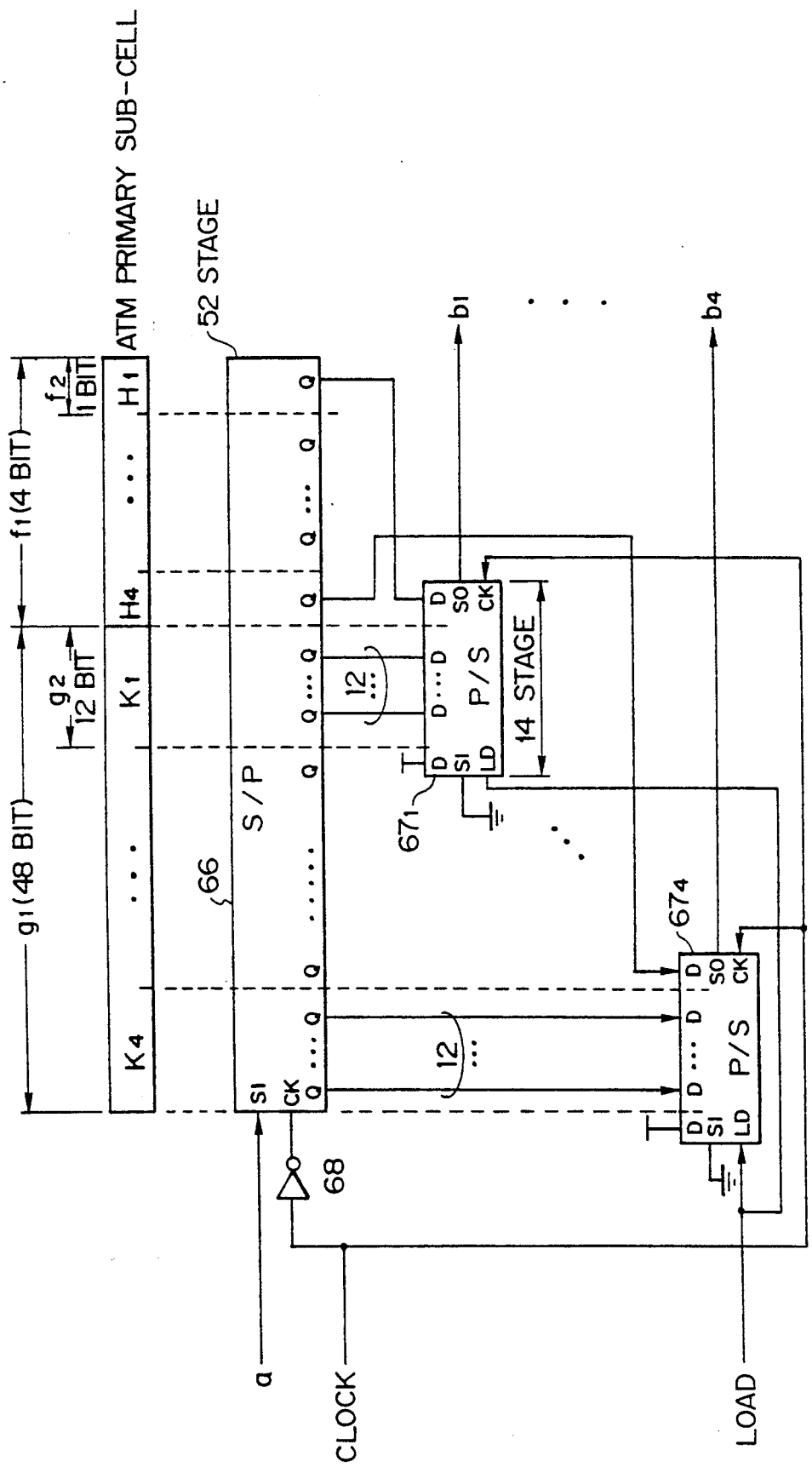
FIG. 28 shows a circuit configuration of a secondary ATM sub-cell divider in an embodiment of the third principle (in a primary sub-cell processor)
Figure 29:
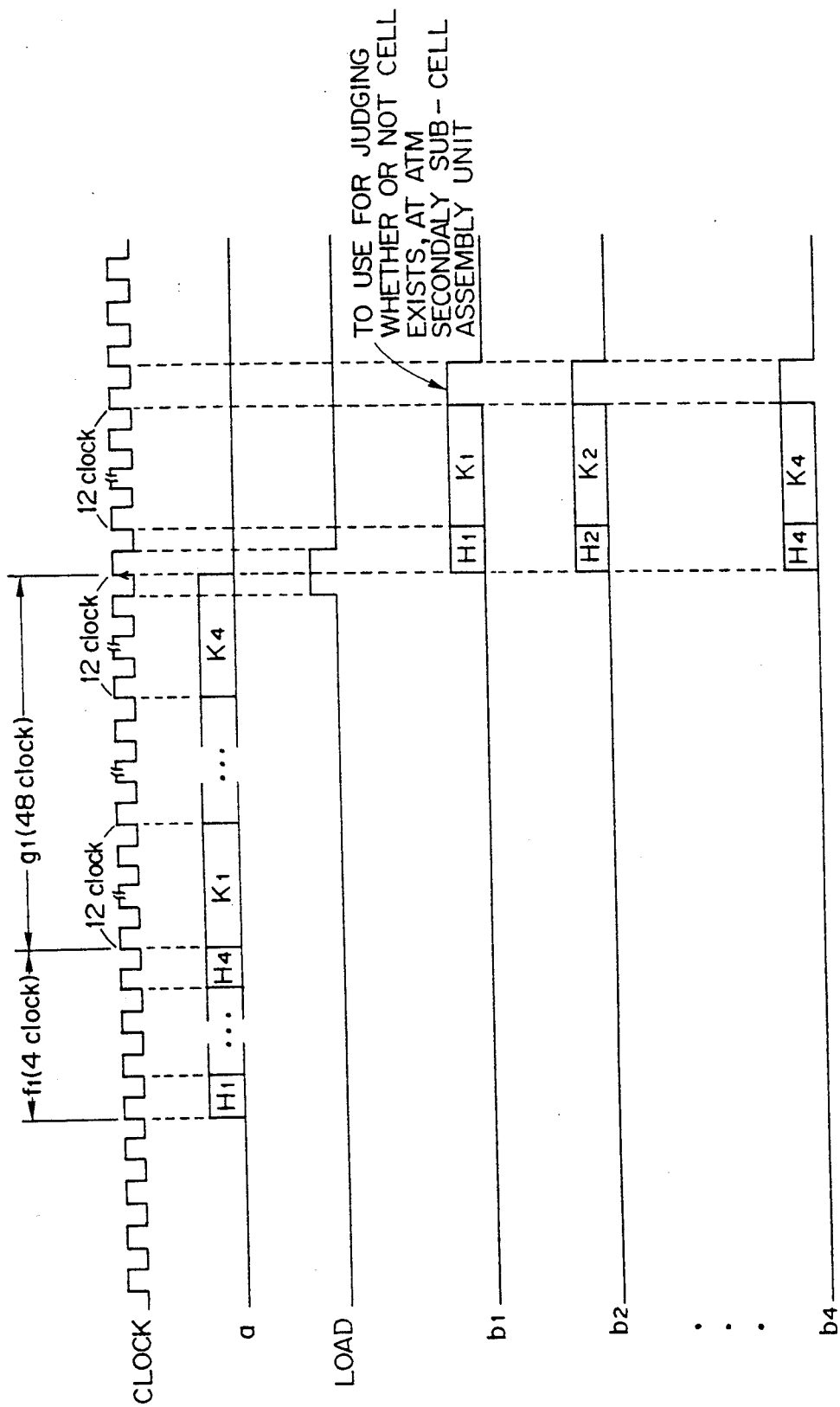
FIG. 29 shows a time chart for explaining the division of primary sub-cells by a secondary ATM sub-cell divider in an embodiment of the third principle.

FIG. 28 shows a circuit configuration of a secondary ATM sub-cell divider in an embodiment of the third principle where $e_1=8$ and $e_2=4$; FIG. 29 shows a time chart explaining the division of primary sub-cells by the above described divider. The secondary sub-cell divider forms a part of a primary sub-cell processor.

In FIG. 28, the secondary sub-cell divider comprises, like the divider shown in FIG. 20 for dividing inputted ATM cells into primary sub-cells, a serial parallel switch 66, a plurality of parallel/serial switches $67_1$, --- $67_4$ and an inverter 68. The difference from FIG. 20 is that the cells inputted to the serial-in/parallel-out shift register 66 are primary sub-cells and a primary sub-cell comprising an $f_1$-bit header part (4 bits in this example) and a $g_1$-bit information part (48 bits in outputted as secondary ATM sub-cells, where a secondary ATM sub-cell comprises a 1-bit header part, referring to a unit cell. By contrast, in FIG. 29, the clock count for the input of all the primary sub-cells is equal to $f_1+g_1$.

One bit for indicating the existence of a cell is added by the ATM cell divider shown in FIG. 20 to a primary sub-cell inputted as shown in FIG. 28. As this one bit is added again to each of secondary sub-cells at the division of secondary sub-cells, it is not applied to the serial-in/parallel-out shift register 66. That is, a load signal turns to 'H' before this one bit is applied to the end of a primary sub-cell as shown in FIG. 29.

Figure 30:
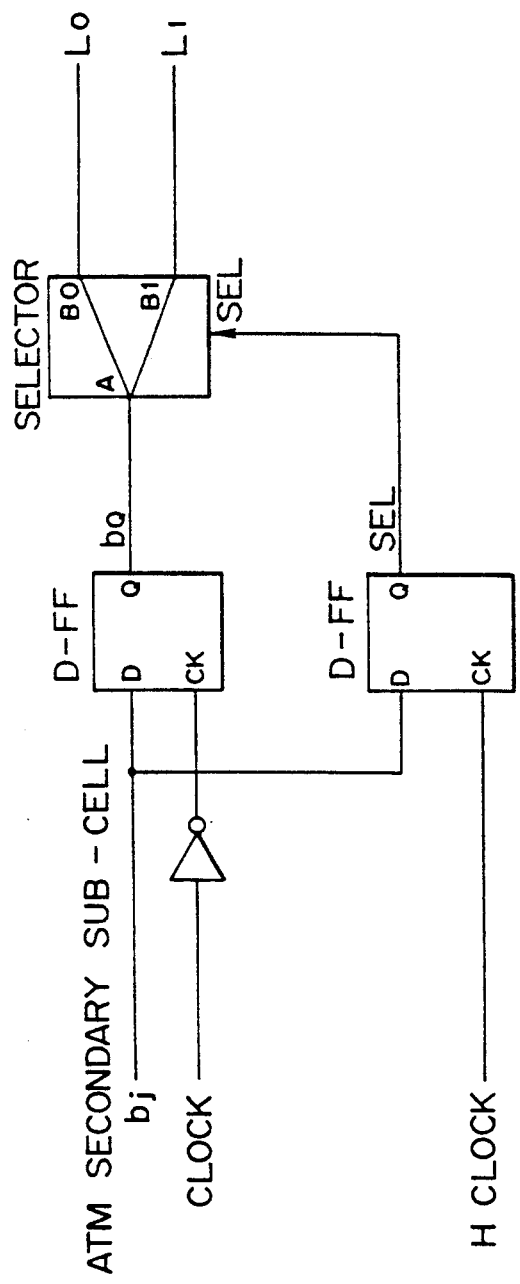
FIG. 30 shows a circuit configuration of a secondary ATM sub-cell processor in an embodiment of the third principle (in a primary sub-cell processor)
Figure 31:
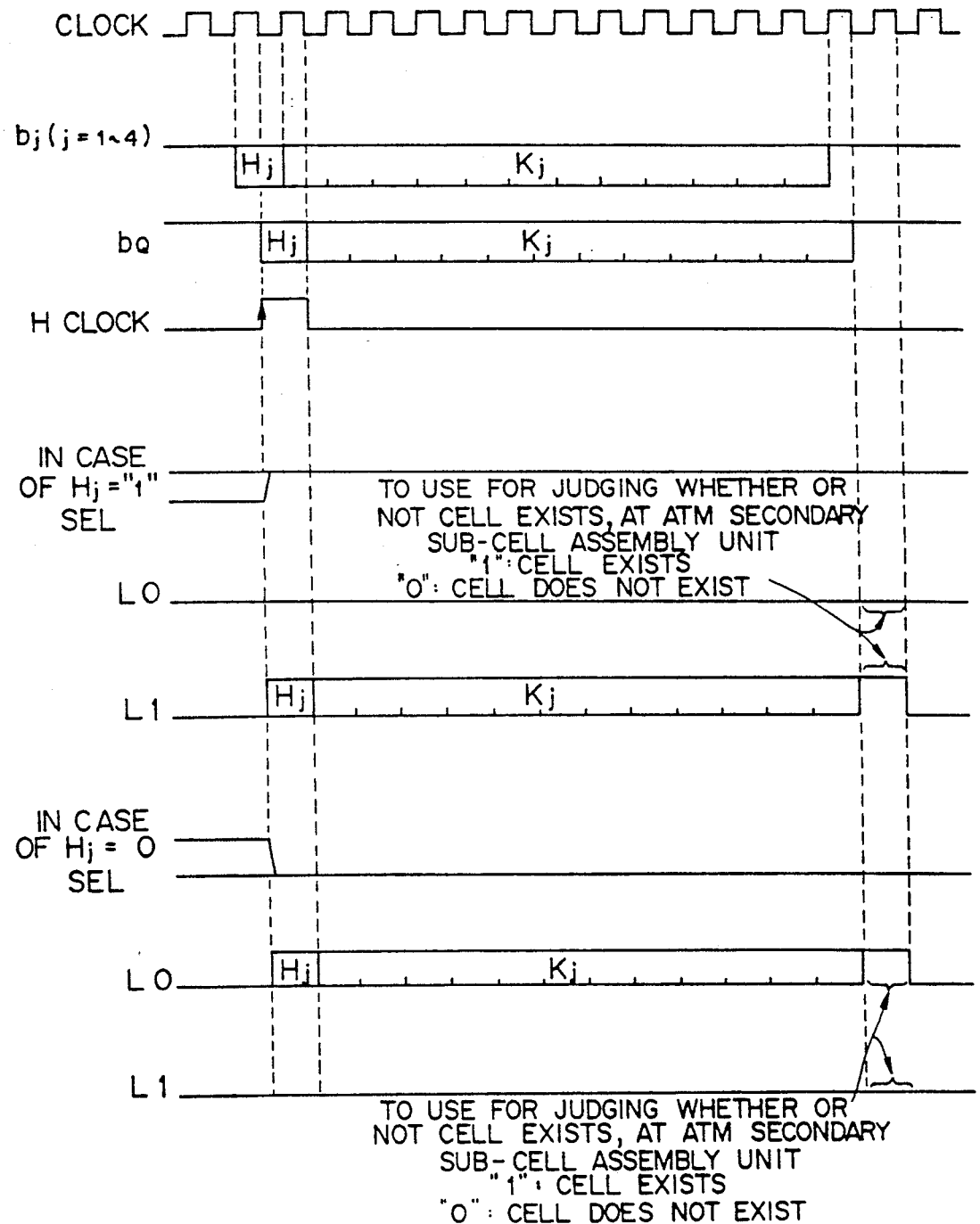
FIG. 31 shows a time chart for explaining the switch of sub-cells by a secondary ATM sub-cell processor in an embodiment of the third principle.

FIG. 30 shows a circuit configuration of a secondary sub-cell where $e_1=8$ and $e_2=4$ and the ATM secondary cell processor is the same as the ATM unit cell processor. When the selector SEL=L, signal of A is transmitted to $B_0$. When selector SEL=H, signal of A is transmitted to $B_1$. FIG. 31 shows a time chart for explaining the switch of secondary sub-cells by the processor. As described above, secondary sub-cells are unit cells, and the circuit configuration shown in FIG. 30 and the time chart shown in FIG. 31 are the same as those of the first principle shown in FIGS. 13 and 14. Therefore, the explanation is skipped here.

Figure 32:
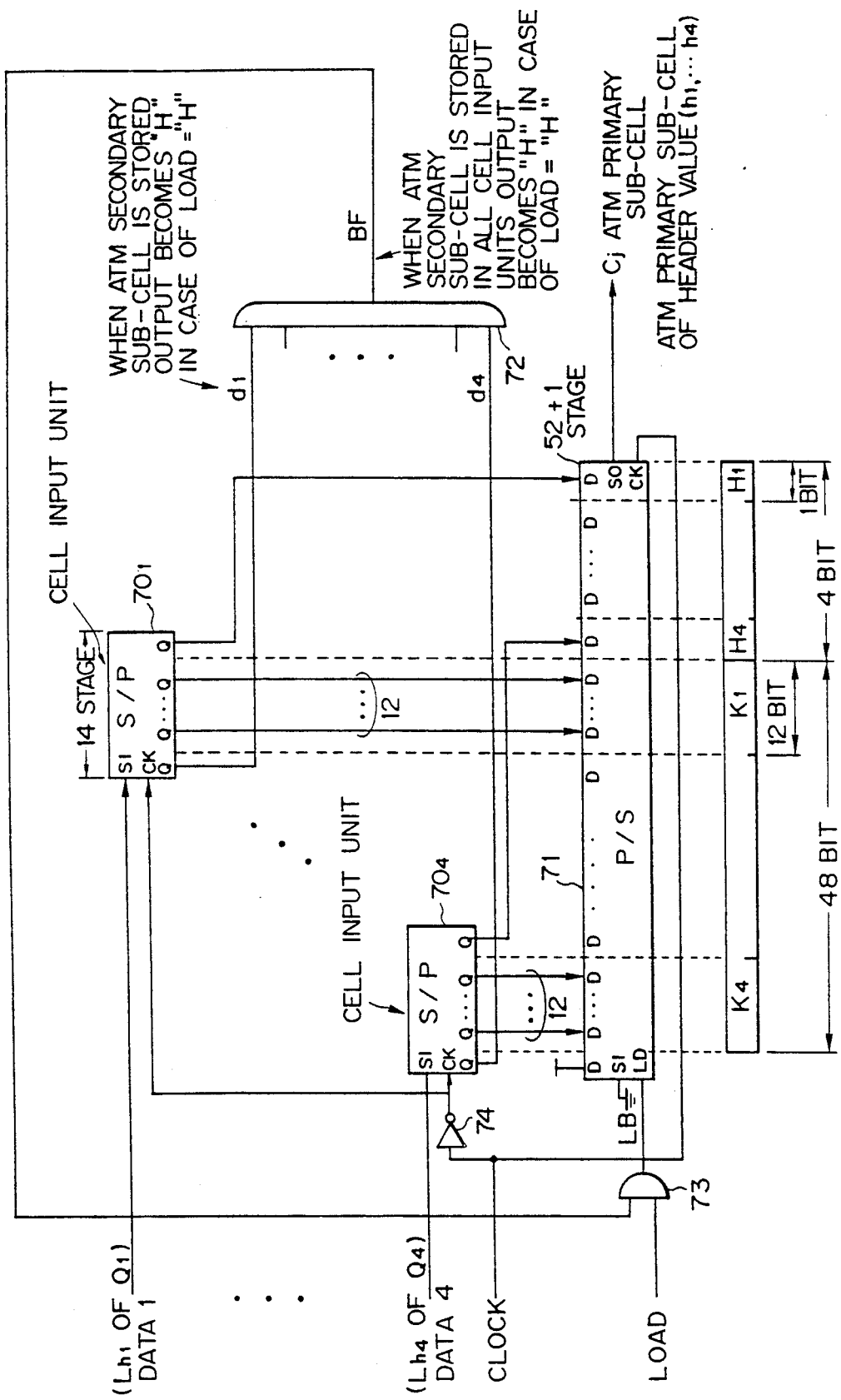
FIG. 32 shows a circuit configuration of a secondary ATM sub-cell composer in an embodiment of the third principle (in a primary sub-cell processor)
Figure 33:
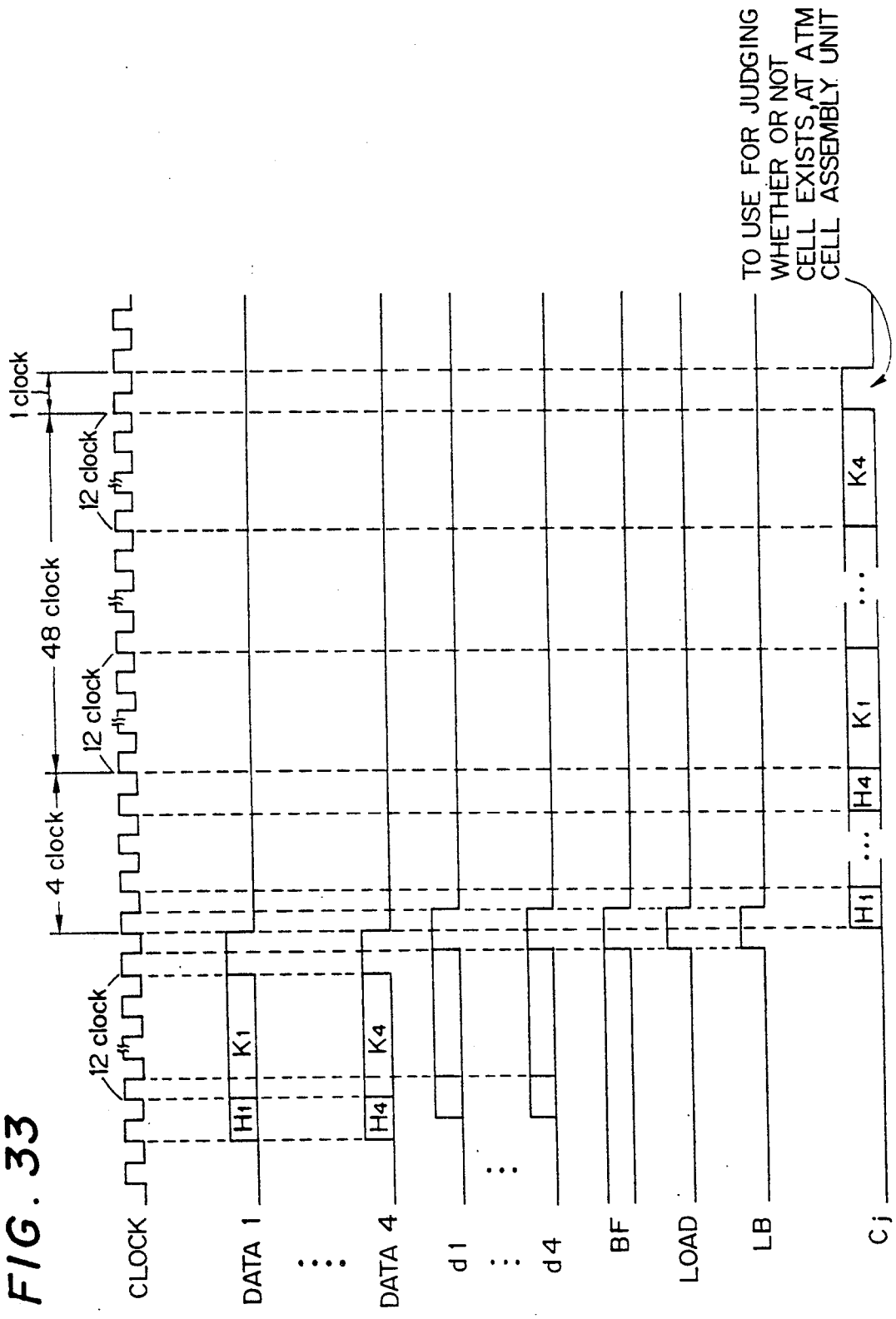
FIG. 33 shows a time chart of the assembly output of primary sub-cells by a secondary ATM sub-cell composer in an embodiment of the third principle.

FIG. 32 shows a circuit configuration of the secondary ATM sub-cell composer wherein $e_1=8$ and $e_{2=4}$; FIG. 33 shows a time chart of the assembly output of primary sub-cells by the composer.

In FIG. 32, the secondary sub-cell composer comprises a plurality of (4 in this example) cell input units $70_1$, --- $70_4$ parallel/serial switches 71, 2 AND gates 72 and 73, and an inverter 74. The difference from FIG. 23 is that secondary sub-cells (unit cells in this example) are inputted in each of cell input units $70_1$, --- $70_4$, and a 1-bit header part and a 12-bit information part are outputted from each of cell input units to the parallel/serial switch 71 where primary sub-cells each comprising a 4-bit header part and a 48-bit information part are assembled and outputted. As shown in FIG. 33, the clock count required for the input of secondary sub-cells to cell input units is a total of 14 clock; 1 for a header part, 12 for an information part, and 1 for 1 bit indicating the existence of a cell. The clock count required for the output of primary sub-cells is a total of 537; 4 for a header part, 48 for an information part, and 1 for a bit indicating the existence of a cell.

Figure 34:
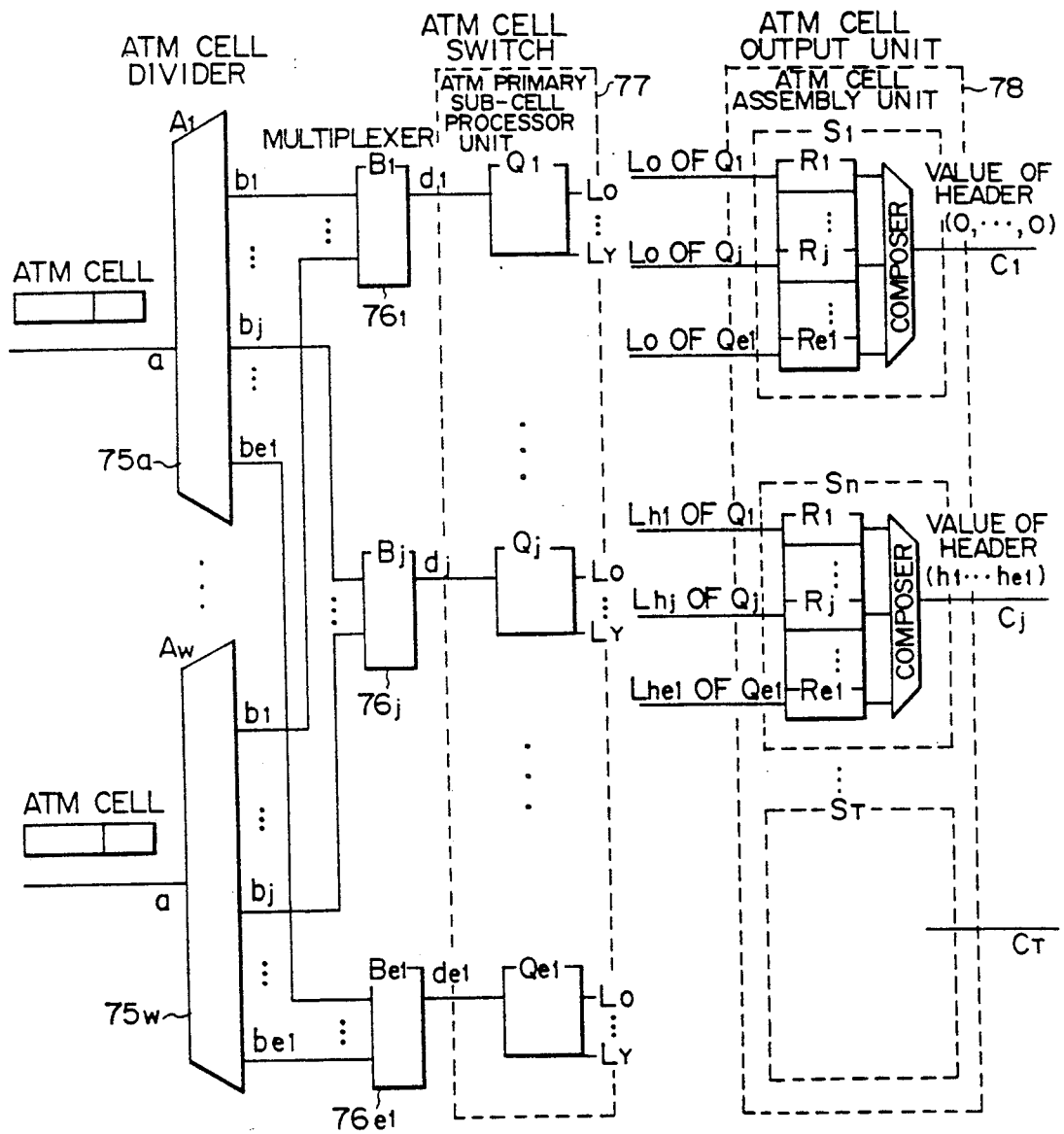
FIG. 34 shows a block diagram for explaining the configuration of an embodiment of the fourth principle.

FIG. 34 shows a block diagram for explaining the configuration of an embodiment of the fourth principle. The fourth principle, to configure an ATM switch circuit in a multi-input type circuit using w input lines, comprises w ($75_1$, --- $75_W$) ATM cell dividers, $e_1$ ($76_1$, $76_2$, --- $76_{e1}$) multiplexers for multiplexing primary sub-cells located at the same relative position in an ATM cell to be outputted by ATM cell dividers, an ATM cell switch 77, and an ATM cell output units 78. w ATM cell dividers ($A_1$-$A_w$) divide an ATM cell, except the HEC, comprising a 32-bit header part and a 384-bit information part by $e_1$ ($e_1$ is a divisor of 32 except 1 and 32) into $e_1$ ($P_1$, $P_2$, --- $P_{e1}$) primary ATM sub-cells each comprising an $f_1(f_1=32/e_1$-bit header part $H_j$(j=1--$e_1$) and a $g_1(g_1=384/e_1$)-bit information part $K_j$(j=1-$e_1$), and then outputs the primary sub-cells from the output $b_j$(j=1-$e_1$).

The multiplexer $B_j$(j=1-$e_1$) multiplexes all the input comprising the output $b_j$ of the ATM cell divider ($A_1$-$A_w$), and outputs each of them it from the output line $d_j$.

A primary ATM sub-cell processor is provided with $Z=2^{f_1}$ of outputs $L_0$, $L_1$, --- $L_Y$(Y=Z-1) for the input of the output $d_j$ of the multiplexer $B_j$, and allots a primary ATM sub-cell to the output $L_{hj}$ according to the value $h_j$ of the header part $H_j$ of a primary ATM sub-cell.

The ATM cell switch 77 comprises $e_1$ ($Q_1$, $Q_2$, ---$Q_{e1}$) primary ATM sub-cell processors, and $d_j$ (j=1-$e_1$)is connected to $Q_j$ (j=1-$e_1$) where the primary ATM sub-cell $P_j$ (j=1-$e_1$) is inputted.

An ATM cell composer comprises $e_1$ ATM cell input units and assemblers for assembling ATM cells only when primary ATM sub-cells are inputted to all of $e_1$ ($R_1$, $R_2$, --- $R_{e1}$) ATM cell (a total of $f_1+g_1$ bits comprising an $f_1$-bit header part and a $g_1$-bit information part) input units.

The ATM cell output unit 78 comprises T ($S_1$, ---$S_T$) (T: number of output lines) ATM cell composers. In each ATM cell composer $S_n$ (n=1-T), the ATM cell having the header value ($h_1$, $h_2$, ---, $h_{e1}$) is outputted to the output $C_j$ of the ATM cell output unit by inputting the output $L_{hj}$ of the primary ATM sub-cell processor $Q_j$ (j=1-e) to the ATM cell input unit $R_j$(j=1-$e_1$) according to the ATM sub-cell header value ($h_1$, $h_2$, ---, $h_{e1}$) expected by an output line.

Figure 35:
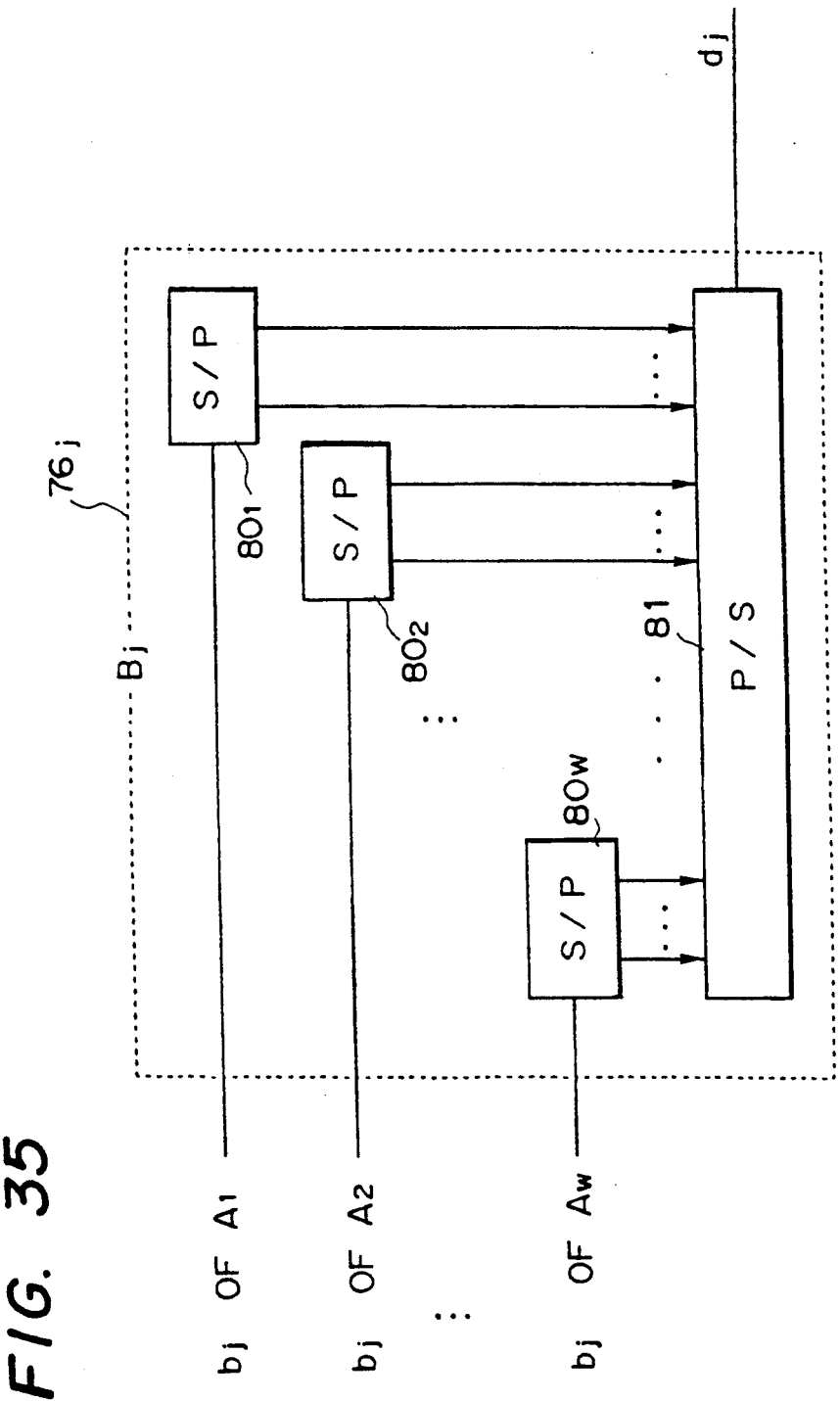
FIG. 35 shows a block diagram for explaining an embodiment of a multiplexer of the fourth principle.

FIG. 35 shows a block diagram for explaining an embodiment of a multiplexer of the fourth principle. In FIG. 35, a multiplexer, for example $76_j$, comprises serial/parallel switches (S/P) $80_1$, $80_2$, --- , $80_w$ to which a jth primary sub-cell in an ATM cell is inputted, and a parallel/serial switch (P/S) 81 for converting the output of these serial/parallel switches to a serial signal.

Figure 36:
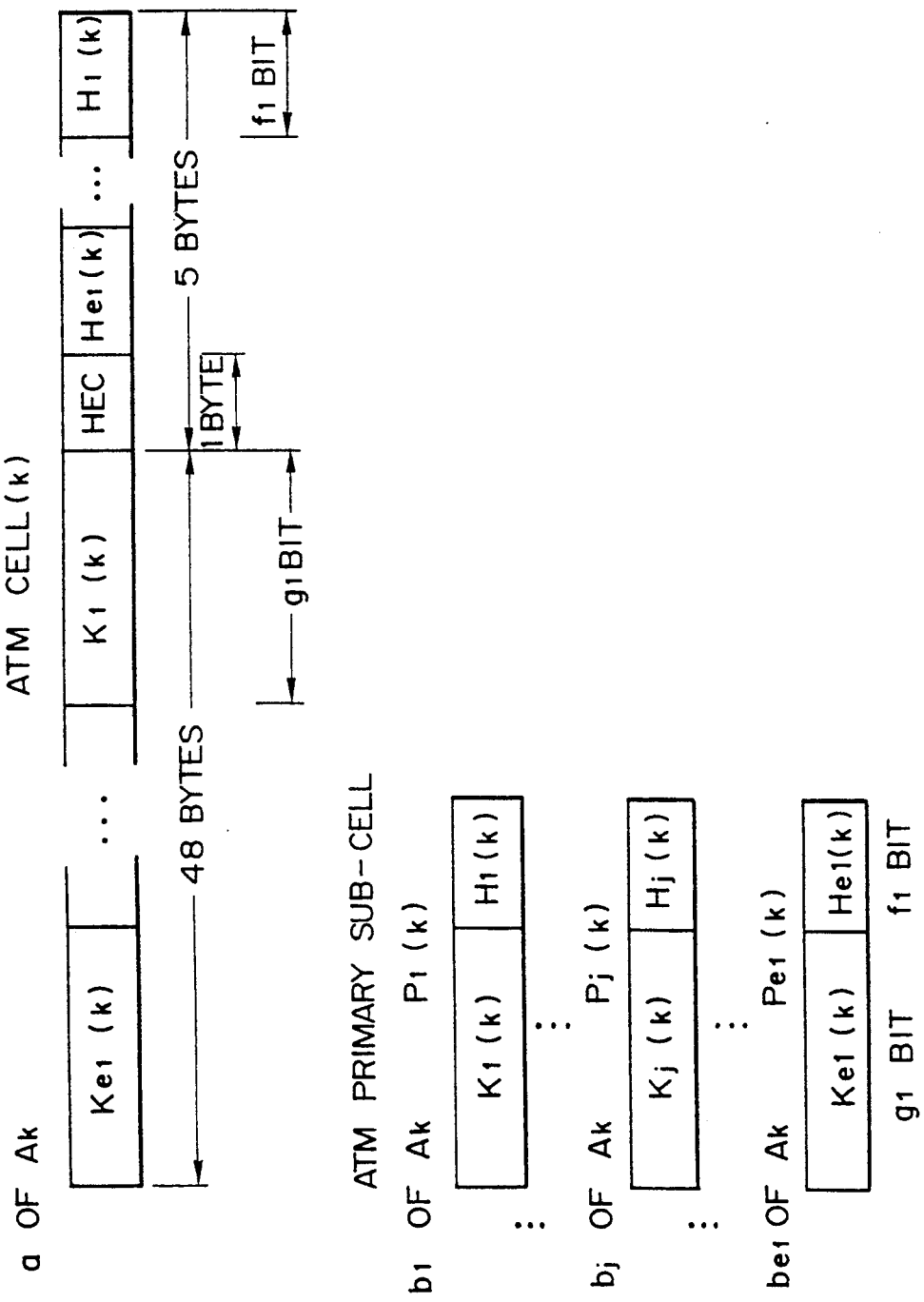
FIG. 36 shows an example of an output signal of an ATM cell divider in an embodiment of the fourth principle.

FIG. 36 shows an example of an output signal of the ATM cell divider in an embodiment of the fourth principle. In FIG. 36, $K_1 \approx W$, $f_1=32/e_1$ and $g_1=384/e_1$ wherein $e_1$ is a measure of 32 except 1 and 32. FIG. 36 also shows an example of an input and output signals to the ATM cell divider 75k. An ATM cell (k) to be inputted to the ATM cell divider 75k is divided by $e_1$, a divisor of 32 other than 1 and 32, into $e_1$ primary sub-cells each comprising an $f_1$-bit header part and a $g_1$-bit information part.

Figure 37:
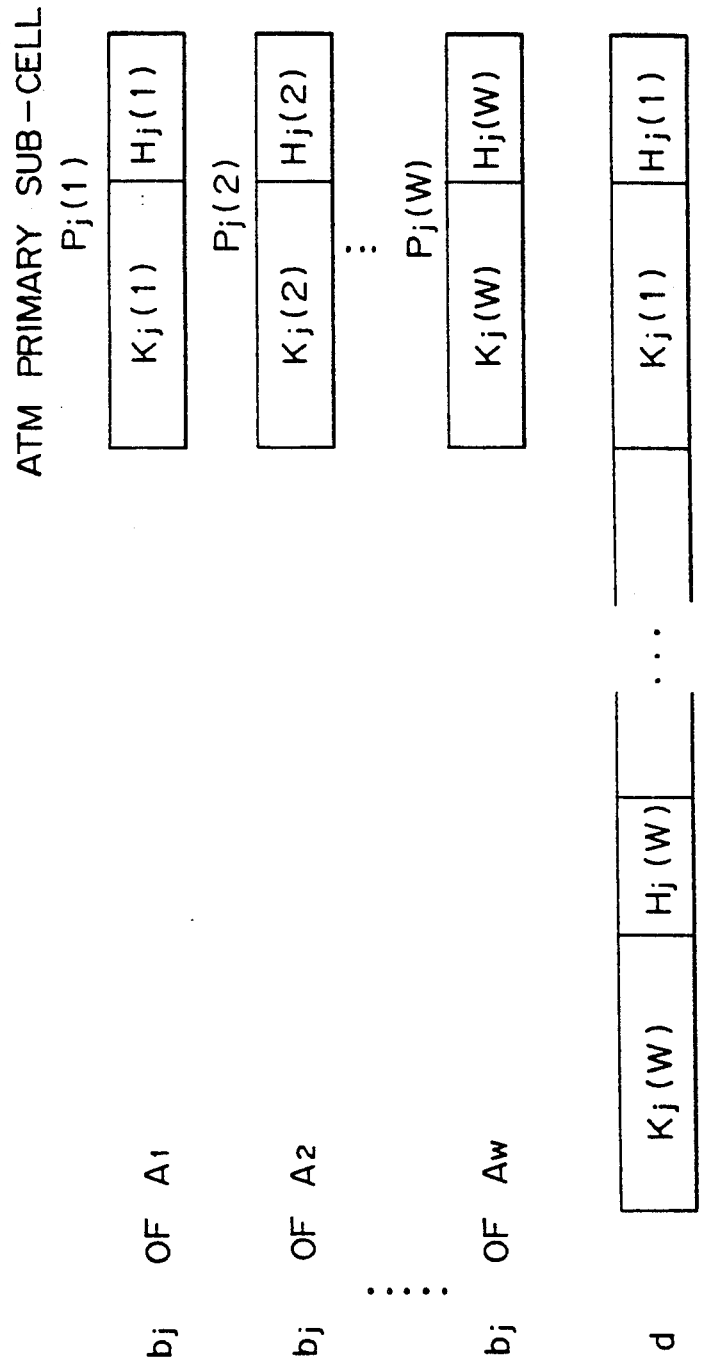
FIG. 37 shows an embodiment of a signal of a multiplexer in an embodiment of the fourth principle.

FIG. 37 shows an embodiment of a signal of a multiplexer. In FIG. 37, examples of a primary sub-cell inputted to the multiplexer 76j and the output of the multiplexer. An inputted primary sub-cell is a jth primary sub-cell $P_j$(1) of an ATM cell (1), a jth primary sub-cell $P_j$(2) of an ATM cell (2), and a jth primary sub-cell $P_j$(w) of an ATM cell (w). These signals are multiplexed and outputted as serial signals.

Figure 38:
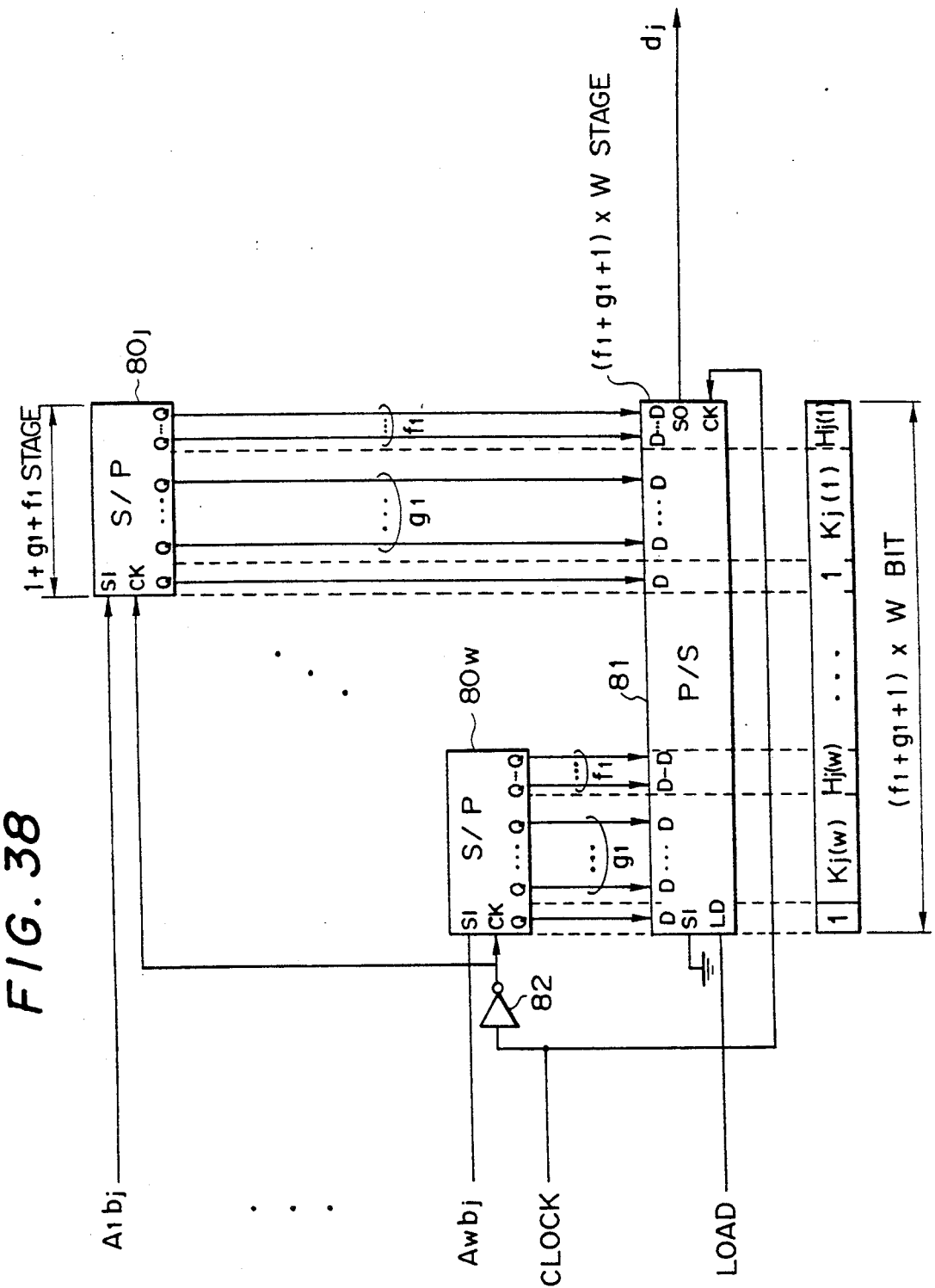
FIG. 38 shows a circuit configuration of a multiplexer in an embodiment of the fourth principle.

FIG. 38 shows a circuit configuration of a multiplexer in an embodiment of the fourth principle; FIG. 39 shows a time chart of multiplexing primary sub-cells by a multiplexer. In FIG. 38, a multiplexer comprises w serial/parallel switches $80_1$, --- $80_w$, a parallel/serial switch 81, as in FIG. 35, and an inverter 82, not shown in FIG. 35. Primary sub-cells located at the same relative position in an ATM cell and inputted through w input lines are inputted to each of serial/parallel switches. The primary sub-cell comprises an $f_1$-bit header part, a $g_1$-bit information part, and a last additional "1" bit indicating the existence of a cell. Therefore, the clock count required for the input of these primary sub-cell is equal to $f_1+g_1+1$ as shown in FIG. 39. When all primary sub-cells are inputted, signals are parallel outputted from serial/parallel switches by applying load signals to the parallel/serial switch 81, and signals shown in FIG. 37 are outputted from the parallel/serial switch 81. At this time, 1 bit is added, for indicating the existence of a cell. This is the last bit of a primary sub-cell in a multiplexing signal.

According to the above described explanation, an ATM cell comprises a 32-bit header part and a 384-bit information part, excluding the header error control data. However, it is obvious that the present invention can is applicable when the number of header bits and the number of information bits excluding the header error control data have a common divisor, and the number of bits is not limited to specific values.

As described above, in the present invention, an ATM switch circuit can be formed in a hierarchical structure comprising an ATM cell divider, an ATM cell switch, and an ATM cell output unit. Besides, additional ATM cell composers and necessary wiring between an additional ATM cell composer and an ATM cell switch permit more of output lines and a switch circuit applicable to an LSI system.

Furthermore, an ATM cell switch can be configured in a small number of modules using units of primary ATM sub-cell processors. A primary ATM sub-cell processor can comprise a secondary ATM sub-cell divider, a secondary ATM sub-cell switch, and a secondary ATM sub-cell output unit, and secondary ATM sub-cell processors for forming a secondary ATM sub-cell switch can be configured likewise in a hierarchical structure, thus realizing more hierarchical processing.

Furthermore, a multi-input type switch circuit can be formed by adding multiplexers to the above described hierarchical ATM switch circuit, thus realizing a circuit, applicable to an LSI system, comprising a plurality of ATM cell dividers and multiplexers corresponding to a plurality of input lines, an ATM cell switch, and an ATM cell output unit. Therefore, the present invention serves for realizing a variety of system configurations and reduction of the amount of work required for system modification.

The present invention is applied to an ATM cell switch where the number of header bits as destination data of an ATM cell and the number of information bits excluding header error control data have a common divisor, and can be useful for various communication networks such as a broadband ISDN, and multi-media networks of voice, data, images, etc.

What is claimed is:

1. An asynchronous transmission mode, ATM, switch circuit configuration system comprising:

ATM cell dividing means for receiving input ATM cells and dividing an ATM cell, comprising a header part and an information part except header error control data separately, by a divisor equal to a number of data bits of the header part to produce a plurality of unit cells comprising a 1-bit header part and a divided information part and for outputting the unit cells from a number of ATM cell dividing means output terminals equal to the divisor;

unit cell switching means comprising a plurality of unit cell switching means input terminals corresponding one-to-one to a group of said ATM cell dividing means output terminals for outputting unit cells received from said ATM cell dividing means to either of two unit cell switching means output terminals corresponding to each of said unit cell switching means input terminals according to a value of the header of a unit cell; and ATM cell assembly output means provided at each of t output lines of said ATM switch circuit, said ATM cell assembly output means comprising ATM cell assembly output means input terminals equal in number to the bits in the header part of the ATM cells, said ATM cell assembly output means for receiving an output of two unit cell switching means output terminals each corresponding to the data at each of the bit positions of the of the header part and being connected to a unit cell switching means input terminal to which said unit cells whose header part is provided with said data at each of the bit position of each ATM cell header part according to each header value of an ATM cell are applied so as to output an ATM cell to each of the t output lines of said ATM switch circuit, wherein all unit cells are assembled to be outputted as an ATM cell when all of the ATM cell assembly output means input terminals have received unit cells from said unit cell switching means.

2. An ATM switch circuit configuration system according to claim 1, wherein an ATM cell divider forming said ATM cell dividing means comprises:

a serial-in/parallel-out shift register for parallel-outputting inputted data except header error control data after all of header parts and information parts including header said HEC are serial-inputted bit by bit synchronously with a clock signal, and a plurality of parallel/serial switches for serial-outputting a 1-bit header part, a divided information part, and additional 1-bit data for indicating the existence of cell data in this order synchronously with a clock signal after they are parallel-inputted as output of said serial-in/parallel-out shift register.

3. An ATM switch circuit configuration system according to claim 2, wherein an ATM cell assembler forming said ATM cell assembly output means comprises:

a plurality of cell input units comprising a plurality of serial/parallel switches connected in input terminals (the number of which corresponds to half number of output terminals of said unit cell switching means) where unit cells each comprising a header part, an information part, and additional 1-bit data indicating the existence of cell data are serial-inputted synchronously with a clock signal, and then parallel-outputted, and a cell assembler comprising an AND gate where all 1-bit data indicating the existence of cell data in the output of each of said serial/parallel switches are inputted; and a parallel/serial switch where header parts and information parts of unit cells in the output of each of said serial/parallel switches are combined respectively, parallel-loaded when said AND gate outputs "1", in the same order of data when a cell is inputted to said ATM switch circuit, and then serial-outputted synchronously with a clock signal.

4. An ATM switch circuit configuration system according to claim 1, wherein an ATM cell switch forming said unit cell switching means comprises;

a plurality of ATM unit cell processors where said ATM unit cells are inputted, each of said ATM unit cell processors comprising a single-input and double-output selector for switching inputted ATM unit cells, a first D flip flop for outputting, according to said 1-bit data in said unit cell, a selection control signal to said selector when said 1-bit data is inputted, and a second D flip flop for outputting inputted unit cell data "as is" to said selector synchronously with a clock signal.

5. An ATM switch circuit system comprising:

primary sub-cell dividing means for dividing a header part and an information part of an ATM cell except header error control data separately by a divisor $e_1$ smaller than the number of head bits of said header part into $e_1$ ($\approx 2$) primary ATM sub-cells each comprising an $f_1$ (data length of the header part/$e_1$)-bit header part and a $g_1$ (data length of the information part/$e_1$)-bit information part, and outputting said primary ATM sub-cells from $e_1$ output terminals, primary sub-cell switching means comprising $e_1$ input terminals connected to $e_1$ output terminals of said primary sub-cell dividing means, and comprising $1^{f_1} \times e_1$ output terminals for outputting said primary ATM sub-cells applied to said $e_1$ input terminals from any of $2^{f_1}$ output terminals corresponding to input terminals according to the header part value of said primary ATM sub-cells, and t ATM cell assembly output means provided for each of t output liens of said ATM switch circuit, said ATM cell assembly output means comprising $e_1$ input terminals for receiving the output of $2^{f_1}$ output terminals each corresponding to the data at each of the $f_1$-bit positions of said header part and being connected to an input terminal of said primary sub-cell switching means to which primary sub-cells whose header part is provided with said $f_1$-bit position data of each ATM cell header par according to each header value of an ATM cell ar applied so as to output an ATM cell to each output line, wherein $e_1$ primary sub-cells are assembled to be outputted as an ATM cell when all of $e_1$ input terminals have received primary sub-cells from said primary sub-cell switching means.

6. An ATM switch circuit configuration system according to claim 5, wherein an ATM cell divider forming said sub-cell dividing means comprises;

a serial-in/parallel-out shift register where a header part, an information part, including said HEC, are serial-inputted bit by bit synchronously with a clock signal, and then parallel-outputted except header error control data (HEC) after the header part and information part are input, and $e_1$ parallel/serial switches where an $f_1$-bit header part, a $g_1$-bit divided information part, and 1-bit data indicating the existence of cell data are parallel-inputted as output of said serial-in/parallel-out shift register and then serial-outputted synchronously with a clock signal in the same order when they are inputted.

7. An ATM switch circuit configuration system according to claim 6, wherein an ATM cell assembler forming said ATM cell assembly output means comprises:

$e_1$ cell input units comprising $e_1$ serial/parallel switches, connected to said $e_1$input terminals, where primary sub-cells comprising an $f_1$-bit header part, a $g_1$-bit information part, and 1-bit data indicating the existence of said cell data are serial-inputted synchronously with a clock signal from said input terminal, and then parallel-outputted after completion of the input;

a cell assembler comprising an AND gate where all additional 1-bit data indicating the existence cell data in the output of each of said serial/parallel switches are inputted; and a parallel/serial switch where header parts and information parts in the output of each of said serial/parallel switches are combined respectively, parallel-loaded in the same order of data when a cell is inputted to said ATM switch circuit, when said AND gate outputs "1", and then the loaded result is serial-outputted synchronously with a clock signal.

8. An ATM switch circuit configuration system according to claim 5, wherein said primary sub-cell switching means comprises $e_1$ primary sub-cell processing means for receiving signals from $e_1$ output terminals of said primary sub-cell dividing means and outputting primary sub-cells inputted by said primary sub-cell dividing means to one of $2^{f_1}$ output terminals according to a value of the header part data of a primary sub-cell, said primary sub-cell processing means comprises:

secondary sub-cell dividing means for dividing a $f_1$-bit header part and a $g_1$-bit information part of said primary sub-cell separately by $e_2$, a divisor of $e_1$ except 1 and $e_1$ into $e_2$ secondary sub-cells each comprising an $f_2$ ($f_2 = f_1/e_1$)-bit header part and a $g_2$ ($g_2 = g_1/e_1$)-bit information part, and for outputting secondary sub-cells from $e_2$ output terminals;

secondary sub-cell switching means comprising $e_2$ secondary sub-cell processing means for receiving secondary sub-cells outputted by $e_2$ output terminals of said secondary sub-cell dividing means and outputting said secondary sub-cells to one of $2^{f_2}$ output terminals according to a value of the header part of said secondary sub-cell; and $t_2$ secondary sub-cell assembly output means, provided for each of $t_2$ ($t_2 = 2^{f_1}$) output terminals, said secondary sub-cell assembly output means comprising $e_2$ input terminals for receiving the output of each of $2^{f_2}$ output terminals, wherein $e_2$ secondary sub-cells are assembled to be outputted as a primary sub-cells when all of $e_2$ input terminals have received secondary sub-cells from said $t_2$ secondary sub-cell assembly output means; and (q=1)th (q≧3) sub-cell processing means comprising:

qth sub-cell dividing means for dividing a $f_{q-1}$-bit header part and a $g_{q-1}$-bit information part of a (q−1)th sub-cell by $e_q$, a divisor of $e_{q-1}$, except 1 and $e_{q-1}$ into $e_q$ q-th sub-cells each comprising an $f_q$ ($f_q = f_{q-1}/e_q$)-bit header part and a $g_q$ ($g_q = g_{q-1}/e_q$)-bit information part and outputting these qth sub-cells from $e_q$ output terminals;

qth sub-cell switching means comprising $e_q$ q-th sub-cell processing means for receiving qth sub-cells outputted from $e_q$ output terminals of said q-th sub-cell dividing means and outputting them from an of $2^{f_q}$ output terminals according to a value of the header part of said qth sub-cell; and $t_q$ q-th sub-cell assembly output means, provided for each of $2^{f_q-1}$ ($2^{f_q-1} = t_q$) output lines of (g−1)th primary sub-cell processing means, said g-th sub-cell assembly output means comprising $e_2$ input terminals for receiving the output of each of $2^{fq}$ output terminals each corresponding to the data at the $f_q$-bit position of said header part and being connected to an input terminal of said secondary sub-cell switching means to which secondary sub-cells whose header part is provided with said $f_2$-bit position data of each secondary sub-cell header part according to each header value of a primary sub-cell are applied so as to output (q−1)th sub-cells to each output line, wherein said $e_q$ q-th sub-cells are assembled to be outputted as (q−1) sub-cells when all of $e_q$ input terminals have received qth sub-cells from said qth sub-cell assembly output means, wherein qth sub-cell processing means can be likewise configured sequentially in a hierarchical nest structure as a value of q increases.

9. An ATM switch circuit configuration system according to claim 8,
wherein a secondary ATM sub-cell divider forming said secondary sub-cell dividing means comprises:
a serial-in/parallel-out shift register where an $f_1$-bit header part and a $g_1$-bit information part of a primary ATM sub-cell are serial-inputted bit by bit synchronously with a clock signal and then parallel-outputted after all of said header part and information part are inputted, and
$e_2$ parallel/serial switches where data containing an $f_2$ ($f_2=f_1/e_2$)-bit header part, a $g_2$ ($g_2=g_1/e_2$)-bit information part, and an additional 1-bit indicating the existence of cell data are parallel-inputted as an output of said serial-in/parallel-out shift register and then serial-outputted synchronously with a clock signal in the order they are inputted.

10. An ATM switch circuit configuration system according to claim 9,
wherein an ATM secondary sub-cell assembler forming said secondary sub-cell assembly output means comprises:
$e_2$ cell input units comprising $e_2$ input terminals where an $f_2$-bit header part, a $g_2$-bit information part, and additional 1-bit indicating the existence of cell data are serial-inputted from each input terminal synchronously wit a clock signal and then parallel-outputted;
a cell assembler comprising an AND gate were all additional 1-bit data indicating the existence of cell data in the output of each of said serial/parallel switches are inputted; and
a parallel/serial switch where header parts and information parts in the output of each of said serial/parallel switches are combined respectively, parallel-loaded when said AND gate outputs "1", in the same order of data as in a primary ATM sub-cell, and then serial-outputted synchronously with a clock signal.

11. An ATM switch circuit configuration system comprising:
plurality of primary sub-cell dividing means, each provided corresponding to each input line, for dividing a header part and an information part of an ATM cell inputted from a plurality (w) of input lines except header error control data by $e_1$, a divisor smaller than the number of a data bits in said header part into $e_1$ ($\geq 2$) primary sub-cells each comprising a $f_1$ (number of header data bits/$e_1$)-bit header part and a $g_1$ (number of information bits/$e_1$)-bit information part, and outputting primary sub-cell from $e_1$ output terminals,
$e_1$ primary sub-cell multiplexing means for receiving the output of a terminal for outputting, from among $e_1$ outputs of each of said primary sub-cell dividing means, a primary sub-cell at the corresponding relative position in an ATM cell inputted via input lines and multiplexing the inputted primary sub-cells,
primary sub-cell switching means having $e_1$ input terminals connected to each output terminal of said $e_1$ primary sub-cell multiplexing means and having $(2^{f_1})\times e_1$ output terminals for outputting primary sub-cells applied to said input terminals from said $e_1$ primary sub-cell multiplexing means to one of $2^{f_1}$ output terminals corresponding to each input terminal according to a value of the header part of the primary sub-cell, and
t ATM cell assembly output means, provided for each of t output lines of said ATM switch circuit, said ATM cell assembly output means comprising $e_1$ input terminals for receiving the output of $2^{f_1}$ each corresponding to the data at $f_1$-bit position of said header part and being connected to an input terminal of said primary sub-cell switching means to which said primary sub-cells whose header part is provided with said data at $f_1$-bit position of each ATM cell header part according to each header value of an ATM cell are applied so as to output an ATM cell to each output line, where $e_1$ primary sub-cells are assembled to be outputted as an ATM cell when all of $e_1$ input terminals have received primary sub-cells from said primary sub-cell switching means.

12. An ATM switch circuit configuration system according to claim 11,
wherein an ATM cell divider forming said primary sub-cell dividing means comprises:
a serial-in/parallel-out shift register where a header part and an information part including header error control data (HEC) of an ATM cell are serial-inputting bit by bit synchronously with a clock signal and parallel-outputted excluding said HEC after said header part and information part are inputted, and
$e_1$ parallel/serial switches were an $f_1$-bit header part, a divided $g_1$-bit information part, and 1-bit data indicating the existence of cell data are parallel-inputted as output of said serial-in/parallel-out shift register and serial-outputted synchronously with a clock signal in the order they are inputted.

13. An ATM switch circuit configuration system according to claim 12,
wherein an ATM cell assembler forming said ATM cell assembler forming said ATM cell assembly output means comprises:
$e_1$ cell input units comprising $e_1$ serial/parallel switches, connected to said $e_1$ input terminals, where primary sub-cells comprising an $f_1$-bit header part, a $g_1$-bit information part, and 1-bit data indicating the existence of said cell data are serial-inputted synchronously with a clock signal from said input terminal, and then parallel-outputted after completion of the input, and
a cell assembler comprising an AND gate where all additional 1-bit data indicating the existence of cell data in the output of each of said serial/parallel switches are inputted; and a parallel/serial switch where header parts and information parts in the output of each of said serial/parallel switches are combined respectively, parallel-loaded when said AND gate outputs "1", in the same order of data when a cell is inputted to said ATM switch circuit, and then serial-outputted synchronously with a clock signal.

14. An ATM switch circuit configuration system according to claim 11, wherein said primary sub-cell switching means comprises $e_1$ primary sub-cell processing means for receiving signals from $e_1$ output terminals of said primary sub-cell dividing means and outputting primary sub-cells inputted by said primary sub-cell dividing means to one of $2^{f_1}$ output terminals according to a value of the header part data of a primary sub-cell, said primary sub-cell processing means comprises:

secondary sub-cell dividing means for dividing a $f_1$-bit header part and a $g_1$-bit information part of said primary sub-cell separately by $e_2$, a divisor of $e_1$ except 1 and $e_1$ into $e_2$ secondary sub-cells each comprising an $f_2$ ($f_2=f_1/e_1$)-bit header part and a $g_2$ ($g_2=g_1/e_1$)-bit information part, and for outputting secondary sub-cells from $e_2$ output terminals;

secondary sub-cell switching means comprising $e_2$ secondary sub-cell processing means for receiving secondary sub-cells outputted by $e_2$ output terminals of said secondary sub-cell dividing means and outputting said secondary sub-cell to one of $2^{f_2}$ output terminals according to a value of the header part of said secondary sub-cell; and $t_2$ secondary sub-cell assembly output means, provided for each of $t_2$ ($t_2=2^{f_1}$) output terminals, said secondary sub-cell assembly output means comprising $e_2$ input terminals for receiving the output of each of $2^{f_2}$ output terminals, wherein $e_2$ secondary sub-cells are assembled to be outputted as a primary sub-cells when all of $e_2$ input terminals have received secondary sub-cells from said $t_2$ secondary sub-cell assembly output means; and $(q-1)$th $(q \geq 3)$ sub-cell processing means comprising:

qth sub-cell dividing means for dividing a $f_{q-1}$-bit header part and a $g_{q-1}$-bit information part of a $(q-1)$th sub-cell by $e_q$, a divisor of $e_{q-1}$, except 1 and $e_{q-1}$ into $e_q$ q-th sub-cells each comprising an $f_q$ ($f_q=f_{q-1}/e_q$)-bit header part and a $g_q$ ($g_q=g_{q-1}$)-bit information part and outputting these qth sub-cells from $e_q$ output terminals;

qth sub-cell switching means comprising $e_q$ q-th sub-cell processing means for receiving qth sub-cells outputted from $e_q$ output terminals of said q-th sub-cell dividing means and outputting them from any of $2^{f_q}$ output terminals according to a value of the header part of said qth sub-cell; and $t_q$ q-th sub-cell assembly output means, provided for each of $2^{f_1-1}$ ($2^{f_q-1}=t_q$) output lines of $(q-1)$th primary sub-cell processing means, said q-th sub-cell assembly output means comprising $e_2$ input terminals for receiving the output of each of $2^{f_1}$ output terminals each corresponding to the data at the $f_q$-bit position of said header part and being connected to an input terminals of said secondary sub-cell switching means to which secondary sub-cells whose header part is provided with said $f_2$-bit position data of each secondary sub-cell header part according to each header value of a primary sub-cell are applied so as to output $(q-1)$th sub-cells to each output line, wherein said $e_q$ q-th sub-cells are assembled to be outputted as $(g-1)$th sub-cells when all of $e_q$ input terminals have received qth sub-cells from said qth sub-cell assembly output means, wherein 22 qth sub-cell processing means can be likewise configured sequentially in a hierarchical nest structure as a value of q increases.

15. An ATM switch circuit configuration system according to claim 11, wherein a multiplexer forming said primary sub-cell multiplexing means comprises:

w serial/parallel switches provided corresponding to w of said input lines where a primary sub-cell comprising an $f_1$-bit header part, a $g_1$-bit information part, and a 1-bit data indicating the existence of cell data each located at the same relative position in an ATM cell are serial-inputted synchronously with a clock signal bit by bit, and then parallel-outputted, and a parallel/serial switch wherein output of each of said serial/parallel switches is parallel-inputted collectively and then serial-outputted synchronously with a clock signal.

16. An ATM switch circuit configuration system comprising:

ATM cell divider for dividing an inputted ATM cell into either unit cells each having a 1-bit header part or sub-cells having a multi-bit header part, ATM cell switch for switching said unit cells or sub-cells outputted by said ATM cell dividing means according to a value of the header part of said unit cells or sub-cells and ATM cell output unit for assembly the switched unit cells or sub-cells to an ATM cell comprising a header part corresponding in number output lines of said ATM switch circuit, and outputting them from said output lines.

* * * * *

UNITED STATES PATENT AND TRADEMARK OFFICE
CERTIFICATE OF CORRECTION

PATENT NO. : 5,287,358

DATED : February 15, 1994

INVENTOR(S) : Mikio NAKAYAMA

It is certified that error appears in the above-indentified patent and that said Letters Patent is hereby corrected as shown below:

Col. 1, line 51, "bits" should be --bits)--;
line 52, "it," should be --bit,--.

Col. 4, line 15, "FIG. 33" should be a new paragraph, with paragraph indentation.

Col. 10, line 15, "32," should be --$32_1$,--;
line 15, "provided a" should be --provided where a--; and
line 15, "outputs and" should be --outputs Q--;
line 16, "outputs" should be deleted;
line 17, "outputted, at $b_1$ to $b_{32}$" should be --outputted at $b_1$ to $b_{32}$,--.

Col. 15, line 16, "sub-cell" should be --sub-cell processor--.

Col. 16, line 25, "$R_f(j=1-e_1)$" should be --$Rj(j=1-e_1)$--.

Col. 18, line 15, "position" should be --positions--.

Col. 19, line 12, "head" should be --header--;
line 22, "$1^{f1}xe_1$," should be --$2^{f1}xe_1$--;
line 36, "par" should be --part--;
line 37, "ar" should be --are--;
line 46, "comprises;" should be --comprises:--;
line 65, "e input" should be --$e_1$ input--.

UNITED STATES PATENT AND TRADEMARK OFFICE
CERTIFICATE OF CORRECTION

PATENT NO. : 5,287,358
DATED : February 15, 1994
INVENTOR(S) : Mikio NAKAYAMA

It is certified that error appears in the above-indentified patent and that said Letters Patent is hereby corrected as shown below:

Col. 20, line 51, "(q=1)th" should be --(q-1)th--;
line 68, "(g-1)th" should be --(q-1)th--.

Col. 21, line 1, "g-th" should be --q-th--;
line 45, "wit" should be --with--.

Col. 24, line 4, "$2^{f1-1}$" should be --$2^{fq-1}$--;
line 8, "$2^{f1}$" should be --$2^{fq}$--.

Signed and Sealed this

Thirteenth Day of September, 1994

Attest:

BRUCE LEHMAN

Attesting Officer

Commissioner of Patents and Trademarks